United States Patent
Hassan et al.

(10) Patent No.: US 11,487,423 B2
(45) Date of Patent: Nov. 1, 2022

(54) SUB-DISPLAY INPUT AREAS AND HIDDEN INPUTS

(71) Applicant: Microsoft Technology Licensing, LLC, Redmond, WA (US)

(72) Inventors: Amer Aref Hassan, Kirkland, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/716,007

(22) Filed: Dec. 16, 2019

(65) Prior Publication Data

US 2021/0181938 A1    Jun. 17, 2021

(51) Int. Cl.
*G06F 3/04883* (2022.01)
*G06F 3/14* (2006.01)

(52) U.S. Cl.
CPC ............ *G06F 3/04883* (2013.01); *G06F 3/14* (2013.01); *G06F 2203/04803* (2013.01)

(58) Field of Classification Search
CPC combination set(s) only.
See application file for complete search history.

(56) References Cited

U.S. PATENT DOCUMENTS

| | | |
|---|---|---|
| 7,266,779 B2 | 9/2007 | Baek et al. |
| 7,292,284 B2 | 11/2007 | Kim |
| 7,913,182 B2 | 3/2011 | Bear et al. |
| 9,152,376 B2 | 10/2015 | Johnston et al. |
| 9,232,191 B2 | 1/2016 | Periyannan et al. |
| 9,407,803 B2 * | 8/2016 | Min .................. H04N 5/23218 |
| 9,467,649 B2 | 10/2016 | Xie |
| 9,467,657 B2 | 10/2016 | Decker et al. |
| 9,479,549 B2 | 10/2016 | Pearson |
| 9,557,878 B2 | 1/2017 | Chen et al. |
| 9,575,712 B2 | 2/2017 | Farouki |
| 9,632,648 B2 | 4/2017 | Lee et al. |
| 9,635,091 B1 | 4/2017 | Laukkanen et al. |
| 9,652,193 B2 | 5/2017 | Seo et al. |

(Continued)

FOREIGN PATENT DOCUMENTS

| | | |
|---|---|---|
| CN | 105657326 A | 6/2016 |
| EP | 3292524 A1 | 3/2018 |

(Continued)

OTHER PUBLICATIONS

"Display Wall Controller", Retrieved from http://www.panotek.com/pdf/PAN-DWC-900-00-r10-web.pdf, Retrieved on Sep. 21, 2019, 12 Pages.

(Continued)

*Primary Examiner* — Hien L Duong
(74) *Attorney, Agent, or Firm* — Schwegman Lundberg & Woessner, P.A.

(57) ABSTRACT

Disclosed in some examples are display systems, methods, devices, and machine-readable mediums which provide for a gesture-based method for specifying a region of a display in which to show shared content. Also disclosed are pairing methods for associating the region of the display with a content source device, methods for sharing content within the region, and methods for providing input from the region back to the content source device.

20 Claims, 31 Drawing Sheets

(56) References Cited

U.S. PATENT DOCUMENTS

| | | | |
|---|---|---|---|
| 9,736,395 B2 | 8/2017 | Ramon | |
| 9,781,385 B2 | 10/2017 | Ma et al. | |
| 9,800,919 B2 | 10/2017 | Hahm | |
| 9,942,519 B1 | 4/2018 | Pan et al. | |
| 10,089,001 B2* | 10/2018 | Chakra | G06F 3/0488 |
| 10,147,115 B1 | 12/2018 | Bidarkar et al. | |
| 10,152,190 B2 | 12/2018 | Jones et al. | |
| 10,198,405 B2 | 2/2019 | Mital et al. | |
| 10,222,927 B2 | 3/2019 | Smolinski et al. | |
| 10,234,953 B1 | 3/2019 | Li et al. | |
| 10,372,402 B1 | 8/2019 | Fitzgerald et al. | |
| 10,454,858 B2 | 10/2019 | Mcneill | |
| 10,719,228 B2* | 7/2020 | Watanabe | G06F 3/0488 |
| 11,079,995 B1 | 8/2021 | Hulbert et al. | |
| 11,226,736 B2* | 1/2022 | Liu | G06F 1/1643 |
| 11,240,550 B2* | 2/2022 | Choi | H04N 21/4363 |
| 2004/0193413 A1 | 9/2004 | Wilson et al. | |
| 2006/0053194 A1 | 3/2006 | Schneider et al. | |
| 2007/0106942 A1 | 5/2007 | Sanaka et al. | |
| 2007/0150924 A1 | 6/2007 | Ichinose et al. | |
| 2007/0180400 A1* | 8/2007 | Zotov | G06F 3/04845 715/788 |
| 2007/0188597 A1 | 8/2007 | Kenoyer | |
| 2009/0044116 A1 | 2/2009 | Kitabayashi | |
| 2010/0235781 A1 | 9/2010 | Friedlander et al. | |
| 2011/0035448 A1 | 2/2011 | Leung et al. | |
| 2011/0119624 A1 | 5/2011 | Coldefy et al. | |
| 2011/0231791 A1* | 9/2011 | Itahana | G06F 3/1423 715/799 |
| 2012/0169772 A1 | 7/2012 | Werner et al. | |
| 2012/0210254 A1 | 8/2012 | Fukuchi et al. | |
| 2013/0019150 A1 | 1/2013 | Zarom et al. | |
| 2013/0019193 A1* | 1/2013 | Rhee | G06F 3/0486 715/769 |
| 2013/0067331 A1 | 3/2013 | Glazer et al. | |
| 2013/0091205 A1 | 4/2013 | Kotler et al. | |
| 2013/0155173 A1 | 6/2013 | Brady et al. | |
| 2013/0298029 A1 | 11/2013 | Natori et al. | |
| 2014/0199947 A1* | 7/2014 | Jung | H04B 7/26 455/566 |
| 2014/0250406 A1* | 9/2014 | Seo | G06F 3/0484 715/781 |
| 2014/0333509 A1 | 11/2014 | Yuann et al. | |
| 2014/0365919 A1 | 12/2014 | Shaw et al. | |
| 2015/0004945 A1 | 1/2015 | Sleeves et al. | |
| 2015/0049014 A1 | 2/2015 | Saito | |
| 2015/0067550 A1 | 3/2015 | Shin | |
| 2015/0113432 A1* | 4/2015 | Jung | G06F 3/04883 715/748 |
| 2015/0138213 A1* | 5/2015 | Turner | G06F 3/0485 345/520 |
| 2015/0160913 A1 | 6/2015 | Lee | |
| 2015/0170212 A1 | 6/2015 | Mcgie | |
| 2015/0212713 A1 | 7/2015 | Takehara | |
| 2015/0281769 A1 | 10/2015 | Chiu et al. | |
| 2015/0286342 A1* | 10/2015 | MacArthur | G06F 3/0481 715/783 |
| 2015/0338942 A1* | 11/2015 | Stone | G06F 3/0481 345/173 |
| 2015/0378665 A1 | 12/2015 | Han | |
| 2016/0014370 A1 | 1/2016 | Xie | |
| 2016/0026425 A1* | 1/2016 | Lee | G06F 3/0416 345/2.2 |
| 2016/0098181 A1 | 4/2016 | Liao et al. | |
| 2016/0179454 A1* | 6/2016 | Liu | G06F 3/04842 715/747 |
| 2016/0188170 A1 | 6/2016 | Miao et al. | |
| 2016/0198117 A1 | 7/2016 | Butcher | H04N 21/40 348/564 |
| 2016/0283102 A1 | 9/2016 | Chen et al. | |
| 2016/0371048 A1 | 12/2016 | Morris et al. | |
| 2017/0024100 A1 | 1/2017 | Pieper et al. | |
| 2017/0075503 A1 | 3/2017 | Chakra et al. | |
| 2017/0134561 A1* | 5/2017 | Senoo | H04M 1/72525 |
| 2017/0214862 A1 | 7/2017 | Matsubara et al. | |
| 2017/0235435 A1* | 8/2017 | Sohn | G06F 3/0481 715/738 |
| 2017/0251238 A1 | 8/2017 | Feldman et al. | |
| 2017/0300284 A1 | 10/2017 | Okabayashi et al. | |
| 2017/0329399 A1 | 11/2017 | Azam et al. | |
| 2017/0357401 A1* | 12/2017 | Fleizach | G06F 3/1454 |
| 2018/0012567 A1 | 1/2018 | Underkoffler et al. | |
| 2018/0041489 A1 | 2/2018 | Narayanan | |
| 2018/0101297 A1 | 4/2018 | Yang et al. | |
| 2018/0107839 A1 | 4/2018 | Clement et al. | |
| 2018/0132088 A1 | 5/2018 | Lee | |
| 2018/0136823 A1 | 5/2018 | Knoppert et al. | |
| 2018/0232139 A1 | 8/2018 | Okuda | |
| 2018/0307303 A1 | 10/2018 | Powderly et al. | |
| 2019/0026063 A1 | 1/2019 | Mabey et al. | |
| 2019/0166169 A1 | 5/2019 | Norum et al. | |
| 2019/0197992 A1 | 6/2019 | Taki et al. | |
| 2019/0251884 A1 | 8/2019 | Burns et al. | |
| 2019/0320219 A1* | 10/2019 | Yoden | H04N 21/43615 |
| 2019/0391714 A1* | 12/2019 | Kline | G06F 3/0484 |
| 2020/0012423 A1 | 1/2020 | Cinek et al. | |
| 2020/0104040 A1 | 4/2020 | Morris et al. | |
| 2020/0272324 A1 | 8/2020 | Chanda et al. | |
| 2020/0356221 A1 | 11/2020 | Behzadi et al. | |
| 2021/0173480 A1 | 6/2021 | Osterhout et al. | |
| 2021/0181852 A1 | 6/2021 | Hassan et al. | |
| 2021/0181853 A1 | 6/2021 | Hassan et al. | |
| 2021/0183336 A1 | 6/2021 | Hassan et al. | |
| 2021/0185520 A1 | 6/2021 | Hassan et al. | |
| 2021/0382562 A1 | 12/2021 | Hassan | |
| 2022/0174145 A1 | 6/2022 | Wilson et al. | |

FOREIGN PATENT DOCUMENTS

| | | |
|---|---|---|
| JP | 2005195939 A | 7/2005 |
| KR | 101651353 B1 | 8/2016 |
| WO | 2013009996 A1 | 1/2013 |
| WO | 2014023432 A1 | 2/2014 |

OTHER PUBLICATIONS

"Large-Format Interactive Platform", Retrieved from http://www.panotek.com/arixe, Retrieved on Sep. 21, 2019, 11 Pages.

Zhai, et al., "Gesture Interaction for Wall-Sized Touchscreen Display", In Proceedings of ACM International Joint Conference on Pervasive and Ubiquitous Computing, Sep. 8, 2013, pp. 175-178.

"Radian Flex Video Wall Processor", Retrieved from https://az849230.vo.msecnd.net/resources/vw-flex_user_rev1_22674.pdf, Retrieved on Sep. 21, 2019, 124 Pages.

"The Amazon Chime Web Application Now Supports Video Conferencing in Google Chrome", Retrieved from: https://aws.amazon.com/about-aws/whats-new/2018/07/the-amazon-chime-web-application-now-supports-video-conferencing/, Jul. 31, 2018, 3 Pages.

"Use Whiteboard in Microsoft Teams", Retrieved from https://support.office.com/en-us/article/use-whiteboard-in-microsoft-teams-7a6e7218-e9dc-4ccc-89aa-b1a0bb9c31ee?ui=en-US&rs=en-US&ad=US, Retrieved Date: Sep. 25, 2019, 7 Pages.

Sorensen et al., "Wireless Smartphone Mirroring in Video Calls", In Proceedings of IFIP Conference on Human-Computer Interaction, Apr. 18, 2015, 5 Pages.

"Non Final Office Action Issued in U.S. Appl. No. 16/716,231", dated Oct. 6, 2020, 17 Pages.

"Non-Final Office Action Issued in U.S. Appl. No. 16/716,186", dated Sep. 25, 2020, 12 Pages.

Lischke et al., "Mid-Air Gestures for Window Management on Large Displays", In Proceedings of Mensch und Computer, Sep. 6, 2015, 4 Pages.

"Using Avaya Equinox® Meetings Online portal", Retrieved from: https://downloads.avaya.com/css/P8/documents/101045342, Feb. 2019, 80 Pages.

"Cisco TelePresence Touch 10 User Guide (TC7.3)", Retrieved from: https://web.archive.org/web/20160805020647/https:/www.cisco.com/c/dam/en/us/td/docs/telepresence/endpoint/touch/tc7/user-guide/touch10-user-guide-tc73.pdf, Aug. 5, 2016, 79 pages.

(56) References Cited

OTHER PUBLICATIONS

"Interactive Displays Technologies", Retrieved from: https://web.archive.org/web/20171201162009/http:/business.panasonic.co.uk/visual-system/Multi-touch-display-technologies, Dec. 1, 2017, 12 Pages.

"Multi-surface Management", Retrieved from: http://www.panotek.com/blog/article/17121101, Nov. 12, 2017, 5 Pages.

"Sharp PN-L603WA 60" AQUOS BOARD® Interactive Display System", Retrieved from: https://www.touchboards.com/sharp-pn-l603wa-interactive-displays/?rrec=true#description, Retrieved Date: Sep. 22, 2019, 9 Pages.

"Notice of Allowance Issued in U.S. Appl. No. 16/716,231", dated Apr. 12, 2021, 9 Pages.

"International Search Report and Written Opinion Issued in PCT Application No. PCT/US20/059158", dated Mar. 2, 2021, 14 Pages.

"International Search Report and Written Opinion Issued in PCT Application No. PCT/US20/059156", dated Feb. 23, 2021, 13 Pages.

"International Search Report & Written Opinion issued in PCT Application No. PCT/US20/059145", dated Feb. 10, 2021, 13 Pages.

"International Search Report & Written Opinion issued in PCT Application No. PCT/US20/059150", dated Feb. 9, 2021, 14 Pages.

"International Search Report & Written Opinion issued in PCT Application No. PCT/US20/059160", dated Feb. 9, 2021, 11 Pages.

"Non Final Office Action Issued in U.S. Appl. No. 16/715,887", dated Mar. 8, 2021, 36 Pages.

"Final Office Action Issued in U.S. Appl. No. 16/715,887", dated Oct. 1, 2021, 41 Pages.

"Non Final Office Action Issued in U.S. Appl. No. 16/716,116", dated Apr. 26, 2022, 21 Pages.

"Notice of Allowance Issued in U.S. Appl. No. 16/715,887", dated Jun. 16, 2022, 8 Pages.

"Final Office Action Issued in U.S. Appl. No. 16/716,116", dated Aug. 17, 2022, 19 Pages.

* cited by examiner

SUB-DISPLAY INPUT AREAS AND HIDDEN INPUTS

BACKGROUND

Large displays, such as those that cover entire walls, billboards, and sides of buildings are useful for providing content during meetings, tradeshows, speeches, advertising, and other events. These displays may be made of a single display or may be composed of multiple smaller displays connected through hardware and software to form one large display. In some examples, the displays may have input capability, such as by detecting touch input or gestures using a touch screen, or cameras that detect gestures and/or touch events.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
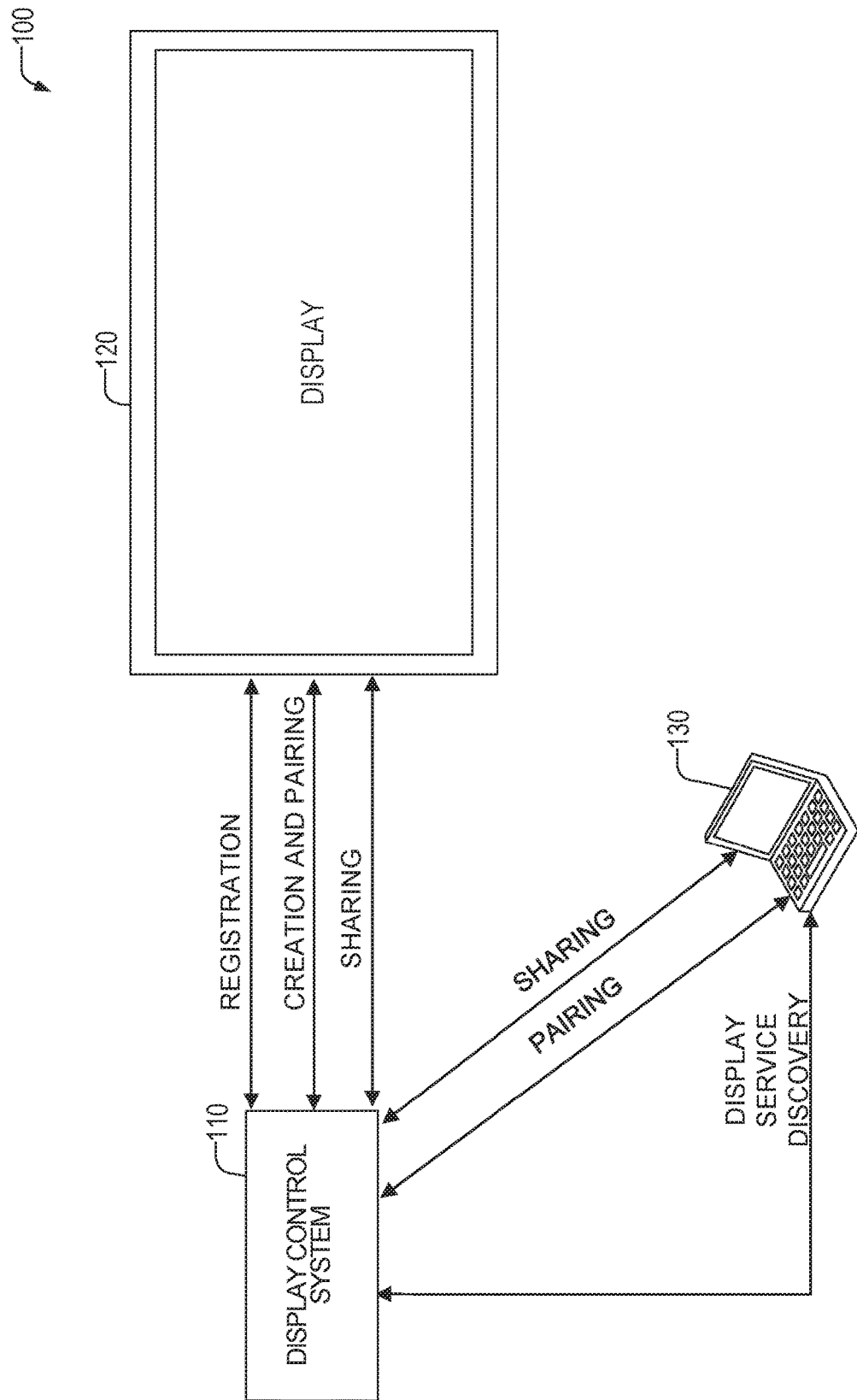
FIGS. 1-3 illustrates display systems according to some examples of the present disclosure.

To specify content for presentation on a display a graphical user interface (GUI) on a controller device (e.g., a computing device) is typically provided. Users select the content, placement, and layout options for the display through the GUI. Content is sent from the controller device to the display and is displayed according to the selected layout and placement. Organizations deploying these systems often have an administrator or some other user that is familiar with, and has access to, the GUI of the controller device. While these systems are often powerful and provide flexibility in layout options, they are not practical for a shared space like a meeting room where many different people are expected to interact with and use the display at various different times. Hiring an administrator to set up a display that will run in a particular configuration for a long time (e.g., like in a digital billboard or trade show) may be cost effective, having an administrator constantly on call to customize the system for users in a shared space (such as a meeting room) is not. As a result, many organizations make the display control system GUI publicly accessible for users to customize the layout for their individual purposes. This puts the burden on users that may not be familiar with the GUI of the display control system which may produce sub-optimal experiences with the display.

In order to solve this problem, other display systems have simplified the user interfaces to specify the content, placement, and layout options. This simplification is easier for users because it provides a more limited interface for users to control but comes at the cost of less flexibility. For example, large televisions may allow for the display of multiple different content sources on a single screen, but these systems typically provide only a limited number of preset layout options that are accessible via a remote-control interface. Additionally, these systems lack sophisticated input handling mechanisms.

Current large display systems thus lack flexible and easy to use content selection, layout, and placement options to allow users to quickly and easily place content on the display where they want it. As noted, current display systems typically feature proprietary interfaces with static layout options that may not be available to end users, or they may feature more limited interfaces that do not allow appropriate flexibility in designating content for display. As used herein, content may refer to one or more of: documents, document data, video, audio, screen sharing data, application sharing data (e.g., video frames from an application), and/or the like.

Disclosed in some examples are display systems, methods, devices, and machine-readable mediums which provide for a gesture-based method for specifying a sub-display e.g., a region of a display in which to show shared content. Also disclosed are pairing methods for linking (e.g., associating) the sub-display with a content source device, methods for sharing content within the region, and methods for providing input from the region back to the content source device.

A sub-display is a defined region of the display in which content from a particular content source device is displayed. The sub-display may be independent of any other sub-display in that a size, shape, position, settings, and content source device of each sub-display may be different. A user may perform a gesture over, on, or directed to, a display area to designate that area of the display as a sub-display for sharing content. The gesture may be a touch-gesture, or may be an air gesture that may be detected by a camera. The input designating the sub-display may specify the coordinates and shape of the sub-display on the display. For example, a user may touch the display and drag their finger over the display to draw an outline of the sub-display at the position the user touched. As used herein, a sub-display is a portion of a larger display that may be paired (i.e., linked) with a content source device to display content selected by the content source device. Each sub-display may display different content from one or more other sub-displays on the same display. The content source device paired with the sub-display may communicate content to the display through a direct connection or through a network connection. Input from the sub-display may be directed to the content source device that is paired with the sub-display.

Each sub-display may be graphically distinguished from a surrounding display area (which may include other sub-displays) by a graphical outline, a border, frame, window, or the like. Example inputs that cause designation of a sub-display include a user tracing their finger over the display at the location and in the shape of the desired sub-display. The shape may be a square, a circle, triangle, polygon, or the like. Other example gestures may include a drag operation where the point at which the user's finger contacts the display is a first corner of the sub-display and the user drags their finger and releases their finger at a second corner of the sub-display—the second corner being diagonal to the first corner. The display is configured to detect gestures through the use of touch screens, cameras, or other input devices.

To display content in the sub-display, after (or in some examples before) designating the sub-display the user may specify a content source device that provides the content that is displayed in the sub-display by pairing the sub-display with the content source device using a PIN, biometric, QR code, or other method. Once paired, the content source device may send content to the display for sharing on the sub-display. Both the designation of the sub-display and the linking of the sub-display to one or more applications is accomplished without the need for utilizing a separate user interface of a controller device.

The disclosed display systems may allow one or more applications on a single content source device to cast the same or different content to multiple sub-displays on the display simultaneously. Similarly, multiple content source devices may simultaneously cast the same or different content to multiple different sub-displays of a same display simultaneously.

The disclosed display systems may also be configured to detect user input, including touch inputs, gesture inputs, and/or the like directed to or within one or more of these sub-displays. Inputs may be detected simultaneously on or in multiple sub-displays. These inputs may be sent back to the application linked to the sub-display on the content source device and processed by an application on the content source device (such as the application that provided the content shared on that sub-display). In some examples, the input may be processed as if they were inputs produced by an input device that is directly coupled to the content source device. In some examples, a sub-display may be designated as an input-only sub-display and may be separate from any sub-display that displays content. The input sub-display may display any entered input or may hide the entered input in order to provide a private area for input.

In some examples, input into a sub-display may be provided by a third device. For example, a content source device (e.g., a laptop) may provide content that is displayed within the sub-display. A content source device may be any computing device that is capable of sharing content in a sub-display. A third device, such as a tablet, may allow users to provide input into the sub-display. In order to accomplish this, the separate input device (e.g., the tablet) may pair (using the same methods as disclosed herein for the content source device) with the sub-display. The pairing may be an input only pairing, or an input and/output pairing. Input from the tablet may be sent by the display control system (or in some examples, the display control system may facilitate a peer-to-peer (P2P) connection between the input device and the content source device by providing a P2P address of the content source device to the input device) to the content source device where it is processed and reflected in any change in the content sent to the display control system.

More generally, it is contemplated that multiple input and/or output devices may be paired to a single sub-display. In the case of multiple output and input devices, user configurable rules on the display control system may govern how conflicting input and/or output is handled. For example, different content sources may be displayed side-by-side in the sub-display. While multiple input and/or output devices may be paired to a single sub-display, in other examples a sub-display may accept content and send input to a single content source device.

The sub-displays may also display one or more notifications in a notification area. The notifications may be sent by the paired content sharing device. Notifications may appear within the sub-display, or in a notification area visually attached to, or adjacent the sub-display. Users may interact with notifications, such as to dismiss the notification, reply to the notification, obtain more information about the event tied to the notification, or the like.

In addition, while the aforementioned designation and pairing processes describe designation and pairing for a user that is in a same room to the display, in some examples, a remote user may utilize an intermediary server (such as a communication server) and a local user to share content with a sub-display of a display that is not in a same locale as the remote user.

By utilizing gesture-based designation of sub-displays, users may quickly and easily designate content for a portion of the display. Because the gesture is drawn relative to the display itself, rather than on a controller's user interface, user's may visually layout the display to more naturally achieve a desired layout and content selection. This avoids problems in traditional display control system user interfaces in which it may be hard to visualize each layout choice when applied to the larger display (rather than the user interface which may be on a smaller screen). This also avoids problems that plague simpler user interfaces that may offer less flexible layout options as in the disclosed system the size and shape of each sub-display is "drawn" by the user using gestures and is thus completely within the user's control.

Thus, the present disclosure discloses improved user interfaces for computing, such as for large displays. The improved display interfaces allow users to more quickly share content of a content source device in a desired place and layout on the display. The disclosed methods are faster and easier than conventional solutions while still preserving flexibility. Rather than paging through multiple screens of options in display control system interfaces or dealing with more limited options for more user-friendly interfaces, in the disclosed system, the user only needs to draw the sub-display on the larger display, select a sharing option in their content sharing device, and enter pairing information. The present disclosure also eliminates the need for separate display control system GUI interfaces, thus simplifying the design of the display control system without sacrificing the flexibility offered by those GUIs. The present disclosure thus solves the technical problem of layout, organization, and selection of content on a display by the technical solution of utilizing gesture-based input, pairing, and content sharing. The present disclosure improves the functioning of the computer system by providing improved user interfaces by distilling complex layout and setup procedures into an intuitive and easy to use interface and at the same time reducing processing load of the display control system by the elimination of the GUIs—all while maintaining flexibility and features of more complex systems.

FIG. 1 illustrates a display system 100 according to some examples of the present disclosure. A display 120 is communicatively coupled to a display control system 110. The display 120 and the display control system 110 may communicate through wired or wireless means and may be directly coupled or coupled through a network, such as a packet-based network. In some examples, the display control system 110 may control one or more displays such as display 120. In some examples, the display 120 registers with the display control system 110 to be controlled by the display.

For example, the display control system 110 may be any computing device (whether separate from the display 120 or integrated with the display 120) that manages sub-displays on a display. The display 120 may send a broadcast message with data in the message indicating that it is a display looking for a controller. The message may be sent to a particular defined port and to a particular defined broadcast address. The display 120 may then listen for these messages and reply to the display control system 110 at the address from which the broadcast message is sent. Once the display 120 and display control system 110 find each other and determine a network or other address, the display control system 110 and the display 120 may then negotiate one or more parameters used by the display control system 110 to control the display 120. Example parameters may include network addresses to send content, network addresses where input is sent from the display to the display control system, how pairing is to be performed, parameters of the display such as the display size and capabilities, and the like. The display control system 110 may then register the display 120 in a database of controlled displays. For example, the display control system 110 may create a database record with the parameters, addresses, and capabilities of the display. While the display control system 110 broadcasts a message in the above example, in other examples, the display 120 broadcasts a message looking for a display control system.

Display 120 and/or display control system 110 may recognize one or more inputs directed to the display 120 for creating one or more sub-displays. For example, the display 120 may be a touch screen display. In other examples, the display 120 may have a camera pointed at the display or pointed at a user of the display. The camera may be communicatively coupled to the display 120 or the display control system 110 that may detect gestures. A user touching the display outside of an already created sub-display along with a dragging gesture may be recognized as a command to create a new sub-display. The geometry of the gesture may determine the geometry of the sub display. For example, the user may trace an outline of the desired sub-display. In some examples, this geometry may be corrected by the system (e.g., a user's attempted circle with uneven lines and varying radius may be corrected to be a circle with a constant radius).

In some examples, visual feedback may be provided to the user as they create the sub-display showing the boundaries of the sub-display as it is created. For example, an outline may be shown of the currently created sub-display as the user moves their finger over the display to create the sub-display. In other examples, instead of an outline, a sub-display may be created as a box with opposite corners being a first and last touch points in a drag operation. As the user drags from one corner to the opposite corner, the display may display an expanding window or box.

In examples in which an input device communicatively coupled to the display control system 110 identifies the gesture to designate a sub-display (e.g., a camera coupled to the display control system 110 that may take video of the display to detect input), the display control system 110 may send a message indicating an input designating a new sub-display and the coordinates of the input to the display 120 for displaying the visual feedback (e.g., for display of the outline or other visual designation of the boundaries of the sub-display during the gesture).

Once designation of the size and shape of a sub-display is complete, the display 120 and display control system 110 may create a sub-display and pair the sub-display with a content source device, such as content source device 130.

In examples in which the display 120 detects the gesture to designate the sub-display, the display 120 may record the coordinates of the sub-display, as entered by the user, and may communicate the coordinates to the display control system 110. The coordinates may be sampled points along the user's trace, or may be coordinates of a box designated by the user by determining a first corner where the user first presses the screen and a second corner where the user lifts their finger off the screen. In examples in which an input device coupled to the display control system 110 recognizes the gesture to designate the sub-display, the display control system 110 may send the coordinates to the display 120. Once a sub-display is designated additional user inputs may move, resize, change the shape of (e.g., from a first polygon to a different polygon or to a circle), and close a sub-display.

When a sub-display is designated, the display 120 and/or display control system 110 may create data structures that store information about the sub-display. For example, the coordinates of the sub-display, a unique identifier of the sub-display (e.g., a PIN number of the sub-display), information on the display it was created on, and the like. The data structure may have fields that may be populated later with information about the content source device once a content source device is paired with the sub-display. For example, an address of the content source device, an application identifier of the content source device, and the like that are used to accept content from the content source device and match that content to a sub-display and also to route input from the sub-display and route it to the correct application on the content source device.

To pair the sub-display on the display 120 with the content source device 130, one or more methods of pairing may be used. For example, the content source device 130 (e.g., a computing device) may discover the display control system 110. The display control system 110 may broadcast advertisements for a display service and the content source device 130 may listen for these advertisements. The broadcasts may indicate an address of the display control system 110. The content source device 130 may save this address for future streaming of content and pairing to the display control system 110.

Figure 6:
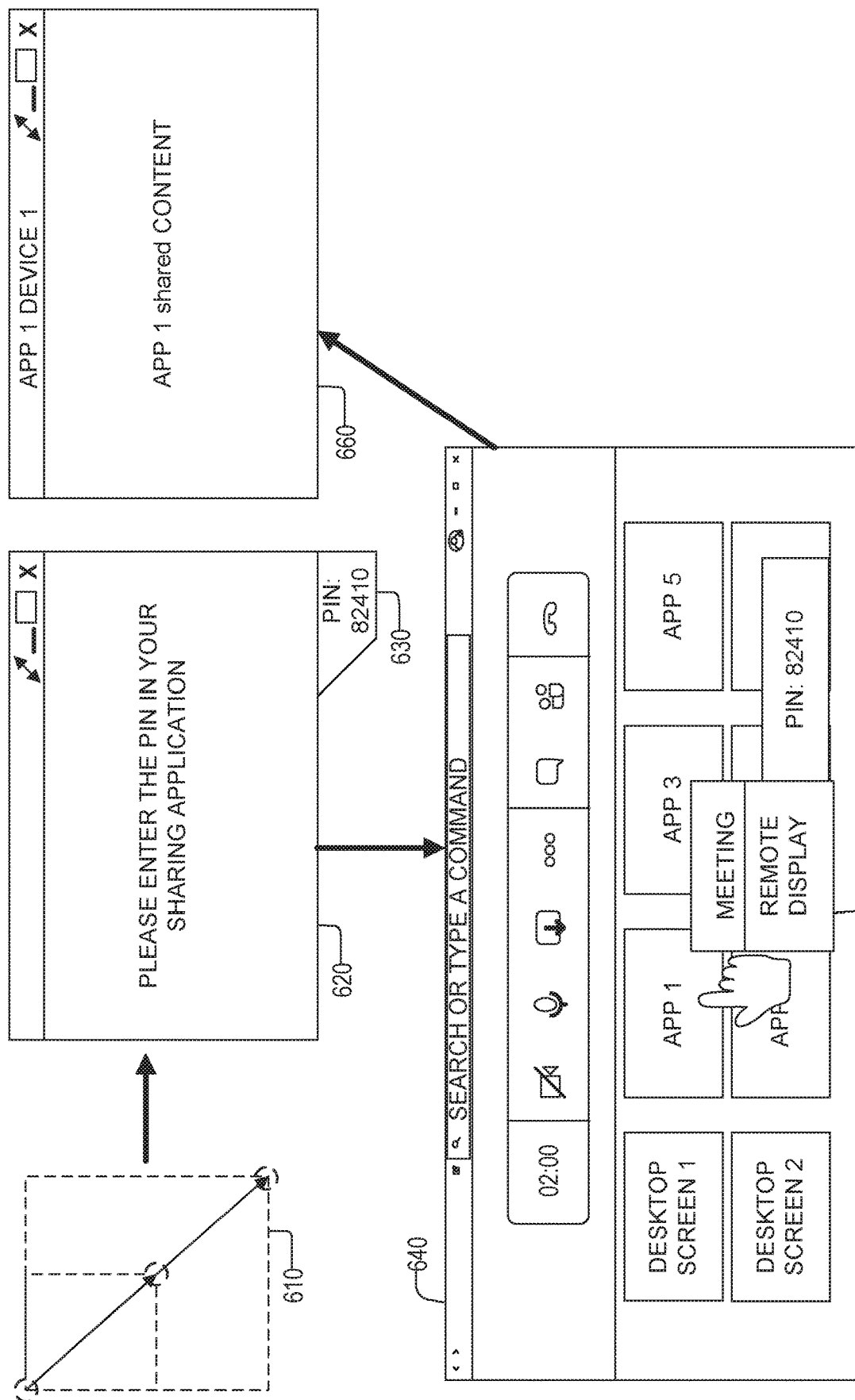
FIG. 6 illustrates a designation and pairing process according to some examples of the present disclosure.

When the sub-display is created, the display 120 may display a PIN, QR code, password, or other unique identifier of the sub-display. This may be displayed in a graphical user interface that is in the sub-display, proximate to the sub-display, visually touching but not overlapping the sub-display, or the like. For example, in a box that is below and visually connected but not overlapping the sub-display. For example, FIG. 6 shows a PIN in a pairing tab 630 below the sub-display. This pin may be created by either the display 120 or the display control system 110.

This pin may then be entered by the user into an application on the content source device 130. For example, based upon discovery of the display service, the content source device may provide a user an option to share the content of a particular application to a display, such as display 120. For example, through a context or sharing menu. The application may then send the entered PIN to the discovered display control system 110. The display control system 110 may then match the application of the content source device 130 with the sub-display on the display 120. The content source device 130 may then begin sharing content to the sub-display by sending the content to the display control system 110 and may receive input from the display 120 via the display control system 110.

Content source device 130 may communicate with the display control system 110 and/or the display 120 through various wired and wireless means, including through a network, such as a packet-based network. While a display control system 110 is shown, one of ordinary skill in the art will appreciate that the functions of the display control system 110 may be implemented in one or more other devices as well as the display 120.

Display 120 may be a liquid crystal display (LCD), a light emitting diode (LED) display, an organic LED (OLED) display, a plasma display, or the like. The display 120 may include a touchscreen. The display 120 or display control system 110 may also be coupled to a camera that detects gestures directed to the display. Display control system 110 may be a computing device, such as a server computing device, a laptop, a desktop, a tablet, a smartphone, a dedicated hardware controller, or the like. Display control system 110 may be attached to, or a same device as the display 120 and communicatively coupled through a local connection to the display 120 or may be a different device communicatively coupled through a network to display 120. Content source device 130 may be a computing device, such as a laptop, desktop, tablet, smartphone, smart watch, or the like.

Figure 2:
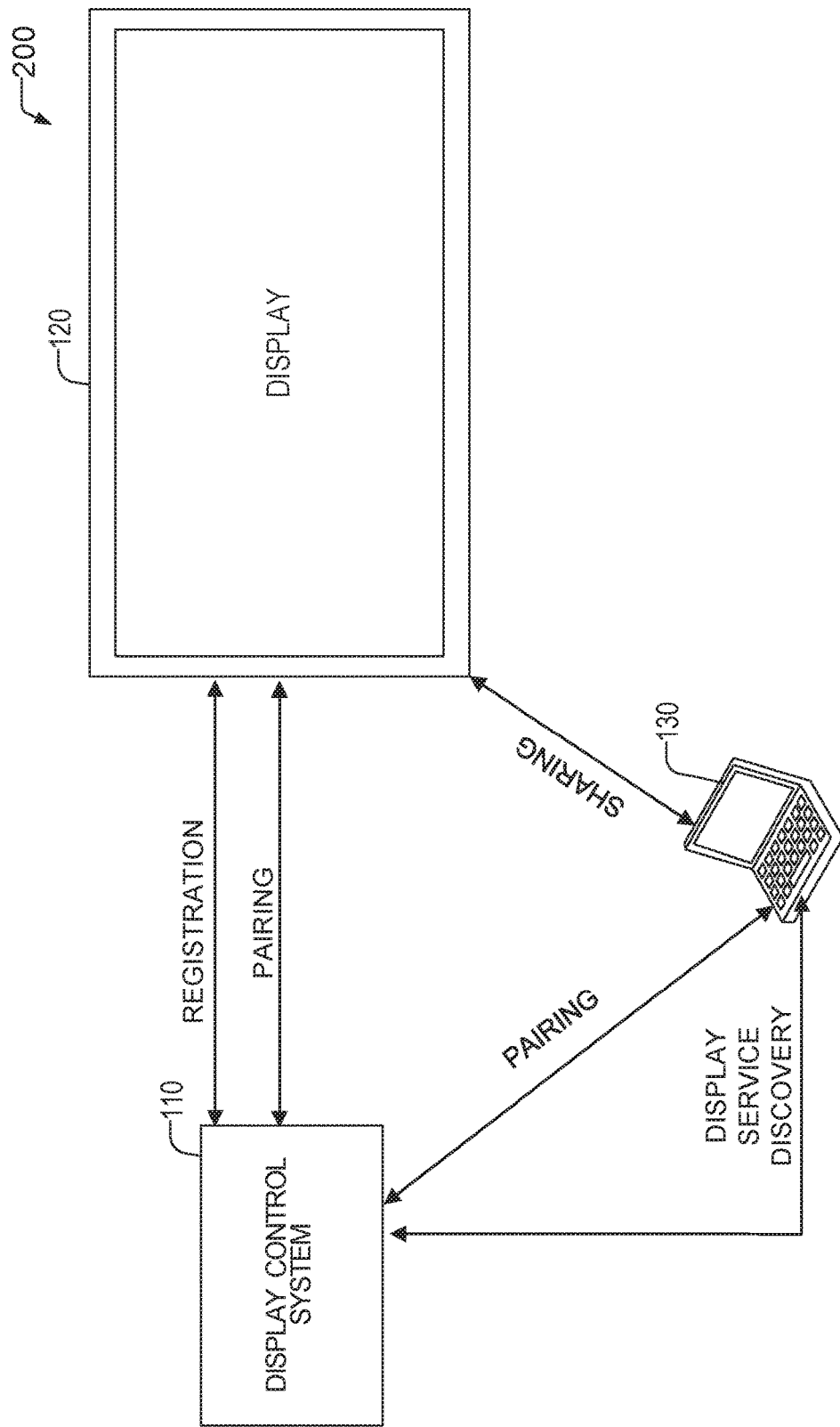

FIG. 2 illustrates a display system 200 according to some examples of the present disclosure. In the illustration of FIG. 2, once the content source device 130 is paired with the sub-display, the content source device 130 may send the content directly to the display 120 rather than sending it to the display control system 110 as in FIG. 1. This may be accomplished by the display control system 110 providing the address of the display 120 to the content source device 130 during pairing.

Figure 3:
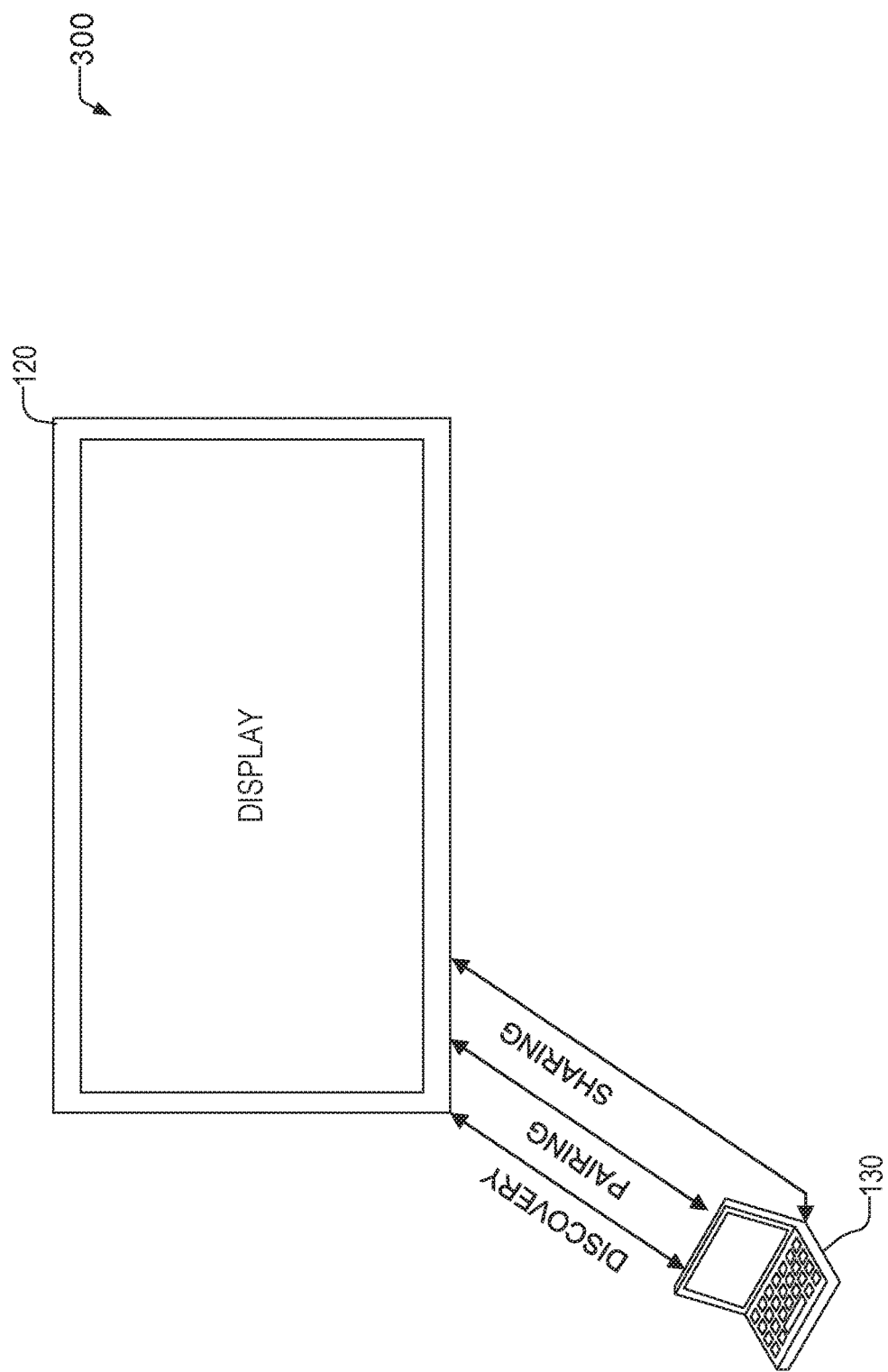

FIG. 3 illustrates a display system 300 according to some examples of the present disclosure. In FIG. 3 the display control system is part of the display 120. The display 120 in FIG. 3 directly communicates with the content source device 130 for discovery, pairing, and content sharing.

Sub-Display Designation

Figure 4:
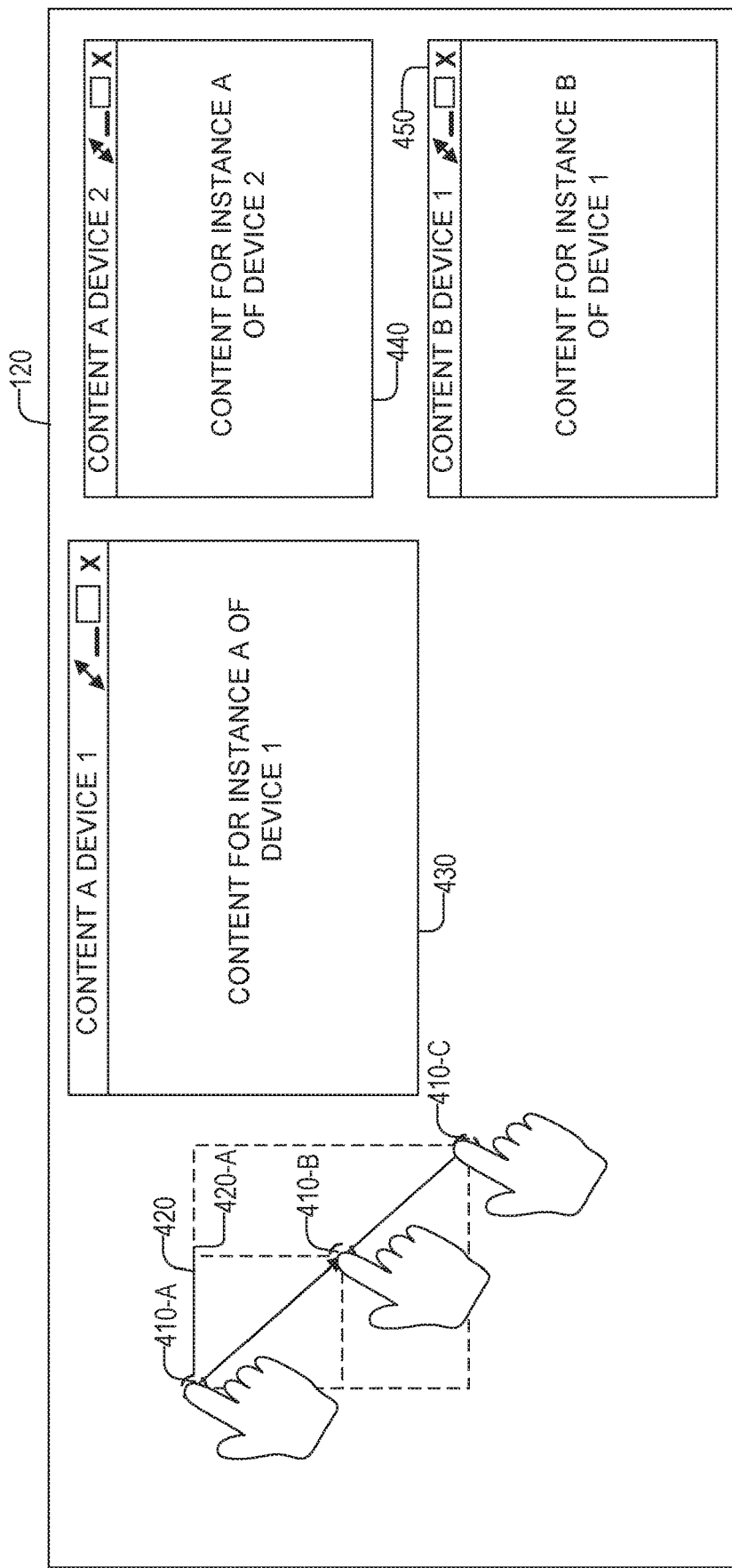
FIG. 4 illustrates designating a sub-display of a display using a gesture according to some examples of the present disclosure.

FIG. 4 illustrates designating a sub-display of display 120 using a gesture according to some examples of the present disclosure. The gesture of FIG. 4 may be a drag gesture when the user first touches the display 120 at first point 410-A and drags their finger in a diagonal motion to points 410-B, and 410-C. The designated sub-display would be the rectangle with diagonal vertices at the first point 410-A and the point 410-C where the user takes their finger off the display. In some examples, after the first touch at first point 410-A and a subsequent drag towards point 410-B, the display 120 may provide an outline or other graphical representation of a window, such as representation 420. As the user moves their finger the representation updates to match the current size and shape of the sub-display. While in FIG. 4, a rectangle is displayed, in other examples, other shapes may be designated the same way with sizes scaled to occupy a bounding box with vertices at the beginning and ending points of the gesture.

In FIG. 4, other sub-displays are represented as well. For example, sub-display 430 which is showing content A shared from content source device 1. The content may be from a particular application on content source device 1—for example, a first application from content source device 1. Sub-display 440 displays content A from content source device 2, for example, from a first application from content source device 2. Sub-display 450 displays content B from content source device 1, for example, content from a second application of the content source device 1.

Figure 5:
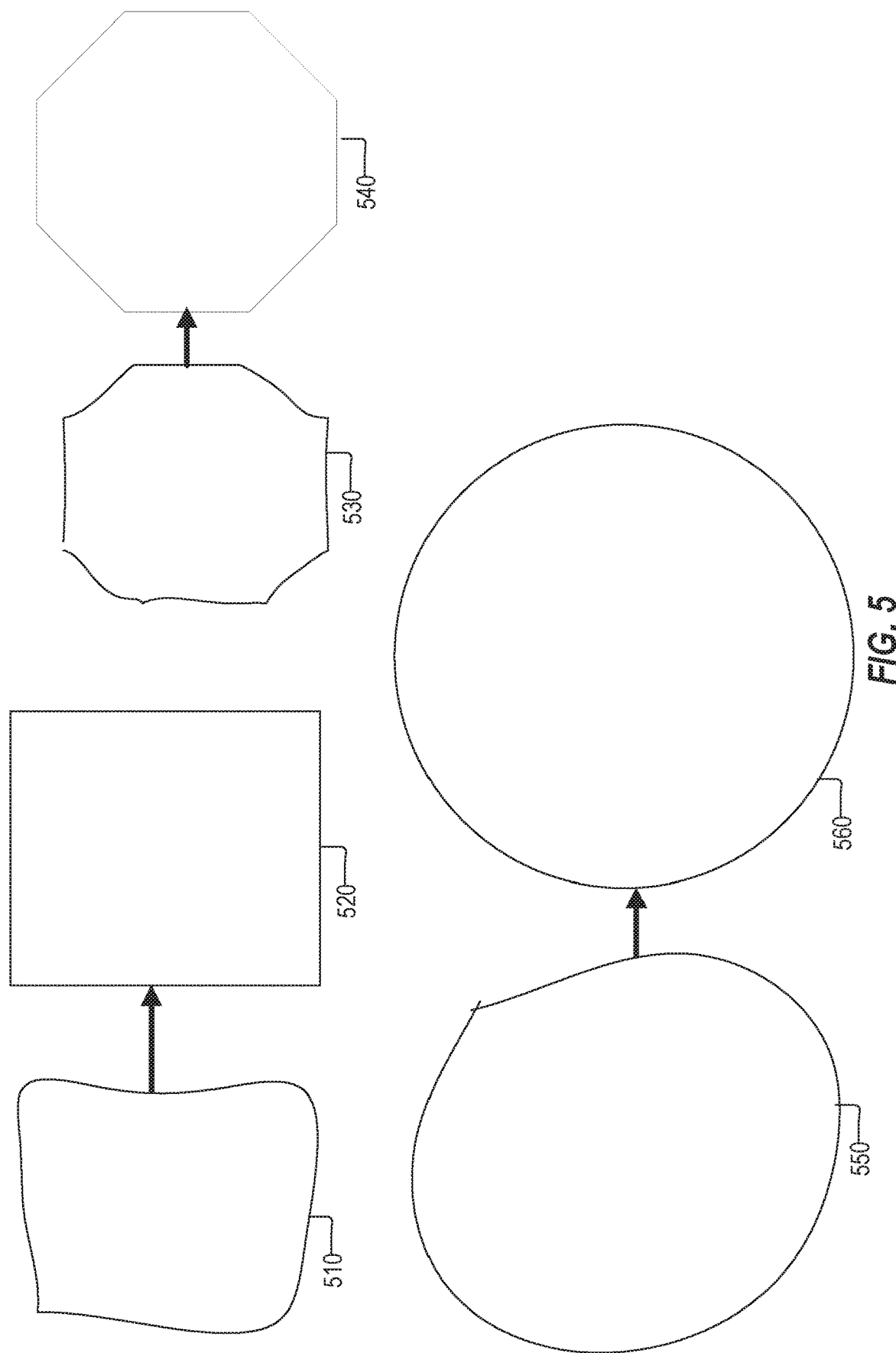
FIG. 5 illustrates gesture-based designation of sub-displays according to some examples of the present disclosure.

FIG. 5 illustrates other gesture-based designation of sub-displays according to some examples of the present disclosure. For example, instead of a drag operation where the diagonal vertices are specified by the beginning and ending points of the drag, the user may specify the outline of the sub-display. For example, the user may trace a square, rectangle, polygon, circle, or the like and the sub-display may utilize the path traced by the user as the coordinates of the sub-display. The sub-display shape may be the exact shape traced by the user, that is, it may not be updated to be a smooth shape such that imperfections in the user's tracing of the shape may be reflected in the sub-display. In other examples, the system may, automatically, or in response to a user input—correct the user's trace to match a closest shape from a library of shapes. For example, as shown in FIG. 5, the user's trace 510 is corrected to a square 520. A user's trace 530 is corrected to an octagon 540, and the user's trace 550 is corrected to be a circle 560.

The system may achieve the correction by straightening lines between vertices in the user's trace. Vertices may be identified by identifying direction changes e.g., by computing the slope of a line between successive coordinates of the user's trace and comparing the slope periodically throughout the user's trace and comparing it to a threshold. In other examples, the completed shape is compared to a library of shapes. The system may calculate a total difference in (x, y) coordinate points between the points and/or vertices of each library shape and the outline that the user traced. The system may select the shape with the lowest total difference. In some examples, in order to properly normalize the size, the shape traced by the user may be scaled to a normalized size for the comparison, or the shape in the shape library may be normalized to a size corresponding to the user's trace.

In some examples, the display may visually indicate the geometric correction by animating a movement of the lines drawn by the user's trace to the corrected geometric shape. The sub-display may take the size, and boundaries indicated by the corrected geometric shape.

In some examples, whether the trace is geometrically corrected or not may be set by one or more settings. A global setting may be used that is applied to each sub-display designation without user input during the designation. In some examples, a setting may be set on a per sub-display designation basis. For example, the user may apply a user input either before, during, or after the designation of the sub-display to designate whether the system should correct the shape drawn by the user. For example, during the sub-display designation (e.g., during the tracing of the shape), if the user taps the display with a different finger (while the user is still tracing with the other finger)—a menu may be displayed that allows the user to activate the geometric correction. In other examples, a menu may allow the user to select the shape to correct the trace to.

In order to conform the content to the selected shape, the content source device, the display, and/or display control system may apply one or more transformations to the content, such as resizing the content, stretching the content, skewing the content, cropping the content (e.g., to the shape of the sub-display), rotating the content, and the like.

Pairing Operations

To route content from a content source device to the correct sub-display on the display, the content source device may pair (i.e., link) with the sub-display. Pairing (i.e., linking) is used herein to describe a process for associating the content source device with a particular sub-display to allow the routing of content from the content source device to a particular sub-display. The pairing process may happen before or after the designation of the coordinates of the sub-display. FIG. 6 illustrates a flow diagram of a designation and pairing process according to some examples of the present disclosure. In the example of FIG. 6, the user designates the coordinates of the sub-display 610 by designating the corners of the sub-display. The rest of the coordinates are calculated by the system based upon those two corners. The sub-display may include a GUI window with controls for resizing, minimizing, maximizing, and closing the sub-display. In other examples, the sub-display may be frameless with no visible controls. One of ordinary skill in the art with the benefit of Applicant's disclosure will appreciate that other visual configurations are contemplated.

In some examples, a pairing tab 630 may be shown adjacent to the sub-display 620 with pairing information. As shown in FIG. 6, the pairing tab 630 is connected to one edge, but not overlapping the sub-display. In some examples, the pairing tab 630 may be displayed in the sub-display 620. In other examples, the pairing information in pairing tab 630 may be displayed in the sub-display as text. For example, as shown in FIG. 6, the sub-display currently displays the text "Please enter the PIN in your sharing application." In some examples, the PIN may be displayed along with the message, or may be displayed instead of the message or the like. The pairing information displayed in the pairing tab 630 may be a PIN number. The PIN number may be created by the display, the display control system, or the like. The PIN number may be a sub-display identifier that uniquely identifies that sub-display to the display and/or the display control system.

The content source device may be executing an application that may allow for casting (i.e., sharing) of content. For example, a communication application, a photo application, a productivity application (e.g., a word processing application, a spreadsheet application, a drawing application, or the like), and the like. Example communication applications may be a remote meeting application, a video chat application, a video playback application, a photo application, and the like. In some examples, the content source device may allow sharing of one or more of the displays of the remote display device. For example, sharing a desktop of the remote display device.

In order to share content, the user may select a share content option-either in the application that has the content they wish to share, or via a sharing utility (e.g., provided by an operating system of the remote content display device). The share option to the display may be enabled in response to the content source device discovering the display service (e.g., by receiving broadcast messages sent by the display control system). In the example of FIG. 6, a GUI 640 of a communication application is shown according to some examples of the present disclosure. In FIG. 6, the communication application is participating in a network-based communication session (such as an online meeting) and the user has indicated that the user would like to share a window. An option is displayed that allows the user to determine where to share the content, either with other remote participants of the network-based communication session ("meeting") or on a remote display ("remote display"). If the display is selected, a menu or window is displayed that allows the user to enter the PIN displayed on the display.

As already described, an application on the content source device (e.g., either an application that allows content sharing, or an operating system service that provides a sharing service to other applications that share content) discovers a display service advertised by a display control system. When a display service is discovered, the application enables sharing content to the display. When a user indicates to share content, the application or service on the content source device sends a content share request with the entered PIN to the address of the display control system discovered during the discovery process of the display service. If the PIN matches a displayed PIN, the display service may pair the content source device to the sub-display. The displayed PIN may be sent by a display to the display control system. In other examples, the displayed PIN may be determined by the display service provided by the display control system (and sent to the display for display). For example, the display control system and/or display may record information about the content source device in a data structure describing the sub-display. Furthermore, content from the content source device may be routed to the sub-display and input from the sub-display routed to the content source device based upon the pairing. The display service may send a pairing confirmation to the content source device. The content source device then sends the content to either the display control system or the display itself—depending on the implementation. Content shared may be video, audio, still images, application displays, or the like. Once the display is paired and streaming begins, then at 660 the content is displayed in the sub-display.

In other examples, the pairing may operate in the reverse. That is, the application on the content source device may specify the PIN and the user may enter the PIN in a pairing input area (e.g., such as a pairing tab) of the display. In these examples, the PIN may be sent by the content source device to the display control system. This PIN is then matched to a PIN entered into the pairing tab of a sub-display.

Pairing

Figure 7:
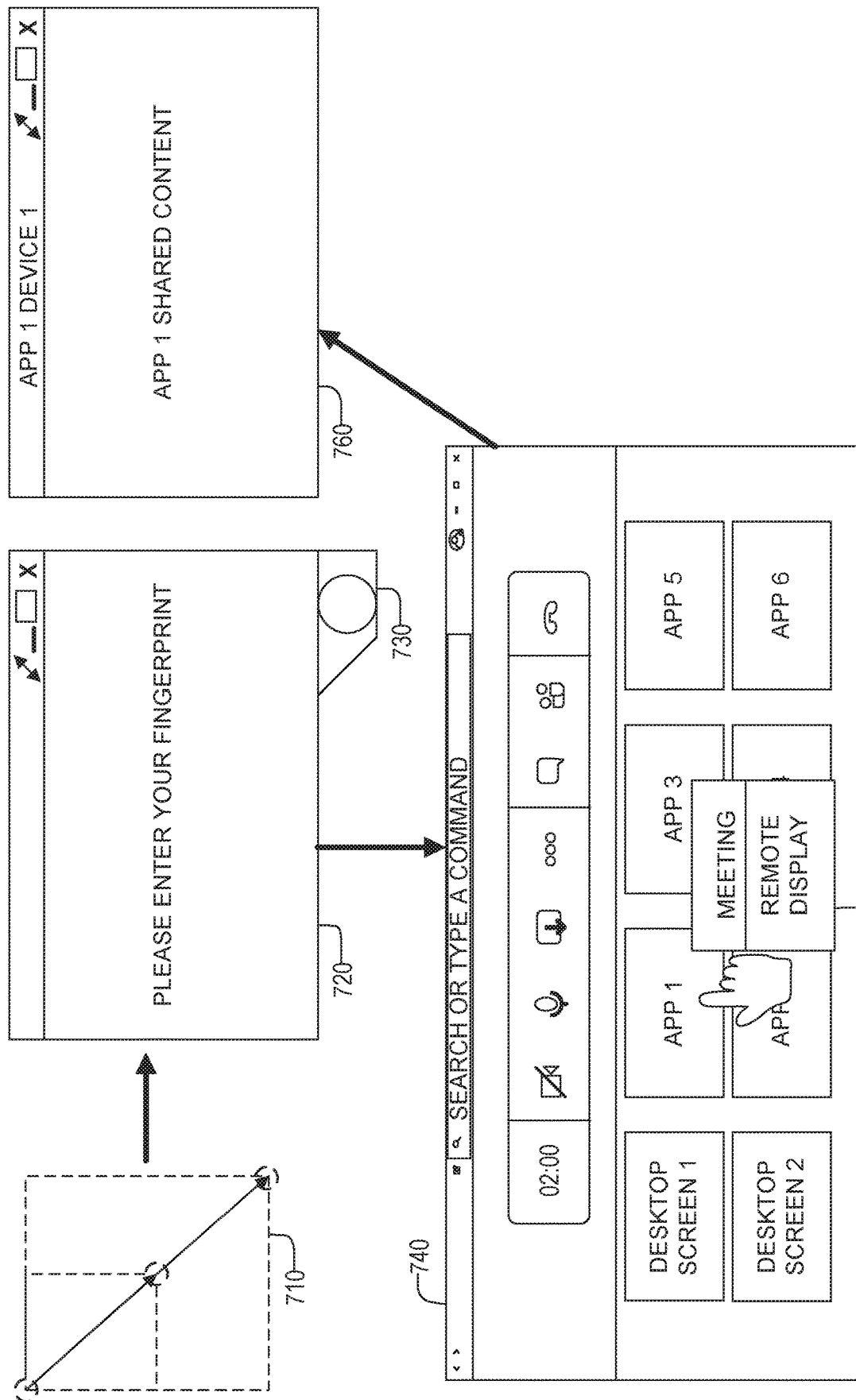
FIG. 7 illustrates a designation and pairing process using biometrics according to some examples of the present disclosure.

FIG. 7 illustrates a flow diagram of a designation and pairing process using biometrics according to some examples of the present disclosure. As in FIG. 6, the user begins by designating the coordinates of a sub-display 710. The displayed sub-display 720 may have a pairing tab 730. Pairing tab 730 may be a biometric entry area. For example, a fingerprint entry area. The display may have an integrated fingerprint reader that may allow for fingerprint entry in one or more locations of the display. In some examples, the display may have the ability to scan for a fingerprint over the entire display and the pairing tab 730 may be anywhere on the display. In some examples, the pairing tab 730 may be adjacent to and connected to a border of the sub-display 720. In these examples, the pairing tab 730 serves to limit the processing power required for scanning for fingerprints by limiting the area that needs to be scanned to the coordinates of the pairing tab 730. Rather than scanning the entire surface of the display, the display only needs to scan for a biometric in the pairing tab 730. Additionally, the pairing tab 730 serves to link the sub-display with the scanned biometric such that multiple sub-displays may be created and linked simultaneously.

When the user tries to pair with a sub-display, the user enters the biometric at the display, such as in the pairing tab 730. The biometric template may be sent to the display control system who stores the biometric template and associates it with the designated sub-display (e.g., based upon which sub-display's pairing tab scanned the biometric). The user selects to share content with a display by selecting a share option in a content sharing application (such as through a menu 750 of a GUI of the content sharing application 740). The content source device may send a biometric template of the same type (e.g., a fingerprint scan) that is taken by the content source device (either at the time of pairing, or during a registration or setup process) to the display control system. The display service then searches for a match between the biometric template sent by the content source device and biometric templates entered into pairing tabs (or other locations) of unpaired sub-displays. If a match is found, the content source device and the sub-display may be paired and a message may be sent to the content source device that a match is found and content may begin sharing, such as shown at GUI 760.

In some examples, in order to protect the privacy of the users, the fingerprint and/or other biometric may use a non-standard template type such that if a malicious party were to obtain the biometric template (either stored in the application or with the display service), the template would not be usable to bypass biometric authentication with other services or applications. In some examples, the biometric templates may be encrypted. In some examples, the biometric templates stored at the display control system may be deleted from the controller after a pairing process. If no pairing process results with a particular biometric template, that template may be deleted after a short time period.

In some examples, the pairing tab 730 may be utilized for capturing biometrics, but in other examples, other specific locations for entering the biometric may be utilized. For example, a retinal scanner may be located at a particular place on the display. For examples in which a biometric scanner is in a central location, the system may restrict the creation of sub-displays such that a single sub-display may be paired at once. This allows for linking a particular sub-display with a particular captured biometric. A biometric in these examples may be obtained at the display by the user presenting themselves for a scan at the display or near the display (e.g., within a defined distance). The biometric scanner may be in a same room, adjacent to the display (e.g., mounted on a same wall surface as the display), facing the display (e.g., the user may turn to have their back face the display to have a face or eye scan). The biometric scanner may be connected through a local interface (such as a Universal Serial Bus interface, Serial Interface, or the like), in other examples, the biometric scanner may be connected through a network interface In other examples, the system may allow for the creation of multiple sub-displays simultaneously with a central biometric scanner location. In these examples a method for specifying which sub-display a biometric scan is associated with may be utilized. For example, a user may enter an identification name and/or number of a sub-display into an input area of the display setup for this purpose just prior to, or just after scanning of the biometric.

Remote Display Sharing

While the pairing procedures described herein are utilized for users of content source devices that have physical access to the display at the time of sub-display designation and pairing, in other examples, users with content source devices that do not have physical access at the time of sub-display designation and pairing may share content in a sub-display of the display. These content source devices are referred to herein as remote content source devices. Remote content source devices are content source devices whose users do not have physical access to the display to pair with a sub-display.

A communication application such as MICROSOFT TEAMS® may allow remote users to share content on a display in a conference room for local participants to view and interact with. In some examples, this may be achieved by one of the local participants receiving the shared content through an network-based communication session (e.g., an online meeting) of the communication application. The local participant may designate a sub-display on the display and pair the communication application executing on that local participant's computing device to the sub-display. This causes the sub-display to display whatever the local participant's device is displaying. Thus, if the local participant is viewing the shared content of the remote user in the communication application, the sub-display will also display that content. There are drawbacks to this approach. For example, if the local participant leaves or changes what is displayed in the paired application, this may stop or interrupt the content sharing for other local participants who are relying upon the content sharing. Thus, the continued display of content of the remote user is dependent on the local participant. Furthermore, some communications applications may not be setup to allow one user's shared content to be re-shared to another location.

Figure 8:
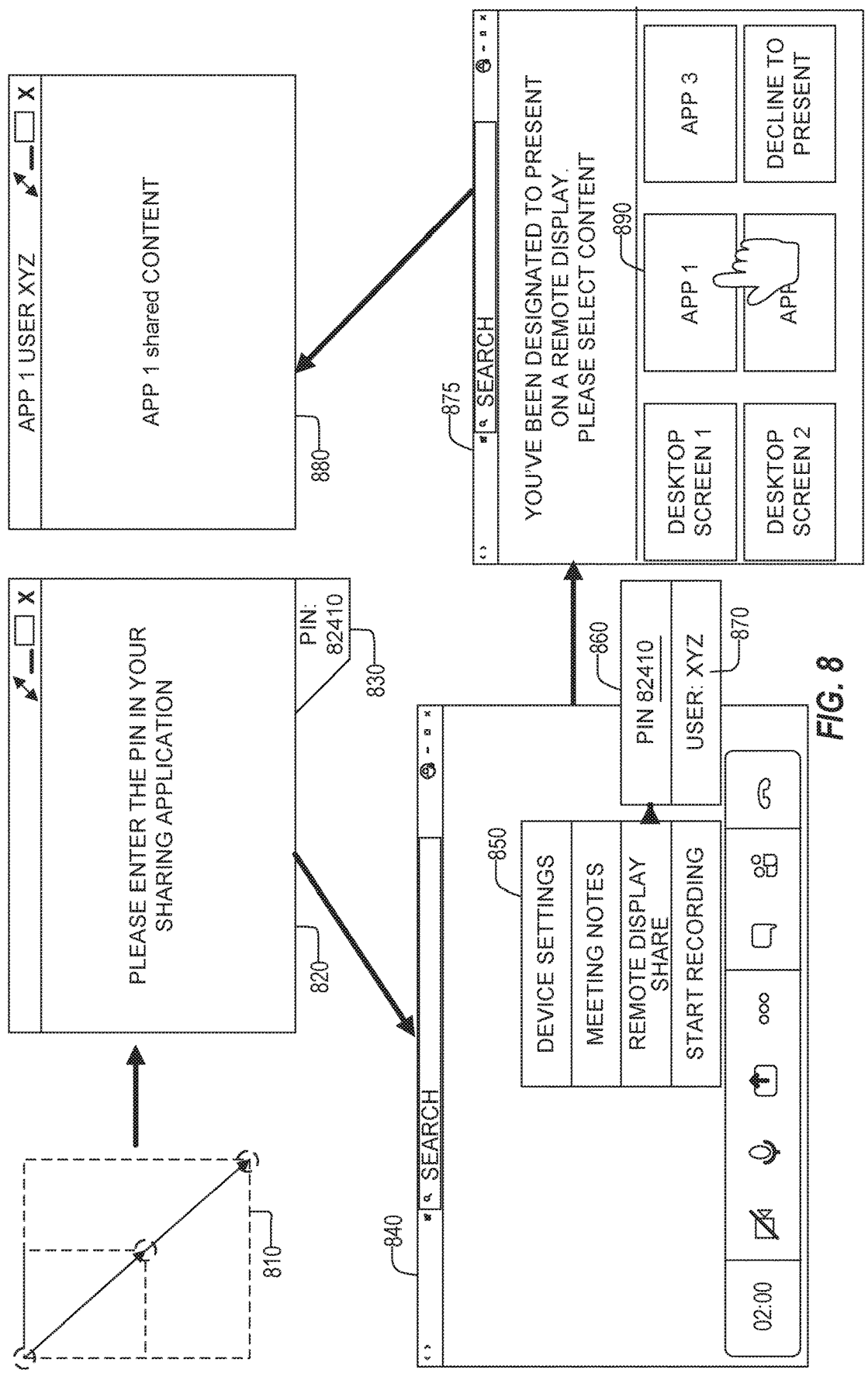
FIG. 8 illustrates a designation and pairing process for a remote content source device according to some examples of the present disclosure.

In some examples, the system may pair a remote content source device that is not physically proximate to a sub-display of the display without relying on a local computing device for continued content delivery. By not physically proximate, it is meant that a user of the remote content source device cannot see the display. FIG. 8 illustrates a flow diagram of a designation and pairing process for a remote content source device according to some examples of the present disclosure. A user in physical proximity to the display first designates a sub-display by using gestures 810 as previously described. The system may then show a PIN or other pairing mechanism as previously described, such as within a pairing tab 830 of the sub-display 820. A local user on a local computing device may be executing a communication application, such as application 840. The communication application may have an option, such as within a menu 850 for designating a content source device of a remote user for sharing to a sub-display of a local display. In FIG. 8, the option is listed as "remote display share" and upon selecting this option, a second menu may be displayed that allows a user to enter a pin at a first input area 860 of a created sub-display and designate a remote user's content source device at a second input area 870. Upon selection of these options, a communication may be sent to the remote user's computing device.

An instance of the communication application executing on the remote computing device then allows the remote user to select the application, window, or other content to share with the remote display, such as through a menu 890 of a GUI 875. Once the remote user selects the appropriate content to share, the communication application of the remote user may stream the content to the sub-display of the display, such as shown at 880. In some examples, a communication server associated with the communication application may facilitate the communication between the various instances of the communication application and with the display and/or display control system.

Figure 9:
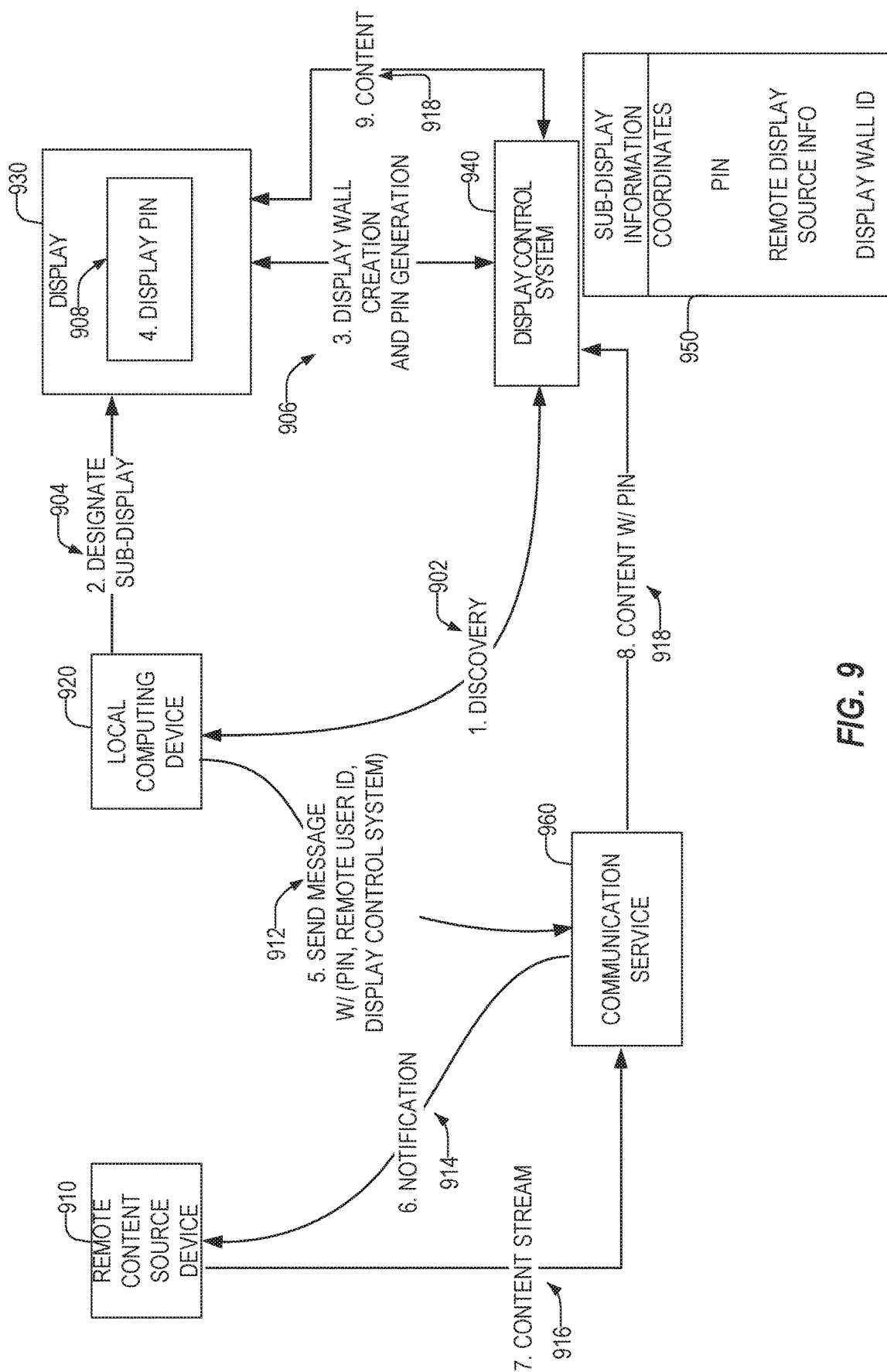
FIG. 9 illustrates a data flow according to some examples of the present disclosure of a remote content source device that is not physically proximate to the display sharing content on the display through a communication service intermediary according to some examples of the present disclosure.

FIG. 9 illustrates a data flow according to some examples of the present disclosure of a remote content source device that is not physically proximate to the display sharing content on the display through a communication service intermediary according to some examples of the present disclosure. The local computing device 920 (which may also serve as a content source device in different contexts) may discover, as previously described, a display service at operation 902 by communicating with the display control system 940. As part of the discovery process, the local computing device 920 may discover an address of the display control system 940. In some examples, due to the remote content source device 910 not being in physical proximity to the display control system 940, the remote content source device 910 may not have a way of discovering the display control system 940. For example, the broadcast messages of the display control system 940 may not reach the remote content source device 910 because they may only be broadcast over a particular sub-net or other network area that is not accessible to the remote content source device 910. In other examples, the broadcast messages may be wireless and the remote content source device 910 may be out of wireless range.

Next, at operation 904, a user of the local computing device 920 may designate a sub-display on the display using the methods previously described (e.g., by using gestures to draw an outline of the sub-display). At operation 906, the display then communicates with the display control system 940 to establish the pairing information, and a record of the sub-display. For example, by creating a data structure such as shown at 950 that has the coordinates of the sub-display, a PIN number (which uniquely identifies this sub-display on the display), a content source device info (which might be empty prior to pairing), and the display identifier (which uniquely identifies the display). As previously noted in some examples, the PIN is assigned by the display control system 940, but in other examples is created by the display. In some examples, the PIN is a unique identifier for the sub-display across the display 930, but in other examples, the PIN is a unique identifier across all displays managed by the display control system 940. In still other examples, the PIN may not be a unique identifier, but instead, a different unique identifier may be assigned by either the display control system 940 and/or the display 930.

The pairing information (e.g., the PIN) may then be displayed on the display as previously described at operation 908. The user at the local computing device 920 may then select an option in a communication application to allow a remote user of a content source device (e.g., remote content source device 910) to share content on the designated sub-display. The user of the local computing device 920 may enter the sub-display pin into a GUI element of the communication application executing on the local computing device 920 as well as a designation of the content source device or a designation of a remote user. In the example of designating the remote user (as opposed to the remote content source device itself) the system determines a remote content source device that the user is currently authenticated on.

At operation 912, the communication application on the local computing device 920 then sends a message with the PIN (or other sub-display identifier), the remote user id (or content source device id), and information (e.g., the address) about the display control system 940 to the communication service 960. The communication service 960 provides communication functionality (such as chats, video calls, audio calls, online meetings, and the like) to various devices executing the communication applications—such as local computing device 920 and remote content source device 910.

The communication service 960 receives this message and at operation 914, determines an address of the remote content source device 910 that was selected by the local computing device 920—e.g., by consulting a mapping between remote content source device 910 identifier and/or user identifiers and network addresses. The network address of the remote content source device 910 is then used to send a notification to the communication application instance executing on the remote content source device 910. The communication application instance executing on the remote content source device 910 may prompt the user to select an application or other content to share (or reject the offer to share if the user does not wish to share the content). Once the user of the remote content source device 910 selects the content, at operation 916, the remote content source device 910 may begin streaming the content to the communication service 960, which may establish a connection with the display control system 940 using the address transmitted by the local computing device 920.

At operation 918, the communication service 960 may forward the streamed content along with the PIN or other identifier of the sub-display provided by the application on the local computing device 920 to the display control system 940. The display control system 940 may then associate the communication service 960 with the sub-display identified by the PIN or other identifier (e.g., fill out the content source device info with information on either the remote content source device 910, or the communication service 960). At operation 918, the content sent from the remote content source device 910 may be sent to the display 930 where it is displayed in the sub-display.

Thus, content sent from the remote content source device 910, may be displayed on the display 930 by going through the communication service 960 and the display control system 940. As described, the PIN or some other unique sub-display identifier may be used to associate particular content with a particular sub-display. By using the communication service 960 as an intermediary, the content may also be sent, in parallel, to other participants of a network-based communication session (e.g., an online meeting) in addition to being displayed on the sub-display of the display 930.

In some examples, rather than have a designation of a remote content source device 910, the content currently presented in a network-based communication session (e.g., an online meeting) may automatically be sent by the communication service 960 to the display control system 940. The display control system 940 associates the sub-display with the network-based communication session and causes the content sent by the communication service 960 to be displayed.

In FIG. 9, the communication service 960 was utilized to facilitate the display of content from the remote content source device 910 to the display 930. In other implementations, the communication service 960 may not be involved. That is, the message with the PIN and display control system information may be sent directly from the local computing device 920 to the remote content source device 910. The content may then be directly sent from the remote content source device 910 to the display control system 940.

By decoupling the content from passing through the local computing device 920 once setup is complete, actions taken by the local computing device 920 do not affect the content displayed in the sub-display. Local computing device 920 could leave the network-based communication session and the content would continue to be displayed, so long as the communication session continues for other participants.

Input from the sub-display may also be delivered to the remote content source device 910. For example, the input may be routed back through the display control system 940, back through the communication service 960, and finally to an application on the remote content source device 910. Thus, input on the sub-display of display 930—entered by local users, may appear on the remote content source device 910. In some examples, the communication service 960 and/or the communication application may have various rules on what inputs are allowed and what inputs are not allowed. While the example of FIG. 9 used a communication application and a communication service 960, one of ordinary skill in the art with the benefit of the present disclosure will appreciate that other applications and services may be used if they implement the functionality of FIG. 9.

As shown, in FIG. 9, the local computing device 920 provided a PIN or other pairing information of the sub-display. In some examples, rather than a PIN, the local computing device 920 may provide any pairing information. For example, a biometric pairing. That is, the user of local computing device 920 may enter their biometric into the pairing input area of the display. The display may scan the biometric and send the biometric scan data to the display control system. The display control system may store the biometric scan data in the sub-display information 950. The communication service 960 may then pair with the sub-display by sending biometric data of the user of local computing device 920. This biometric data may be scanned by the local computing device 920 ahead of time or when the sub-display is created. In some examples, the biometric data of the user of the local computing device 920 may be stored at the communication service 960.

As previously described, the local computing device 920 may provide any pairing information. This may be generalized further by stating that the local computing device 920 may provide any sub-display identifier. Example sub-display identifiers include PIN numbers, alphanumeric sequences, biometric information, sub-display titles, and the like.

Additionally, as described in FIG. 9, the local computing device 920 may send to the communication service 960 an address of the display control system 940 discovered using a broadcast message (or using some other method). In other examples, the communication service 960 may already have the display control system address. For example, the display control system 940 may be an in-room meeting room system that may register with the communication service 960. In some examples, the communication service 960 may be aware of a plurality of display control systems 940 and may select the appropriate display control system to send content to based upon a location of the local computing device 920 and the display 930 (and which displays 930 the display control system 940 control), a selection by local computing device 920, or the like.

In some examples, the local computing device 920 may not be part of the flow of FIG. 9. That is, a local user may designate the sub-display, and select the remote content source device from a UI of the display 930. The display 930 may pass the information on the sub-display, including the designated remote content source device 910 (or a user of the remote content source device 910) to the display control system 940. Display control system may then send a message (e.g., message 912) to the communication service 960. Display control system 940 and communication service 960 may be in communication as a result of the display control system 940 being registered with the communication service 960 and/or the display control system 940 being admitted to a network-based communication (e.g., an online meeting) provided by the communication service 960.

Input Sub-Displays

As previously noted, a sub-display may accept input that is forwarded to an application on a content source device that is paired with the sub-display. In some examples, a sub-display may be designated that does not display content, but rather is exclusively for accepting input. In some examples, such a sub-display may show the input (e.g., either permanently or temporarily—such as a for a predetermined time), but in other examples it may not show the input.

Figure 10:
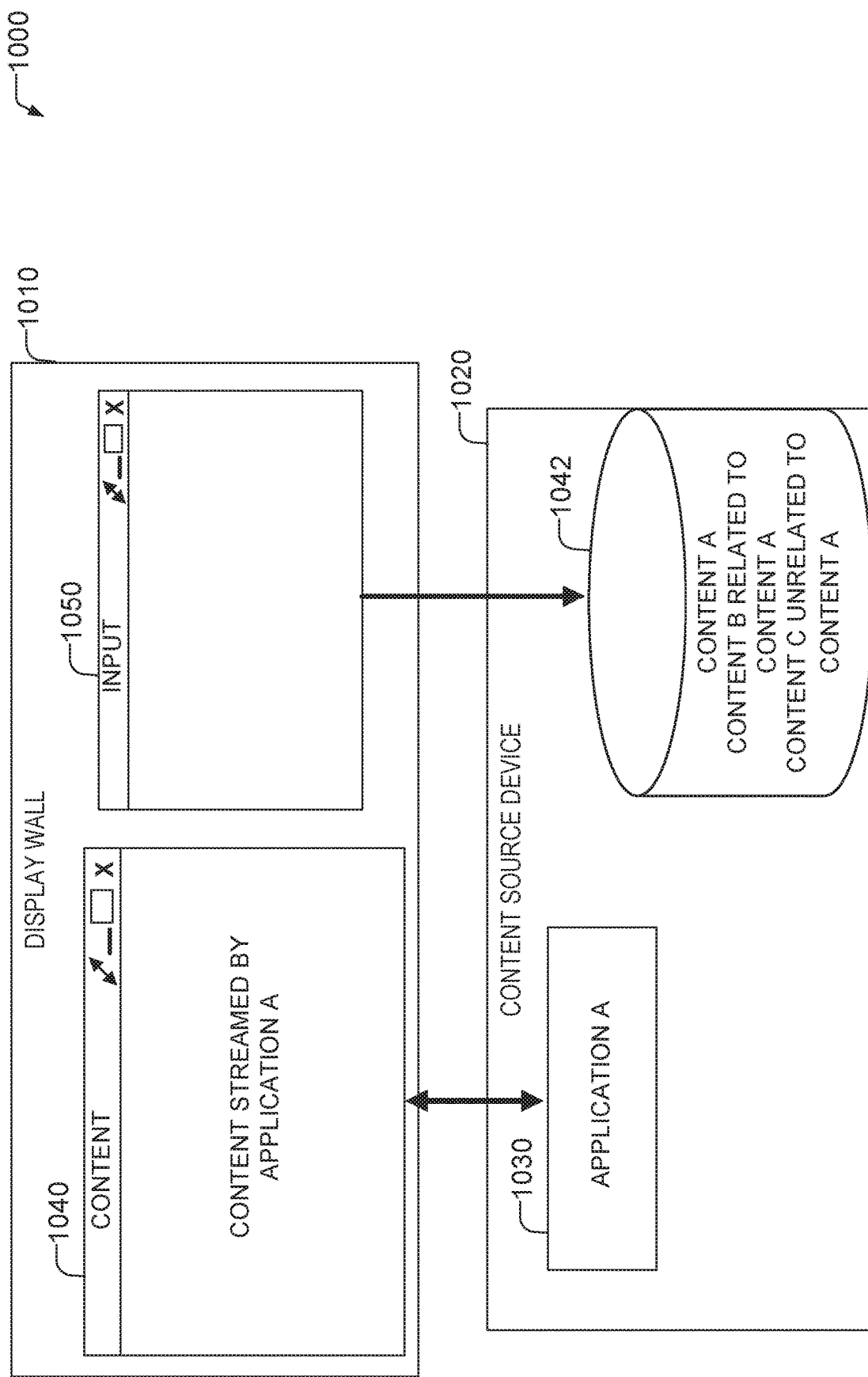
FIG. 10 illustrates a display with two designated sub-displays, one for input, according to some examples of the present disclosure.

FIG. 10 illustrates a display with two designated sub-displays, one exclusively for input, according to some examples of the present disclosure. Sub-display 1040 may be a sub-display that may show content streamed by application A 1030 on the content source device 1020. The application A 1030 executes on the content source device 1020. Input directed to the sub-display 1040, such as a touch gesture within the sub-display 1040, may be sent to application A 1030. For example, the input may be an input that is treated by application A 1030 as if it was an input local to the content source device 1020. An input "local" to a device is an input produced by an input device coupled through a local interface (e.g., Universal Serial Bus (USB), Peripheral Component Interconnect (PCI), or the like).

In contrast, sub-display 1050 may be an input-only sub-display. That is, input from the sub-display 1050 may be sent to one or more applications executing on the linked content source device, such as content source device 1020. This may include application A 1030 or be a different application than application A 1030. In some examples, the input directed to the sub-display 1050 may be treated the same way as input to the sub-display 1040—that is, processed as a local input to application A 1030. In other examples, the input to sub-display 1050 may be related to the content streamed by application A 1030 that is displayed in the sub-display 1040, but the input may not be an edit to that content. For example, the input to the sub-display 1050 may edit content supplemental to the content displayed in sub-display 1040. Supplemental content is content that comments on, adds to, or otherwise supplements the content displayed. As a more specific example, a user may display a slide show presentation in the sub-display 1040 and write notes for each slide in the sub-display 1050. The notes may be saved in a notes file for each slide. That is, the notes may be saved in a notes file that corresponds to the specific slide shown in the sub-display 1040. More generally, the input into the sub-display 1050 may be correlated to the specific content shown in the sub-display 1040. Other specific examples include notes about a video displayed (e.g., the notes being correlated to the video based upon a playback time), a document being edited (e.g., the input being a comment in the document that is inserted at the active point of editing), and the like.

In other examples, the content may not relate at all to what is displayed in the sub-display 1040. For example, the input directed at the sub-display 1050 may simply be stored in a file or other storage of the content source device 1020. The input directed to the sub-display 1050 may be stored in a data storage device 1042 and may be stored with the content streamed by application A 1030 or separately.

In some examples, the input directed to the sub-display 1050 may be displayed in the sub-display 1050. In other examples, the input directed to the sub-display 1050 is not displayed in the sub-display 1050. In the examples in which the input directed to the sub-display 1050 is not displayed in the sub-display 1050, this facilitates candid note taking as the input is not reproduced for public viewing. That is, during a presentation the presenter may record thoughts about the presentation that are then saved for later use without the audience being able to read the notes.

In some examples, the destination of the input of a sub-display may be user controllable. For example, once the content source device 1020 is linked to a given sub-display, the user may select from a plurality of options on where to send input on any given sub-display and whether to display any input entered. If the input modifies content being shared to a different sub-display (e.g., the input to the sub-display 1050 modifies content shared in sub-display 1040), the input may be displayed by virtue of updating the content shared. However, input that does not edit content shared on a different sub-display may either be displayed or may not be displayed—depending on implementation and/or user preferences. User selections of whether or not to display the input may be made on the content source device 1020 (e.g., in a user interface of the application that communicates with the display control system such as a streaming application or an operating system) or on the display. For example, selections may be made when the sub-display is setup, in a context menu of the sub-display, or the like.

To create an input-only sub-display such as input-only sub-display 1050, the user may utilize a different gesture to create the input-only sub-display, may call up a context menu during creation of the sub-display to indicate that the display is input-only, may change the sub-display to be an input-only sub-display after sub-display creation, and/or the like. The user may also choose whether to display input on the sub-display. That is, even if the sub-display 1050 does not display content, the system (e.g., the display, the display control system, or the content source device 1020) may show the input on the sub-display. For example, if the user writes notes in the input only sub-display the sub-display may show the notes. In other examples, the input is not shown on the sub-display.

In order to route the input of either sub-display 1040 or sub-display 1050, the content source device 1020 may have a table mapping input from particular sub-displays to particular actions. For example, a rule may specify that the input directed to sub-display 1040 is to be directed to application A 1030 as if it were local input and input directed to the sub-display 1050 is to be directed to a notes file associated with a currently displayed item of content displayed by application A 1030. The table may list sub-display identifiers and where the input is to be sent and/or how the input is to be processed. Upon receipt of input from the display 1010 or the display control system, the identifier of the sub-display the input was received in is used to index the table to determine how to process the input.

Notifications

In some examples, a sub-display may be configured to display one or more notifications from the content source device. These notifications may be identified at the content source device 1020. For example, a new mail notification for an email account associated with a user of the content source device; application notifications; communication notifications such as new message notifications; call notifications; and the like. Notifications may be generated by application programs executing on the content source device. In some examples, these notifications may not be related to the sub-display service. The notifications may also be generated by the application that is sharing content in a sub-display that is displaying the notification or may be generated by a different application.

Figure 11:
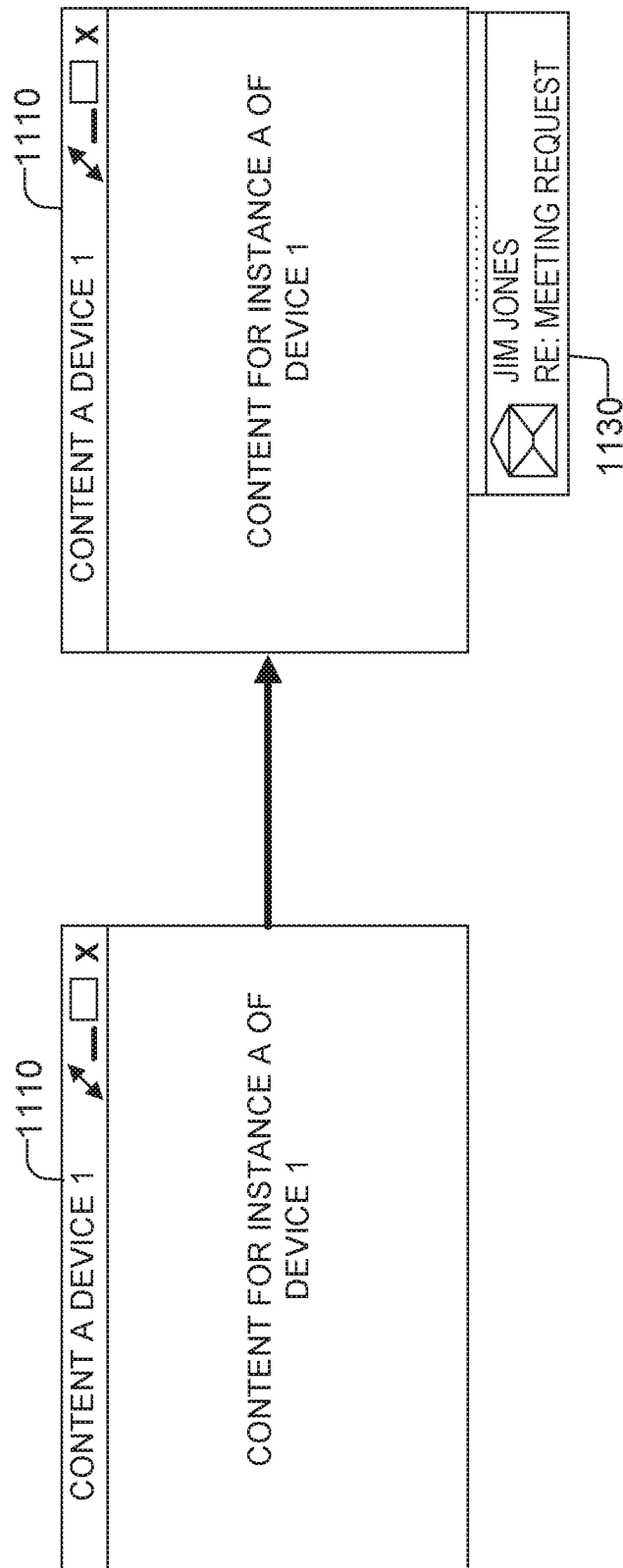
FIG. 11 illustrates an example of a sub-display with a notification area according to some examples of the present disclosure.

The notifications may be displayed within the sub-display, may be displayed in a notification area adjacent to the sub-display, or the like. FIG. 11 illustrates an example of a sub-display 1110 with a notification area 1130 according to some examples of the present disclosure. Notification area 1130 may be a pull out, pop-up, or other area. In some examples, the notification area 1130 may not be part of the sub-display. In other examples, the notification area 1130 may be part of the sub-display. Sub-display 1110 shows content for application A of content source device 1. Content source device 1 receives or otherwise identifies information that, according to instructions of one or more applications, generates a notification to the user—e.g., via a notification application programming interface (API) of an operating system of the content source device 1. In some examples, the content source device 1 may have rules that specify which notifications are to be displayed to a user on a remote display and how those notifications are to be shown. For example, the content source device 1 may provide a user interface which allows users to choose which notifications from which applications are displayed on a remote display. For example, which notification types are displayed. These rules may differ from rules used to determine when a notification is to be generated in the first instance.

The contents source device 1 then sends a notification indicator along with the content of the notification to the display or display control system along with the sub-display identifier (e.g., the PIN). The display or display control system then shows the notification—for example, in the sub-display 1110, in a notification area, such as notification area 1130. In some examples, the notification area may be a visually distinct area adjacent to and sharing a border with the outline of the sub-display 1110. The notification area 1130 may not overlap the sub-display 1110. The notification may be displayed until dismissed by the user through an input (e.g., a gesture of a particular specified type) directed to the notification on the sub-display, dismissed on the content source device, or may be displayed for a predetermined period of time. A content source device may also send a message to the display or display control system to remove or otherwise modify the notification.

In some examples, the notification area 1130 may allow for input, such as gestures that allow actions to be taken on the notifications. For example, a predefined gesture may dismiss the notification—causing it to no longer be displayed. Other gestures may cause the display of the application on the content source device that generated the application. Responsive to certain gestures, information about the notification may be displayed in either the sub-display to which the notification is attached (sub-display 1110 in FIG. 11), a different sub-display, or a new (automatically created) sub-display. For example, if the notification is a new email notification, then a specific gesture may open the email.

In some examples, whether the information on the notification is displayed in the sub-display to which the notification is associated, a different sub-display, or whether it is displayed in a new sub-display may be based upon the gesture. One gesture may open a new sub-display and another gesture may display the information in the already opened sub-display. For example, if the user touches on the notification and drags the notification away from the sub-display (e.g., like it is "tearing" the notification away)—the system may open a new sub-display to display information about the notification. In other examples, if the user taps the notification, then information on the notification may be opened in the current sub-display (e.g., sub-display 1110).

In some examples, specified gestures may allow for entry of inline replies to certain communication-related notifications. For example, a gesture may cause a display of an input field to allow a user to enter text to reply to an email or text message in an input box in the notification area.

Notifications may be content-sensitive in that certain content on notifications may be blurred, or the notification may not be displayed based upon the content. For example, if the notification is an email, the user may setup the system such that email from certain users, with certain keywords, or otherwise matching defined criteria, may be blurred, not shown, or the like.

In addition to receiving a notification indication from the content source device, the display and/or display control system may detect a notification window within the content shared by the content source device. This notification may be split into a notification sub-display. The notification sub-display may be docked to the main sub-display in the form of a notification area 1130. The display control system may modify, crop, or otherwise remove the notification from the content shared so that the notification shown in the notification sub-display is the only instance of that notification that is shown. The display control system may detect notifications as features using the methods described herein for detecting communication modalities.

Different Sub-Displays for Different Modalities

In some examples, the display system may automatically create one or more sub-displays based upon activities, applications, and/or contexts of applications executing on a particular content source device that is paired with a sub-display. For example, the content source device may be executing a communication application that may provide a plurality of communication modalities. Example modalities include network-based communications such as chat communications, voice communications (e.g., Voice over Internet Protocol—VoIP), video calls, online meetings, file sharing, group chats, topic-based group chat and the like. Topic-based group chat may be a chat with one or more persons that is organized by a particular topic or group (e.g., a team).

Figure 12:
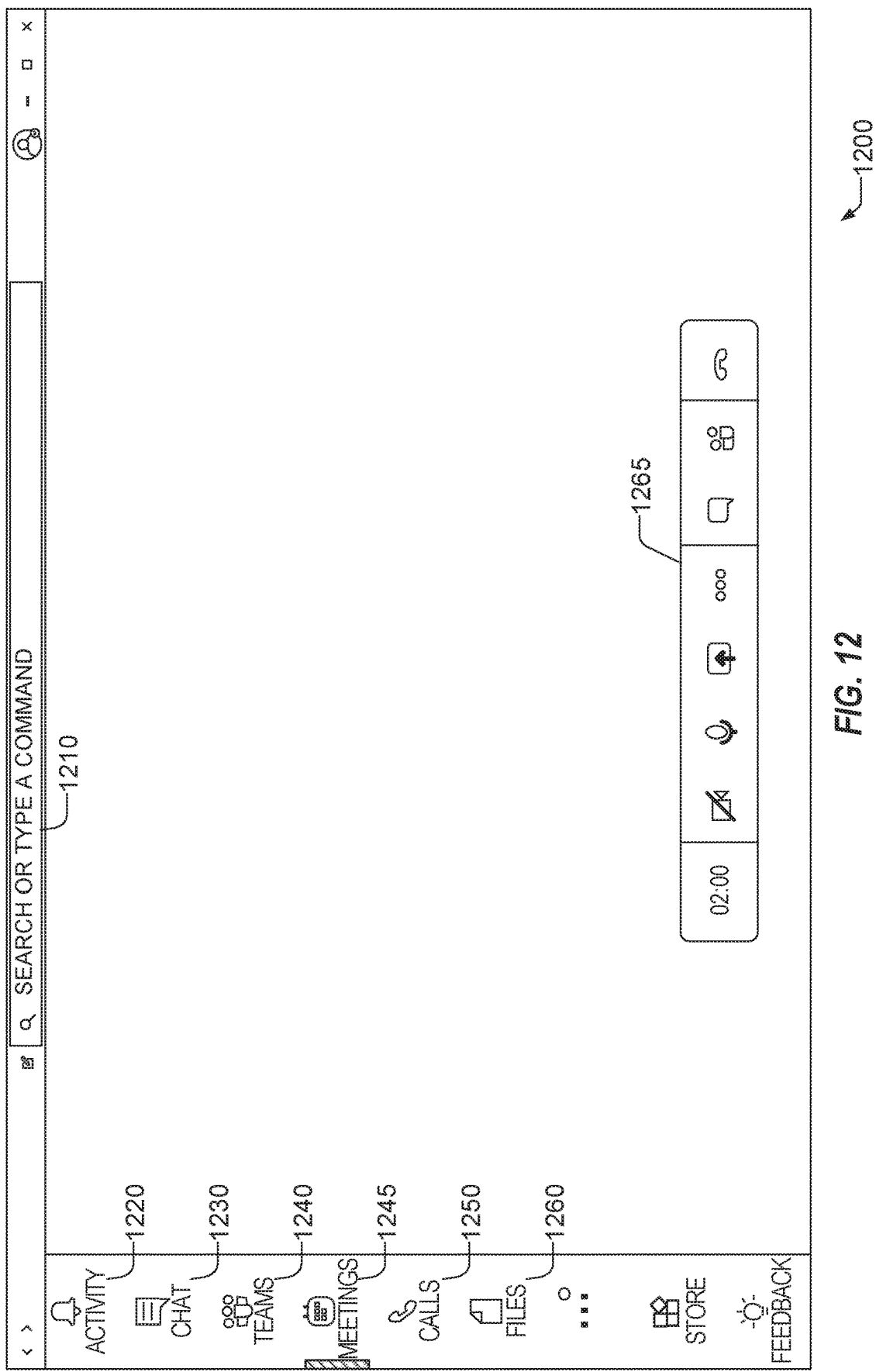
FIG. 12 shows an example of a graphical user interface (GUI) of a communication application according to some examples of the present disclosure.

FIG. 12 shows an example of a graphical user interface (GUI) 1200 of a communication application according to some examples of the present disclosure. Command and search bar 1210 allows users to type in one or more commands or search for files, communications, application features, and the like. On the left, there are various icons for accessing various communication modalities provided by the communication application. Activity icon 1220, when selected, provides a list of recent communications involving the user or groups of which the user is a part of. The chat icon 1230, when selected, provides the user with functionality to initiate or participate in text communications with one or more other users. The teams icon 1240, when selected, provides the user with functionality for creating, modifying, managing, and participating in topical, group-based communications. The meetings icon 1245, when selected, provides the user with functionality to create, manage, and participate in network-based communications (e.g., network-based meetings) where the users can share voice, video, and/or content with one or more users and with the display. The calls icon 1250, when selected, provides the user with functionality to call another user using VoIP and/or video calling other users. Files icon 1260, when selected, allows users to view the files associated with one or more other communication modalities available to the user through the communication application. For example, such as files exchanged in one or more teams, in a chat, shared during a call or meeting, or the like. In some examples, the files icon 1260 also allows users to share files between each other. The GUI 1200 shows the meetings icon selected and a GUI of an active meeting with a meeting control bar 1265.

Figure 13:
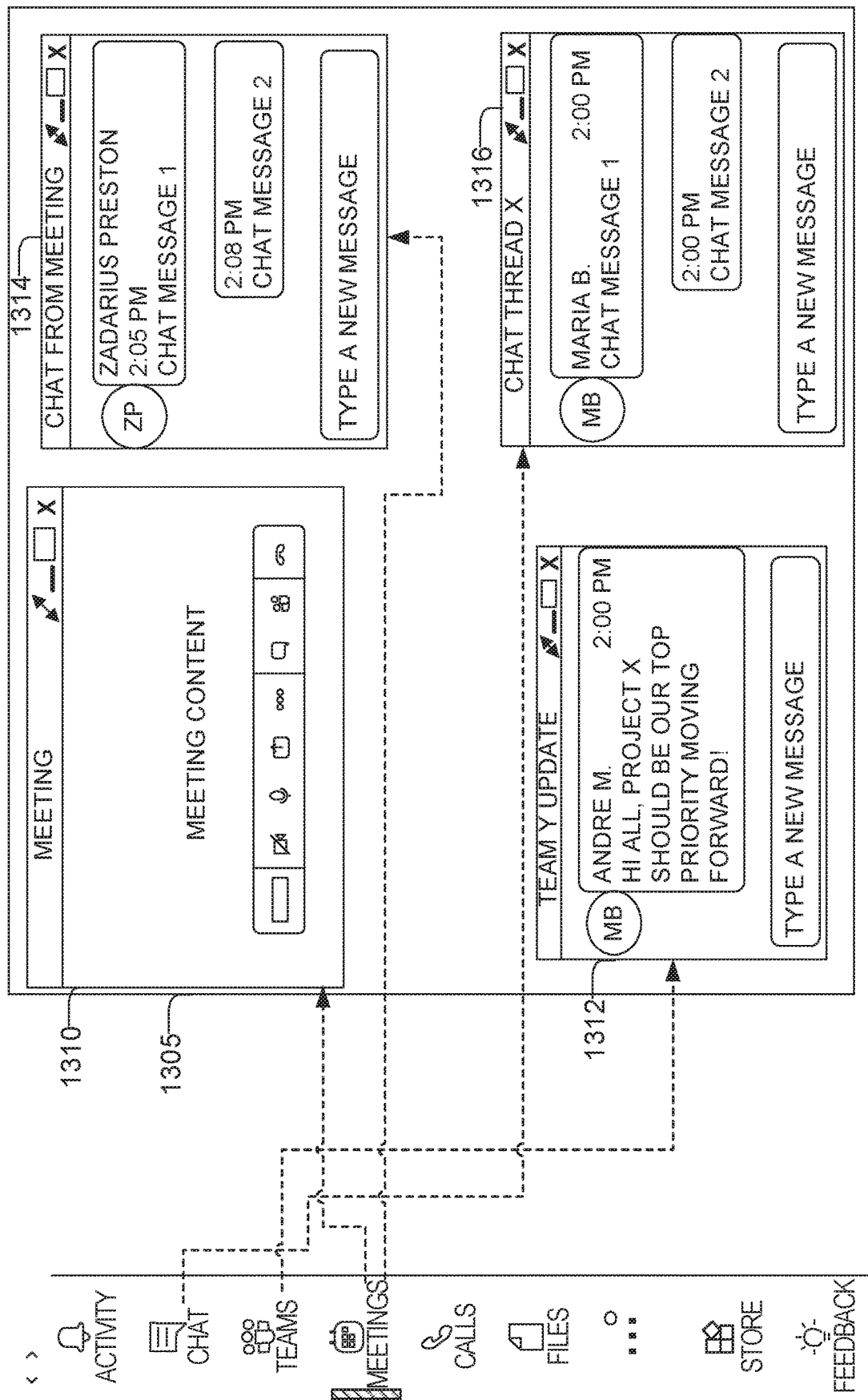
FIG. 13 illustrates a display with multiple sub-displays corresponding to multiple communication modalities of the communication application according to some examples of the present disclosure.

FIG. 13 illustrates a display 1305 with multiple sub-displays corresponding to multiple communication modalities of the communication application according to some examples of the present disclosure. As can be appreciated and as disclosed herein, multiple independent sub-displays may display different content from a same application of a same content source device. As shown in FIG. 13, the display 1305 has multiple sub-displays that are linked to a same application on a same content source device and are displaying different communication modalities (e.g., different content) of the application. In FIG. 13, the communication application of FIG. 12 is sharing different communication modalities to different sub-displays. For example, sub-display 1310 may show the contents of a primary display area of a meeting that a user is currently engaged in. At the same time, sub-display 1314 may show a chat window for a chat session that corresponds to the meeting. The chat session corresponding to the meeting may be a chat session automatically setup that allows meeting participants to have a text chat with each other simultaneously while content is being presented. Sub-display 1316 may display a chat thread that is not associated with the meeting displayed in the sub-display 1310. Sub-display 1312 may display one or more conversations from one or more of the teams of the communication application. In the example of FIG. 13, a conversation from team Y.

The sub-displays showing the different communication modalities may be created manually—for example, the user may select the different modalities within the communication application and link them to the various sub-displays using a mechanism shown in FIG. 7, wherein the "app" selection may include the various communication mechanisms. Thus, in addition to a selection of applications (e.g., "APP 1," "APP 2", "APP 3" as shown in FIG. 7), the selection screen may include various communication modalities such as teams, chats, meetings, and the like. In addition, the user may have an option in a context menu corresponding to the communication modality to share the modality in a sub-display. Upon selecting a particular modality, the communication application prompts the user for the pairing information of the sub-display, and then begins sharing the communication modality on the sub-display.

In other examples, the communication application and/or the display control system may automatically create one or more sub-displays to display one or more of the various communication modalities. For example, if a first sub-display is setup that is linked to the communication application, other sub-displays may be automatically created and linked to the communication application with each sub-display displaying a different one of the communication modalities provided by the communication application. In some examples, the system may prompt the user before automatically creating one or more sub-displays for the one or more communication modalities, but in other examples, the system may automatically create the sub-displays without user confirmation or input.

In some examples, the system may create a sub-display for each offered communication modality provided by the communication application. In other examples, the system may create sub-displays for only certain communication modalities. For example, sub-displays may be created for communication modalities based upon usage history. In these examples, sub-displays may be created for a prespecified number x of the most recently used modalities. In some examples, x may be based upon the amount of space available on the display. That is, the free space not occupied by sub-displays may be used to determine how many sub-displays to open for the communication modalities, along with the size of the sub-displays. The sub-displays may change based upon usage history. Thus, if the top three most recently used communication modalities are shown, the content shown in the three sub-displays may change as usage of the communication modalities changes. Thus, content of a recently used communication modality may displace content of a less recently used communication modality in a particular sub-display. In some examples, users may "pin" certain modalities, such that they cannot be displaced by other communication modalities. As usage of the display changes (e.g., users close sub-displays) x may increase as free space on the display increases and additional modalities may be selected for display.

In other examples, other methods of choosing the communication modalities may be utilized, such as user preferences. The user may set up one or more rules for sharing one or more of the modalities. For example, the user may specify that upon discovering a display control system and linking a first modality, certain other modalities may be automatically displayed. In some examples, conditions for determine which modalities to be displayed may include the manually linked first modality (e.g., the first modality displayed may have other associated modalities that are to be displayed), communication activity and usage history of modalities, location of the user, content of the modality (e.g., the system may exclude content with certain words, images, or sensitive material as defined by the user), and the like.

In some examples, a past sub-display history of the user may be utilized to automatically select one or more modalities. For example, if the user in the past created three sub-displays and linked modalities A, B, and C; then the system may, upon recognizing that the user has linked a sub-display to modality A, automatically create sub-displays and link modalities B and C (or prompt the user asking if they would like to create sub-displays for modalities B and C).

Predictions of what modalities a user may be interested in sharing on a sub-display may be made by one or more machine-learned models that are trained with training data which may (or may not be) labelled with the modalities that users manually paired with a sub-display. The training data may be per-user, across all users, across groups of users, and the like. Training data may include communication activity on available modalities such as last activity, total activity, frequency of activity, recent activity levels, and the like; content of the modalities such as keywords, images, and the like; type of modalities; and/or the like. The model may be a logistic regression, neural network, a decision forest, a boosted decision tree, a support vector machine, a Singular Value Decomposition (SVD) recommender, or the like. During usage, current feature data on the modalities—such as the current communication activity, current content of the modalities and the like may be used as input to the model which may output a list of modalities that may be automatically created and/or suggested to the user and/or linked to automatically created sub-displays. The feature data may be current communication activity on available modalities such as last activity, total activity, frequency of activity, recent activity levels, and the like; content of the modalities such as keywords, images, and the like; type of modalities; and/or the like.

In some examples, sizes of the automatically created sub-displays may be predetermined or may be determined based upon one or more features. For example, each modality may have a particular defined size. In other examples, each modality may have a particular minimum and/or maximum size with the actual size set based upon activity of the modality. For example, a chat modality may have a certain minimum size to display the chat. In addition, the size may be set or modified by a communication history of the modality, such as setting the size of a sub-display so as to display all messages received within a defined time period. In some examples, the size may be based upon an available space on the display. For example, if the display has enough space to open a sub-display capable of displaying ten past messages, then the most recently received ten messages may be displayed.

As noted above the system may suggest adding or automatically add additional sub-displays to users, for example, to display additional communication modalities. More generally, the same process described above may also be applied to other content sources executing on the content source device. Content sources may include multiple content items on a same application (such as different communication modalities), different applications, and the like. For example, the system may suggest opening a sub-display for another application executing on the content source device or may suggest opening a sub-display for a different piece of content in a same application. Thus, if a web browser is displaying two videos, a first video being shared in a sub-display, the system may suggest sharing the second video in a second sub-display.

Figure 14:
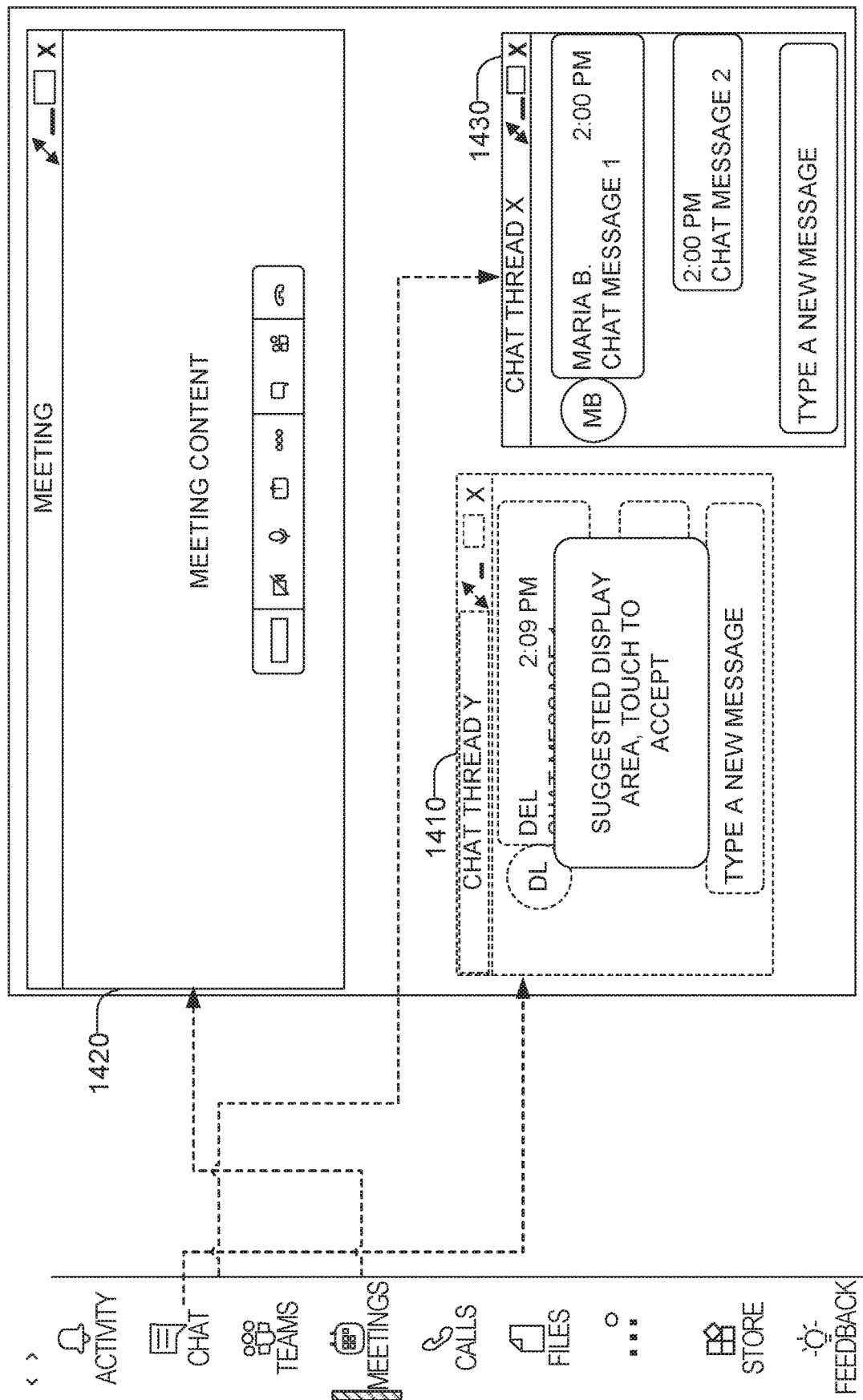
FIG. 14 shows an illustration of a suggested additional sub-display according to some examples of the present disclosure.

FIG. 14 shows an illustration of a suggested additional sub-display 1410 according to some examples of the present disclosure. In the example of FIG. 14, the system may suggest another sub-display 1410 that displays a different content source (e.g., a different communication modality) of a communication application. For example, the user may have already defined sub-displays 1420 which shows meeting content and sub-displays 1430 which shows a chat thread. Another chat thread may be suggested by the system based upon a combination of available sub-display space and additional content to share. For example, a conversation thread may become active by receiving a message in the thread from another participant or by the user sending a message in the thread.

As shown in FIG. 14, the system may provide the suggestion by showing an outline or shadow version of the suggested sub-display and may include a shadow version of the content that would be displayed. As in FIG. 14, an area of the sub-display is designated to obtain approval of the user to accept the suggested sub-display. In some examples, if the user does not accept within a threshold period of time it is assumed that the user does not accept the suggested sub-display and the suggested sub-display 1410 disappears. In other examples, a rejection control is displayed that allows the user to reject the suggested sub-display. In some examples, users may turn off these suggestions.

Figure 15:
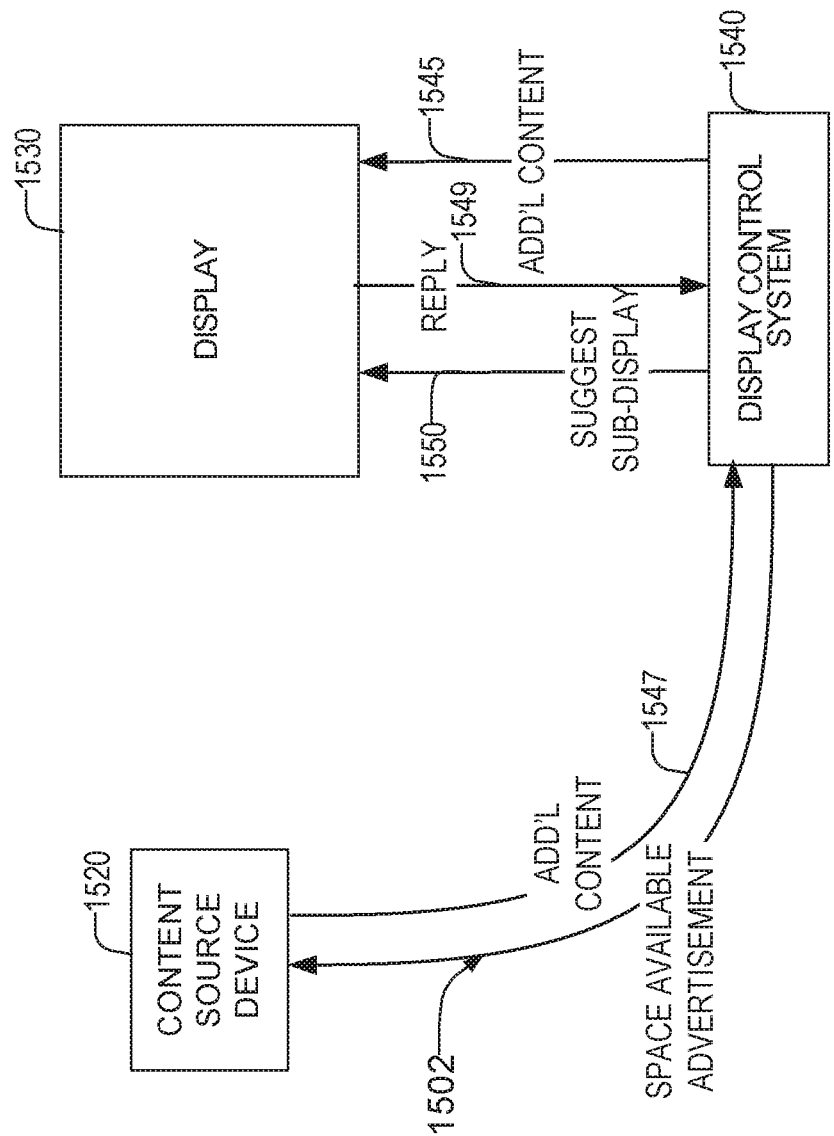
FIG. 15 illustrates a data flow of a suggested sub-display according to some examples of the present disclosure.

FIG. 15 illustrates a data flow of a suggested sub-display according to some examples of the present disclosure. Display control system 1540 may determine that additional space is available (e.g., a minimum amount of space is not currently occupied by a sub-display) on the display 1530 for additional sub-displays. The display control system 1540 may send a notification 1502 to the content source device 1520 that additional space is available.

In response, the content source device 1520 may determine if any additional content is available for display and whether that content should be displayed (either automatically or suggested to the user). The content source device 1520 may apply the above-mentioned models, rules, or the like to determine suggested content. The content source device 1520 may also apply user selectable settings and rules that may prevent certain content from being displayed or suggested to prevent the suggestion or display of embarrassing or sensitive content.

If additional content is available that complies with the user's settings, the content source device 1520 may begin streaming the content to the display control system 1540. The display control system 1540 may send a message 1550 suggesting a sub-display to the display 1530. The message may provide coordinates and sizing of the suggested sub-display. The display control system 1540 may create a sub-display record (such as described in FIG. 9) for the suggested sub-display. The sub-display record may have one or more fields that indicate that the sub-display is merely suggested. The message may also include a preview of the content 1547. The display 1530 may display the suggested display as described in FIG. 14.

The display 1530 sends a response 1549 indicating whether the user accepted the suggested sub-display. If the user accepted the suggested sub-display, then the sub-display record may be changed to reflect that it is no longer a suggested sub-display and is an actual sub-display. The display control system 1540 may begin sending the additional content 1545 to the display 1530. The display may then cause the sub-display to be shown with the additional content 1545.

Figure 16:
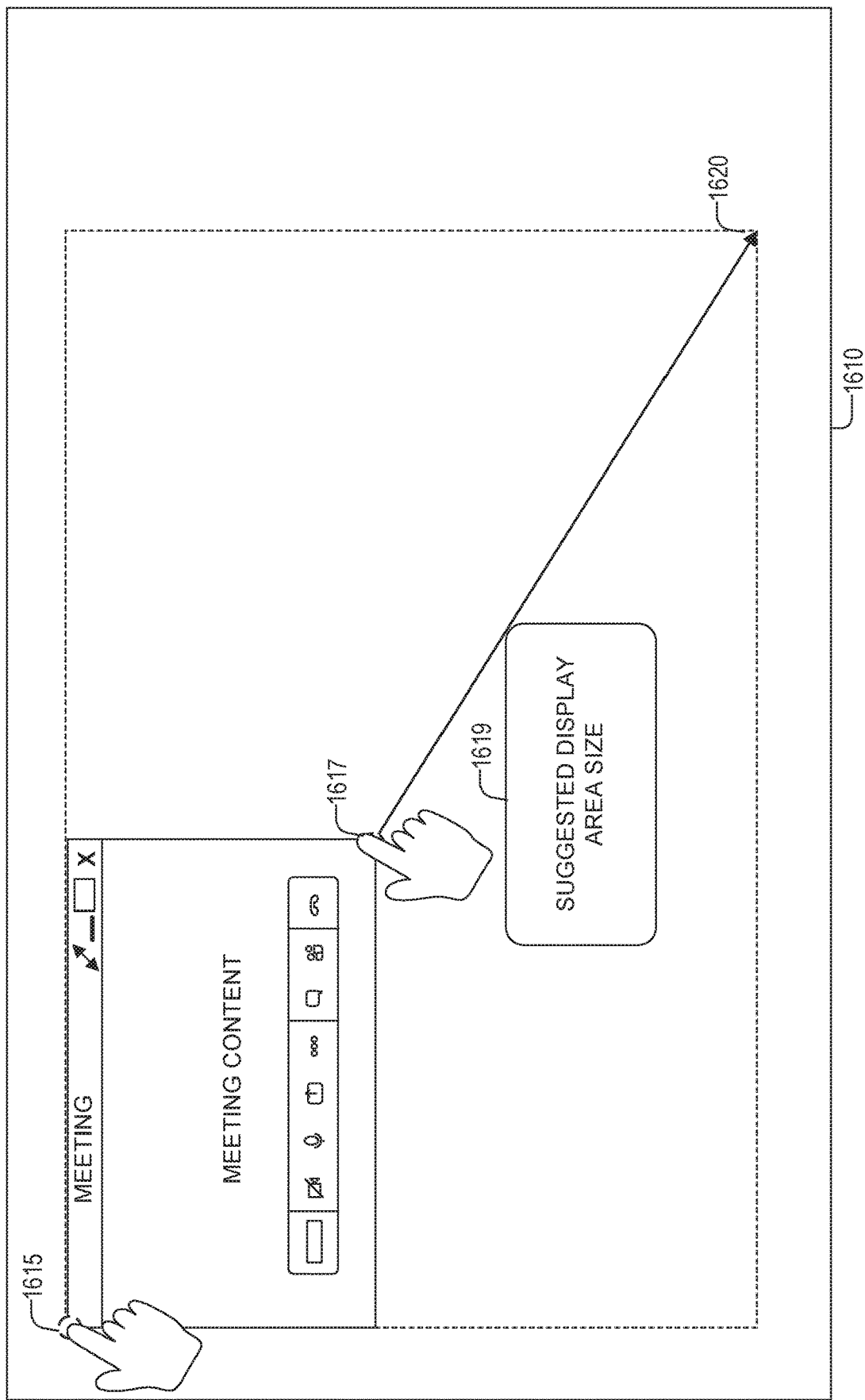
FIG. 16 shows an illustration of a suggested display size change according to some examples of the present disclosure.

In addition to suggesting content for display in a sub-display, the system may suggest increasing or decreasing a size of an already created sub-display. FIG. 16 shows an illustration of a suggested display size change according to some examples of the present disclosure. A user has started to designate a display area 1615 by touching in a first upper-left corner of a display 1610. As the user slides their finger to a lower right corner 1617 of the sub-display, the system recognizes that additional space is available on the display. A pop-up box 1619 may be displayed indicating that additional space is available and offering a suggested display size 1620. If the user has not released their finger, they may continue to slide their finger to enlarge the sub-display until the suggested size (or some other size) is reached and then, by releasing their finger, the sub-display may be created as a rectangle with opposite vertices as the start and end touch points. In other examples, the user may release their finger (or use another finger) and tap the pop-up box 1619 to automatically increase the size of the sub-display to match the suggested sub-display size.

In other examples, the sub-display size may be suggested after the sub-display is already created. For example, the sub-display may be created, and then a prompt may allow a user, by use of an input field (e.g., an onscreen button), to accept a suggested resize of the sub-display. The suggestion to resize a sub-display may be made based upon available space on the display and/or the suitability of the current size to the displayed content.

For example, if the size of the content is such that scroll bars are present or if the content is scaled in the sub-display, and there is enough room on the display to increase the size of the sub-display such that the content is no longer scaled or there is no longer a need for scroll bars, then the system may suggest a larger sub-display.

A suggested sub-display increase may be responsive to the display gaining free space by the closing of one or more sub-displays. The display and/or display control system may monitor the display and suggest, based upon new free space and/or the content displayed in a particular sub-display that one or more sub-displays increase their size.

In the previous examples, systems were described that provided suggestions to users to share additional communication modalities in separate sub-displays. These suggestions were identified by an application executing on the content source device. In additional examples, instead of an application on the content source device identifying the additional modalities, the display control system may identify separate features (such as separate modalities or notifications) in shared content provided by a content source device. The display control system may automatically split (with or without user approval) those modalities into different sub-displays.

For example, a content source device may share a window of a communication application on a sub-display. The display control system may receive this content and determine one or more features of the content prior to causing the display of this content. The display control system may split one or more of those features off into their own separate and independent sub-displays that are automatically created. The decision may be based upon the detected features, the settings of the display control system, user settings, and/or the like. For example, the user settings may specify the features that are to be split into their own sub-displays and/or the conditions for doing so (e.g., using if-then rules). The display control system may also cause the content displayed in the first sub-display to omit a visual representation of features that are split off into their own sub-displays (e.g., by cropping the feature out). That is, the display control system may be trained to detect certain features in the content that are to be split into an independent sub-display and may not display those features in the content in the sub-display that is to display the original content.

In some examples, the features to split may be specified via explicit user preferences. In other examples, past user history may be used to determine the features that are split.

That is, if the user has frequently manually split a chat session of a communication application off into its own sub-display, the system may predict that the user will do the same in this instance and may automatically perform that action. For example, the system may train a machine-learning model based upon the detected shared content features and labels indicating whether the user has, in the past, split those features into their own sub-displays. The model may then predict, in a given situation, whether the user is likely to split those features into their own sub-displays. If the user is likely to split those features into their own sub-displays, the system may automatically split those features—or ask the user if they would like the system to split those features. Example machine learning algorithms may include logistic regression, neural networks, decision forests, decision trees, support vector machine, and/or the like.

Figure 43:
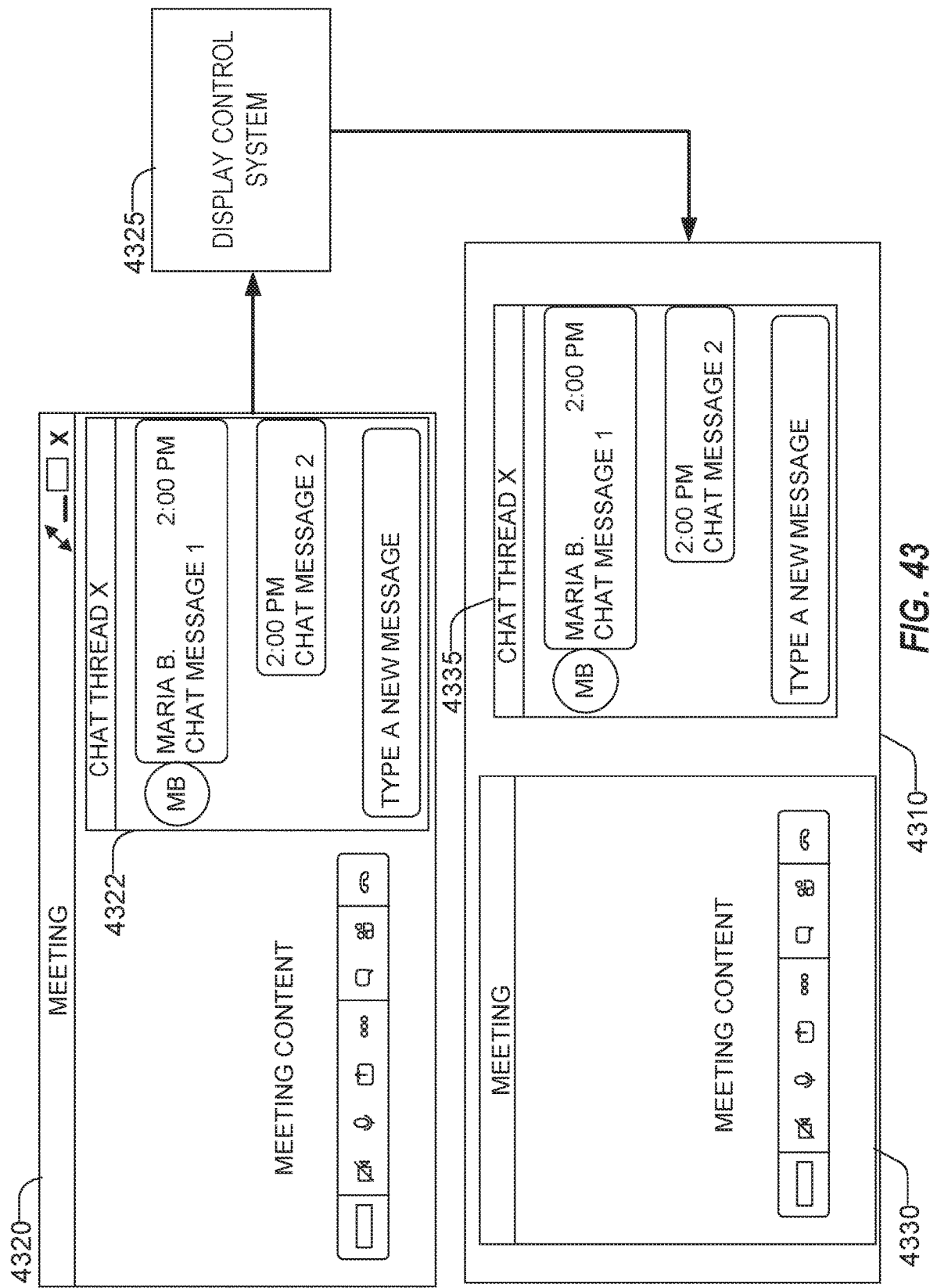
FIG. 43 illustrates a content splitting flow according to some examples of the present disclosure.

FIG. 43 illustrates a content splitting flow according to some examples of the present disclosure. A screen of a communications application 4320 is shared by a content source device. The screen currently shows a network-based meeting with meeting content and a sub-display with a chat thread 4322. The chat thread 4322 may be related to the meeting or may be a separate chat thread. Display control system 4325 may receive this content. As noted previously the content may be information about the display (e.g., a graphical description of the display, video frames, or the like), application data used to recreate the display, meeting content, chat content, or the like. Display control system 4325 may detect the chat thread 4322 as a feature of the content and may assign that chat thread 4322 to be displayed in a second sub-display 4335 on the display 4310. The rest of the content from the screen of the communications application 4320 is shown in sub-display 4330—without the chat thread 4335. For example, the detected chat thread 4322 may be cropped from the screen of the communications application 4320 prior to display in the sub-display 4330. In other examples, the detected chat thread 4322 may be redacted (e.g., blacked out), removed from the content, or otherwise not displayed. In some examples, the detected chat thread 4322 may still be displayed in the sub display 4330.

In examples in which the content is video frame content, the display control system may utilize computer image recognition algorithms to recognize features (e.g., objects) within one or more video frames or images. For example, by employing example models of various features to detect one or more features. Features may include communication modalities, notifications, different aspects of a graphical user interface, help tips, comments, redactions, edits, individuals (e.g., different people displayed in the communication application), and the like. For example, the system may split off a video feed of a number of different people or roles (e.g., an active speaker role) of a network-based communication such as an online meeting into their own sub-displays. For example, the system may split video feeds of each individual person in a network-based communication into their own sub-display.

Example algorithms for detecting features in video may include machine learning approaches utilizing approaches such as Viola-Jones object detection framework based on Haar features, Scale-invariant feature transform (SIFT), or Histogram of oriented gradients (HOG) features to define features that the system looks for. These techniques may employ a support vector machine classifier on the video to classify the video and to find the feature. Other example algorithms may include deep learning approaches such as neural networks or convolutional neural networks.

As previously described the location of the feature may be detected and used as content for an independent sub-display. The size of the independent sub-display may be set based upon the size of the extracted feature. The extracted feature may be scaled up and/or down based upon the available space on the display.

In other examples in which the content is not video-based content, the display control system 4325 may search the content for features that are specified by user settings, system settings, or otherwise specified for splitting into a separate sub-display. For example, a description of the content that is used to render the content (e.g., content describing user interface 4320) may be searched for various feature indicators, such as headers or other sections delineating notifications or various communication modalities.

While the above described features that are communication modalities, other features may be utilized, such as notifications. For example, when a user shares their screen and a notification from an application pops up onto their desktop, the display control system may detect the notification and create a new sub-display. In some examples, the new sub-display may be "docked" to the old sub-display in the form of a notification tab as shown with respect to 1130 of FIG. 11. As per the discussion therein, the user may provide one or more gestures and inputs to the notification.

In some examples, in the case of communication modalities, the sub-display may be paired with the communication server providing the communication service. That is, a device executing an instance of a communication application associated with the communication service may input instructions into the communication application to have the communication server providing the communication service (or some other server with access to the communication sessions) to pair with a sub-display. For example, as in the process of FIG. 9, but without the remote content source and with the communication service 960 taking its place. The communication service 960 may then share various content associated with a communication session on the sub-display. In these examples, the communication service 960 may communicate with the display control system to open up additional sub-displays based upon various communication modalities that may be of interest to users that can view the display. These predictions may be made in the same way with the same methods and factors as described for the communication application instance making those predictions.

Display Control System

Figure 17:
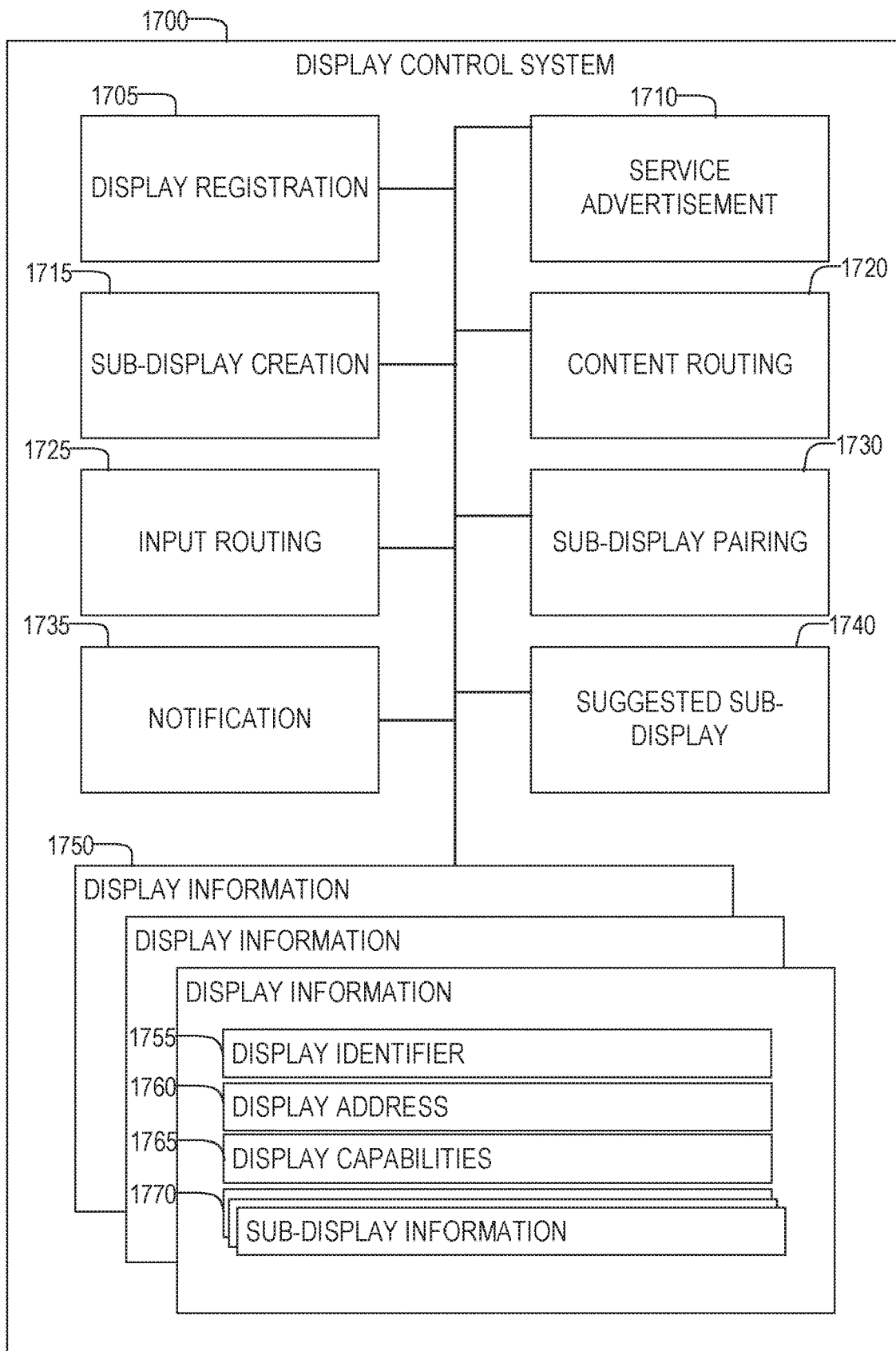
FIG. 17 illustrates a logical diagram of a display control system according to some examples of the present disclosure.

FIG. 17 illustrates a logical diagram of a display control system 1700 according to some examples of the present disclosure. Service advertisement component 1710 may provide for broadcasting information about the display service provided by the display control system to both displays and content source devices. Display registration component 1705 may register displays and create display information data structures 1750. Sub-display creation component 1715 may create sub-display information data structures 1770 and assist in creation of a sub-display. Content routing component 1720 may receive content and route it to the correct sub-display. Input routing component 1725 may receive an input from the sub-display and route it to a particular content source device. Sub-display pairing 1730 may provide sub-display pairing with content source devices. Notification component 1735 may provide one or more notifications on the display. Suggested sub-display component 1740 may suggest one or more additional sub-displays and/or changing a size or configuration of one or more sub-displays. Each of these components will be discussed in greater detail in the following discussion.

Figure 18:
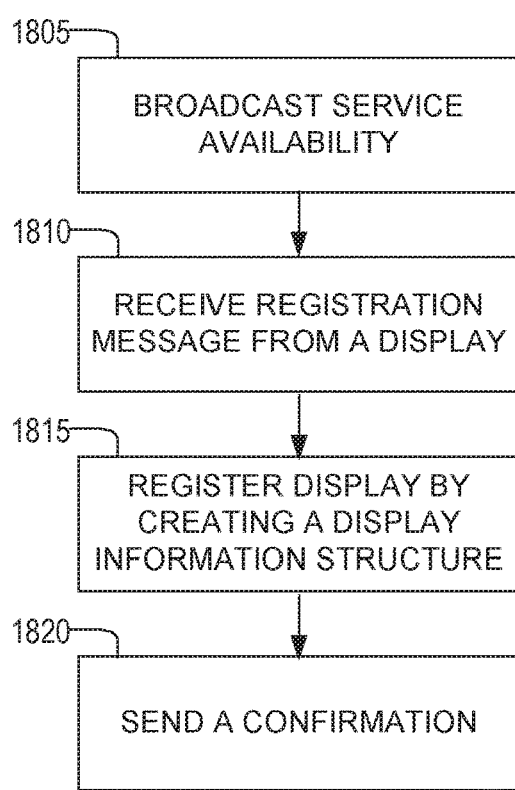
FIG. 18 illustrates a method flow of a service advertisement according to some examples of the present disclosure.

FIG. 18 illustrates a method flow of a service advertisement according to some examples of the present disclosure. At operation 1805, the advertisement component 1710 may broadcast a service availability message to a broadcast address over a network. The service availability message may contain a network address of the display control system, an indication that the display control system is available for controlling a display, and/or that the display control system is available for providing sub-display sharing services to content source devices.

Displays that are looking for a display control system may respond with their capabilities and a request to be controlled by the display control system 1700. Note that the content source devices need not reply to the broadcast message as the content source devices only need to communicate with the display service provided by the display control system when they pair with a sub-display. The display registration component 1705 may handle responses from the displays. Referring back to FIG. 18, at operation 1810 the display registration component 1705 may receive a registration message from a display. The display registration component 1705 may register the display at operation 1815 by creating an entry in the display information data structure 1750 with the display information. At operation 1820 a confirmation message may be sent to the display.

Example display information may include a display identifier 1755 that is unique across the network, or within the display control system 1700. The display identifier 1755 may be assigned by the display control system 1700, the display, or some other entity. Communications between the display control system 1700 and the display may include the display identifier 1755 to allow the display control system 1700 to look up the display information data structure 1750 of the proper display. Other example display information may include a display address 1760 that is a network address of the display, display capabilities 1765—such as resolution, color capabilities, refresh capabilities, input capabilities, input types, and the like. The sub-display information data structure 1770 may initially be empty but may hold information on sub-displays once those sub-displays are created.

Displays may send a notification when a sub-display is created. The sub-display creation component 1715 of the display control system 1700 may handle this notification.

Figure 19:
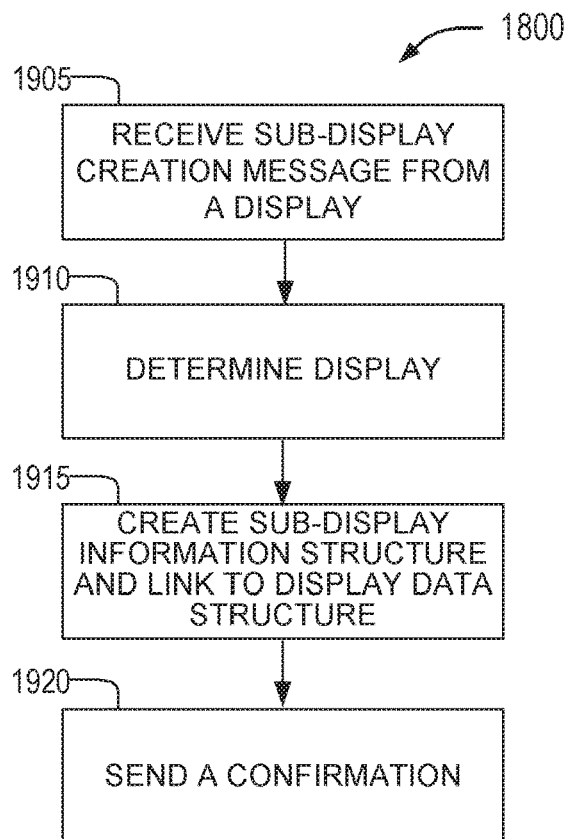
FIG. 19 illustrates a method flow for handling the sub-display creation notification according to some examples of the present disclosure.

FIG. 19 illustrates a method flow for handling the sub-display creation notification according to some examples of the present disclosure. At operation 1905 the display control system 1700 may receive a sub-display creation message from a display. The sub-display creation component 1715 may handle this message at operation 1910 by determining the display information data structure 1750 associated with the display by utilizing the display identifier sent by the display in the sub-display creation message. At operation 1915, the sub-display creation component 1715 may create a sub-display information data structure 1770 within, or linked with, the display information structure associated with the display the message was received from that was determined at operation 1910. At operation 1920, the sub-display creation component 1715 may send a confirmation to the display. FIG. 9 shows an example of sub-display information 950 that may be stored.

Sub-display pairing component 1730 may handle requests to pair from content source devices.

Figure 21:
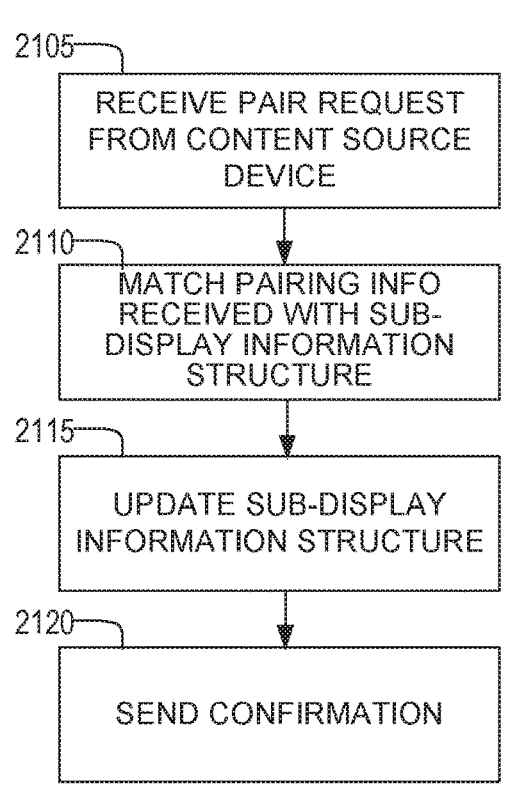
FIG. 21 illustrates a flowchart of a pairing operation according to some examples of the present disclosure.

FIG. 21 illustrates a flowchart of a pairing operation according to some examples of the present disclosure. At operation 2105 the sub-display pairing component 1730 may receive a pairing request from a content source device. At operation 2110, the sub-display pairing component 1730 may match the pairing information provided by the display and stored in the sub-display information data structure 1770 with the pairing information sent by the content source device to determine which sub-display to pair with the content source device. If a match is not found, an error may be returned to the content source device. If a match is found, then at operation 2115, the sub-display pairing component 1730 may update a sub-display information data structure corresponding to the matched sub-display to store information on the content source device. At operation 2120, the sub-display pairing component 1730 may send a confirmation to the content source device.

As previously described the pairing information may be a PIN that may be created by the display and provided by the display to the display control system in the sub-display creation notification. Alternatively, the display control system 1700 may create the PIN and provide it to the display. PINs created by the display control system 1700 may then be passed back to the display in a confirmation message of the sub-display creation (e.g., operation 1920) to allow the display to display the PIN in the pairing tab. The PIN may be a unique identifier used to match the content source device with a particular sub-display.

In other examples, the pairing information may be biometric based. In these examples, since the PIN number no longer is used to uniquely identify the sub-display, the sub-display creation component 1715 may issue a unique identifier (ID) of the sub-display, store this id in the sub-display information, and provide the id to the display. In examples in which the sub-display identifier is unique for all sub-displays managed by the display control system 1700, the display control system 1700 may then uniquely identify any sub-display by the sub-display identifier. In examples in which the sub-display identifier is only unique to each display managed by the display control system 1700, the display control system 1700 may uniquely identify any sub-display by the sub-display identifier and the display identifier.

In examples in which the pairing information is a biometric template—as discussed in more detail with respect to a pairing tab 730 in FIG. 7—the sub-display creation notification may include first biometric scan information and the sub-display identifier. The biometric scan information (e.g., a biometric template) may be temporarily stored in the corresponding sub-display information. The pairing request from the content source device may also include second biometric scan information, this second biometric scan information may be obtained during the pairing procedure at the content source device or may have been previously obtained at the content source device—such as during an account setup procedure.

In these examples, to match the pairing information received with the sub-display information structure (e.g., operation 2110), the display control system 1700 may iterate through the display information data structure 1750 and the sub-display information, checking unpaired sub-displays for stored biometric information that matches with the second biometric scan information from the content source device. If a match is found, the content source device is paired with the sub-display with the matching biometric scan information. If a match is not found, a failure message may be sent to the content source device.

Once a matching sub-display is found, the content source device address may be stored in the sub-display information and the sub-display identification (if it is not PIN based) and/or display identifier may be passed back to the content source device.

Content routing component 1720 may handle content sent from content source devices and cause them to be displayed in a sub-display. The content may include a sub-display identifier and/or a display identifier.

Figure 20:
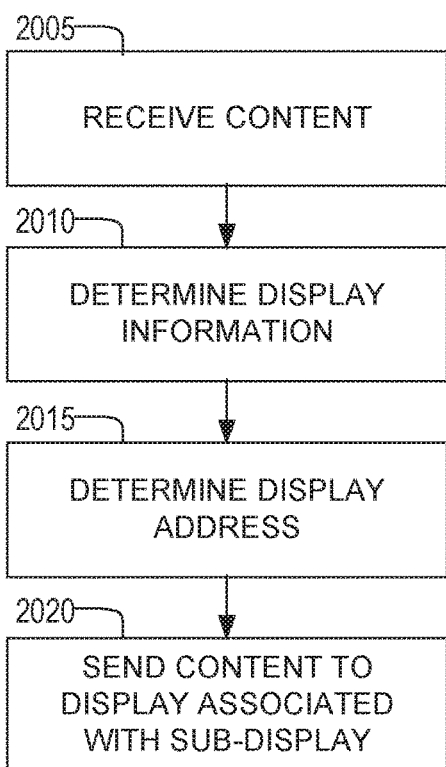
FIG. 20 illustrates a flowchart of a method for handling content from a content source device at a display control system according to some examples of the present disclosure.

FIG. 20 illustrates a flowchart of a method for handling content from a content source device at a display control system according to some examples of the present disclosure. At operation 2005 the content routing component 1720 may receive content from a content source device. The content may contain a sub-display identifier and/or a display identifier that may be used by the display control system to identify a display information data structure at operation 2010. If the display information data structure 1750 is found, then the display address may be determined at operation 2015. If the display information data structure 1750 is not found, an error message may be returned to the content source device. If the display information data structure 1750 is found and an address is located, then at operation 2020 the content may be sent to the appropriate sub-display at the located display. In some examples, the display control system may verify that the source of the content is the content source device paired with the sub-display by verifying that the return address of the content matches the content source device address in the sub-display information. In some examples, the display control system may verify that the content is directed to a valid sub-display of the display.

Input routing component 1725 may receive input from a display or input device and route it to a content source device.

Figure 22:
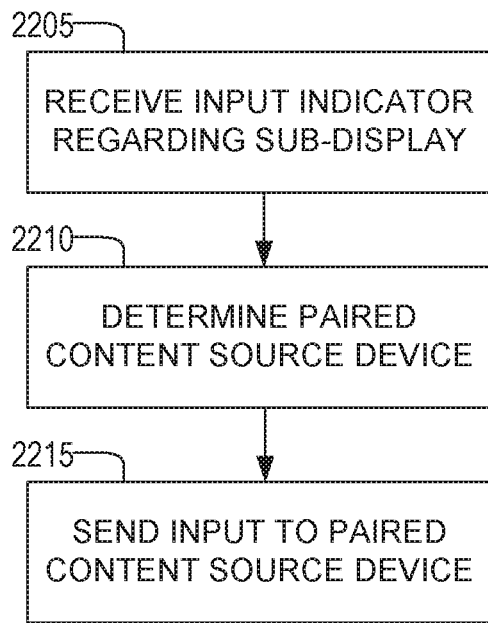
FIG. 22 illustrates a flowchart of a method of routing input to a content source device according to some examples of the present disclosure.

FIG. 22 illustrates a flowchart of a method of routing input to a content source device according to some examples of the present disclosure. At operation 2205, the input routing component 1725 may receive an input indicator regarding a sub-display. The input indicator may be sent by the display (if the input device is communicatively coupled to the display) or via an input device (e.g., a camera) that is coupled to the display control system. The indication may include the type of input (e.g., gesture type), coordinates of the input within a sub-display, the sub-display identifier, the display identifier of the display, and the like to the controller. If the display or the input device is not aware of the coordinates of sub-displays, the indication may include coordinates of the input within the display itself that may be used by the controller to determine the sub-display.

For camera-based gesture recognition to determine a sub-display identifier of the input, a sub-display identifier may be displayed by, on, or in the display. A computer vision application may be able to read the sub-display identifiers of sub-displays on the display from a captured image of the display. The identifier may be displayed continuously so that a human can view and read it, or, may be displayed in a way that a human cannot read it, but a machine vision application can. For example, by displaying the identifier only on a limited number of consecutive frames—e.g., if the refresh rate of the display is 60 frames per second, the identifier may be displayed on only 1 frame per second. This may be too fast for the human eye to see the identifier, but the identifier would be visible to the camera. In other examples, the camera may determine when a new sub-display is created and capture the identifier. The camera may then track the location and position of the sub-display after creation. Gestures on, or directed at, the sub-display may be captured by the camera, recognized, and the corresponding sub-display identifier maybe determined and sent to the controller.

Similarly, if the display itself detects the input, the display may store and track the sub-display identifier and the sub-display coordinates with respect to the display. When a gesture input is on, within, or directed to, the sub-display, the display may send the input to the display control system.

Turning back to FIG. 22, at operation 2210 the input routing component 1725 may determine, from the information provided by the input indicator and from the sub-display information data structure 1770, the content source device paired with that sub-display and a network address of the content source device. At operation 2215, the controller may send the input to the paired content source device.

Notification component 1735 may provide notification functionality to the sub-display.

Figure 23:
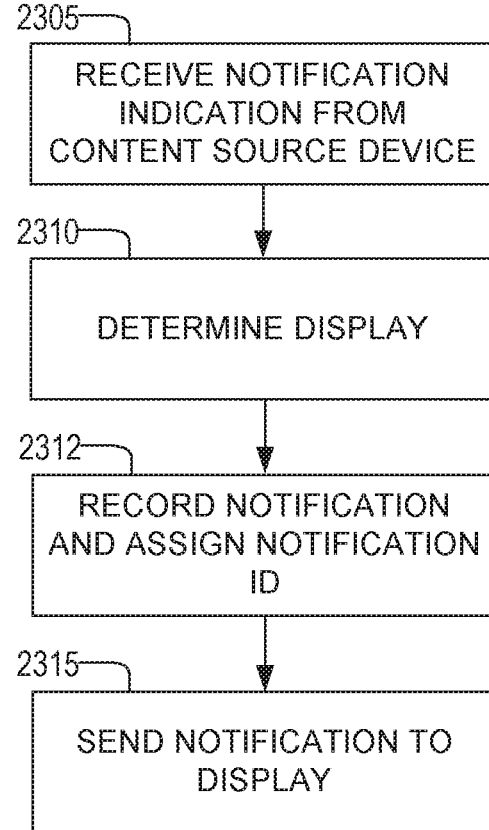
FIG. 23 illustrates a flowchart of a method of providing a notification to a sub-display according to some examples of the present disclosure.

FIG. 23 illustrates a flowchart of a method of providing a notification to a sub-display according to some examples of the present disclosure. At operation 2305 the notification component 1735 may receive a notification indication from a content source device. The notification indication may include a sub-display identifier, a display identifier, text of the notification, one or more graphics to display along with the notification, a graphical layout of the notification and/or the like. In some examples, at operation 2310, the notification component 1735 may determine the display information from the sub-display information. At operation 2312, the notification component 1735 may create a notification identifier and store the notification identifier with the sub-display information for the sub-display that the notification is to be displayed in. In some examples, the notification identifier may be sent back to the content source device to be provided for future interactions with the notification. This allows for multiple notifications to be displayed with a single sub-display as well as modifications of the notifications by content source devices.

The notification component 1735 may, at operation 2315, forward the notification to the display. This notification may include the notification identifier. In some examples, the display control system or display may reformat the notification to match the display capabilities of the display and the notification area. For example, the notification may be resized, the color information may be modified, and the like. The specific operations may be applied to the notification based upon a series of rules. The rules may depend on the notification information, the display information, the available notification area, and the like. For example, IF <notification size> is greater than the <notification area size> then <Scale the notification>.

Notification component 1735 may also handle inputs received to notifications.

Figure 24:
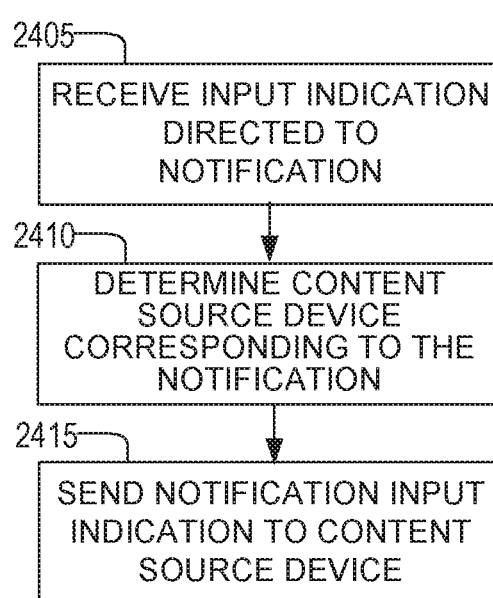
FIG. 24 illustrates a flowchart of a method of a notification component handling an input to a notification according to some examples of the present disclosure.

FIG. 24 illustrates a flowchart of a notification component 1735 handling an input to a notification according to some examples of the present disclosure. At operation 2405, the notification component 1735 may receive an indication of an input directed to the notification. The indication of the input directed to the notification may include the type of input (e.g., gesture type), coordinates of the input within a notification area, the sub-display identifier, the display identifier of the display, the notification identifier, and the like to the controller. In some examples, the notification component 1735 (or the display) may handle the input directly. For example, the notification component 1735 may handle an input dismissing the notification by instructing the display to remove the notification and stop displaying the notification area. The notification component 1735 may then, at operation 2410, determine the address of the content source device (e.g., based upon the display and/or sub-display identifier) and at operation 2415 send the indication to the content source device. In other examples, the notification component 1735 may send the received input indication received at operation 2405 to the content source device without taking any action. The content source device may then take action on the notification (not shown), including dismissing the notification or other action by sending a notification indication with the notification identifier specifying the desired action.

Suggested sub-display component 1740 may monitor the available space on one or more displays and may determine suggested increases and/or decreases for the sub-displays based upon the content shared in the sub-displays. The suggested sub-display component 1740 may identify one or more content transformations that are used to fit the content into one or more sub-displays. The suggested sub-display component 1740 may determine that there is enough unused space on the display (e.g., based upon space between neighboring sub-displays) to make one or more sub-displays larger so as to reduce or eliminate transformations applied to content to fit the content in one or more sub-displays. For example, the suggested sub-display component 1740 may apply one or more rules, such as a decision tree, to determine an optimal sub-display size for content for one or more sub-displays. The suggested sub-display component 1740 may then utilize additional rules to determine a new size to suggest to a user. The new size may be sent to the display for suggestion to the user. If the user accepts, the display and display control system may update their records of the sub-display with the new size and update the size on the display. The transformations applied to fit the content in the sub-display may then be adjusted based upon the new size.

Suggested sub-display component 1740 may also suggest additional sub-displays. For example, the suggested sub-display component 1740 may send an indication that space on the sub-display is available to the content source device. The content source device may then respond with any additional content that the content source device would like to suggest to the user, e.g., a preview of the content that is suggested to be displayed. The suggested sub-display component 1740 forwards this to the display for display of a visual suggestion to the user. If the user approves displaying this content, then the indication of acceptance is received by the suggested sub-display component 1740 from the display or from an input device. This indication may then cause the suggested sub-display component 1740 to instruct the sub-display creation component 1715 to create a new sub-display and sub-display pairing component 1730 to automatically pair the sub-display with the content source device. The pairing may be done automatically and the pairing steps (e.g., displaying or gathering pairing information) may be skipped. A confirmation may then be sent back to the content source device—which may begin sharing the content.

Figure 25:
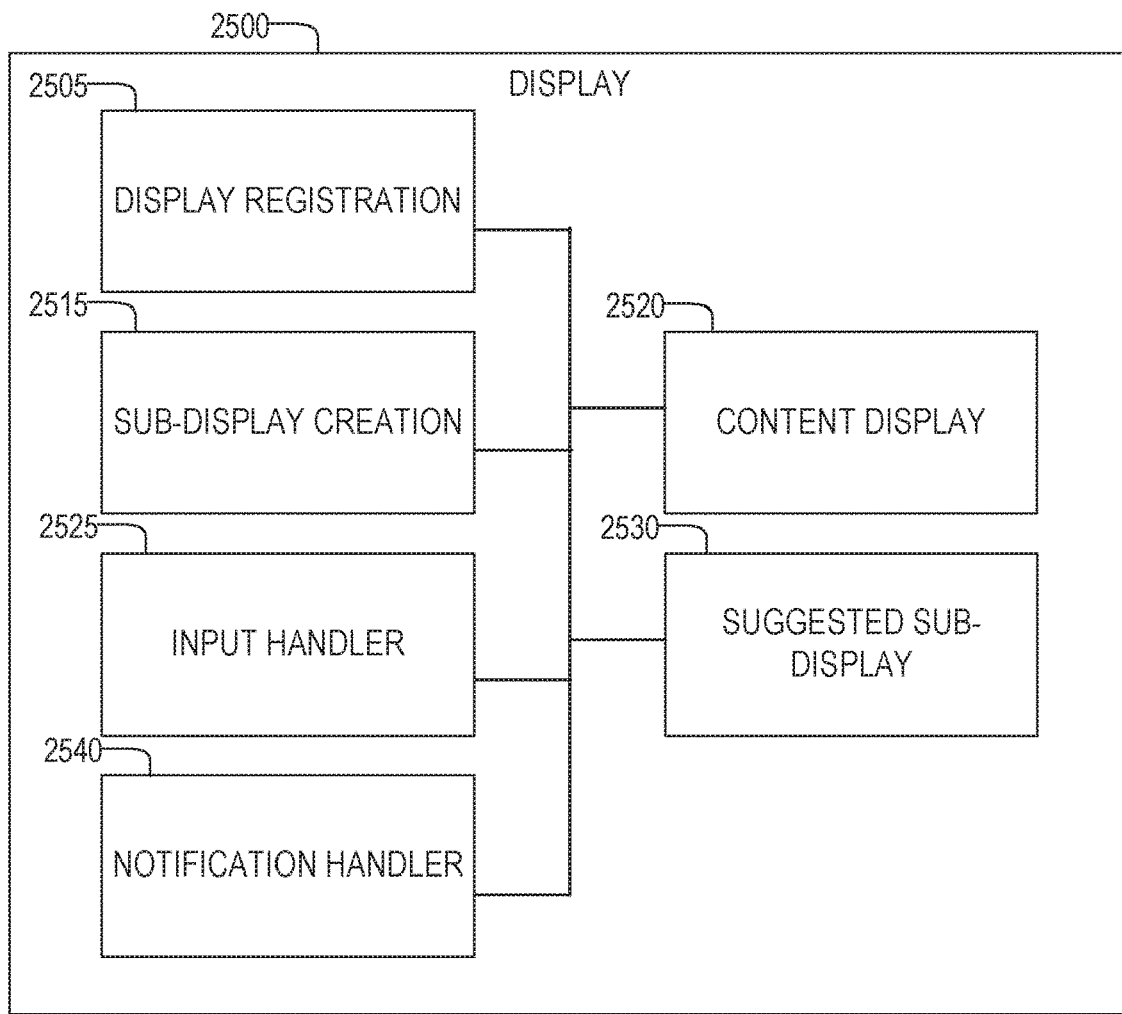
FIG. 25 illustrates a logical diagram of a display according to some examples of the present disclosure.

FIG. 25 illustrates a logical diagram of a display 2500 according to some examples of the present disclosure. Display registration component 2505 may register the display with a display control system. Sub-display creation component 2515 may create a sub-display. Input handler 2525 may handle one or more inputs to the display. Notification handler 2540 may handle one or more received notifications. Content display 2520 may handle displaying content in a particular sub-display. Suggested sub-display 2530 may handle suggestions for additional sub-displays or changing size or other parameters of existing sub-displays. Each of these components is described in greater detail in the following discussion.

Figure 26:
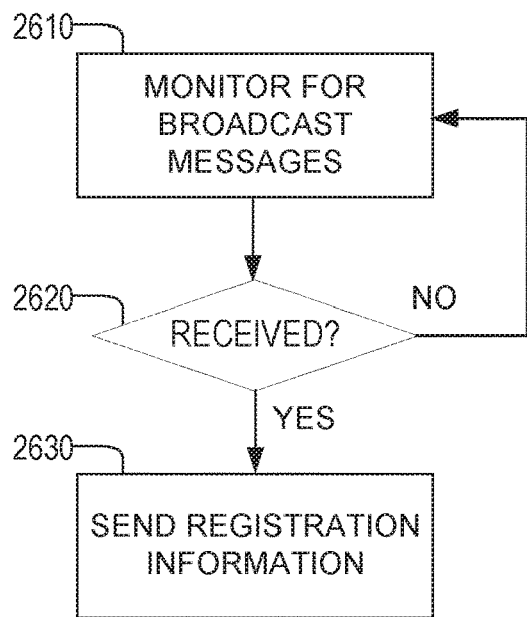
FIG. 26 illustrates a flowchart of a method of registering a display with a controller according to some examples of the present disclosure.

FIG. 26 illustrates a method of registering a display with a controller according to some examples of the present disclosure. The display registration component 2505 may monitor for broadcast messages at a particular network address and/or port at operation 2610. If a service broadcast message is received at operation 2620, the display may negotiate for the display control system to control the display at operation 2630. This may include sending registration information such as display capabilities and addresses. The display may store information on the display control system, such as a network address of the display control system. While the examples mentioned herein have the display control system sending the advertisements, in other examples, the display and/or content source devices may discover the display control system by sending their own advertisement and/or discovery messages for which the display control system listens for and responds.

Sub-display creation component 2515 may recognize inputs to create one or more sub-displays and communicate with the display control system to create the sub-displays.

Figure 27:
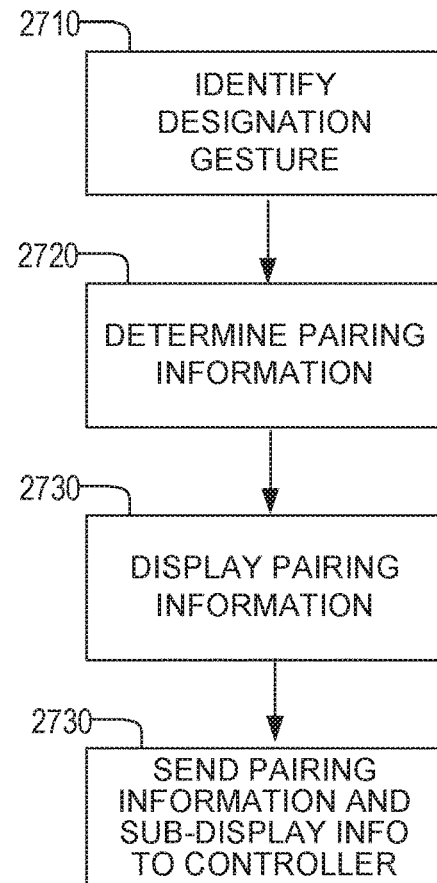
FIG. 27 illustrates a flowchart of a method of a sub-display creation performed by a sub-display creation component according to some examples of the present disclosure.

FIG. 27 illustrates a flowchart of a method of a sub-display creation performed by a sub-display creation component 2515 according to some examples of the present disclosure. At operation 2710 the sub-display creation component 2515 may identify a gesture that is indicative of a sub-display creation. For example, a particular gesture directed to, or on an area outside of an already existing sub-display. The particular gestures may include a finger down (e.g., a finger placed and held on a display) and drag. The path the user's finger takes on the screen specifies the coordinates of the sub-display. Another gesture may include a first finger down to indicate a first diagonal corner and a drag and finger up (e.g., the user lifts their finger up) wherein the finger up location is the opposite diagonal corner. The display may animate the creation of the sub-display as previously described. The gesture or other input may be determined by an input device of the display such as a touchscreen, or an input device (such as a camera) communicatively coupled to the display or the controller (which may pass the input to the display).

Upon completion of the gesture, the display may create one or more data structures to store information about, and to track the sub-display. In some examples, the data structure may include the coordinates of the sub-display—including the coordinates of the outline, a sub-display identifier, and the like. In some examples, once created, the sub-displays may be moved, resized, rotated, closed, and the like. The data structures may track where on the display the sub-display is.

At operation 2720, the display may determine pairing information. For example, the display may assign a PIN number or other unique identifier to the sub-display. In some examples, the unique identifier of the sub-display is the PIN, but in other examples, an additional sub-display identifier may be assigned to the sub-display. In other examples, the display may request and receive a PIN or other identifier from the display control system. At operation 2730, the display may show the pairing information, such as within a pairing tab. In examples in which the pairing method is a biometric pairing method, the operation of 2720 may simply be determining an identifier for the sub-display and operation 2730 may be displaying instructions for the user to enter their biometric. In these examples, another operation may be performed whereby the display communicates with a biometric scanner to obtain a biometric sample of the user. In some examples, the biometric scanner may be instructed only to scan at certain locations within the display—such as at a pairing tab. The coordinates of the pairing tab may be provided to the biometric scanner. At operation 2730, the sub-display information along with any pairing information and biometric information (depending on the implementation) may be sent to the display control system. The sub-display information, coordinates, pairing (e.g., the PIN and/or sub-display identifier), and biometric information may be stored in a data structure of the display.

Content display component 2520 may determine the correct sub-display for received content and cause that content to be displayed within that sub-display.

Figure 28:
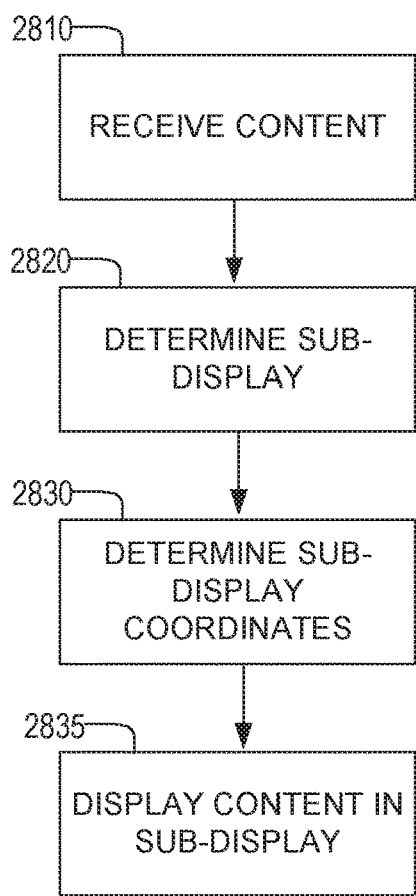
FIG. 28 illustrates a flowchart of a method of a content display component causing content to be displayed according to some examples of the present disclosure.

FIG. 28 illustrates a flowchart of a method of a content display component 2520 causing content to be displayed according to some examples of the present disclosure. At operation 2810, the display may receive content e.g., from a content source device and/or a display control system. The content may include the sub-display identifier (e.g., the pairing PIN or some other identifier that is unique to the display or unique to the display control system). At operation 2820, the sub-display to render the content in may be determined based upon the sub-display identifier received with the content (e.g., in a packet header, stream identifier, or the like), and address of the content source device, or the like. At operation 2830, based upon the records of the display for that sub-display, the coordinates of the sub-display may be determined. In some examples, the content may be reformatted to fit within the sub-display. This may include scaling, rotating, translating, stretching, cropping, or otherwise transforming the content. In some examples, prior to transforming the content and/or displaying the content, the content may be decoded. For example, the content may be encoded according to one or more encoding schemes in one or more encoding formats. The display (or the display control system) may decode the content into a native format for rendering on the display. At operation 2835, the content may be displayed in the sub-display.

Suggested sub-display component 2530 may receive one or more suggestions from the suggested sub-display component 2530 of the controller. The suggested sub-display component 2530 may advertise on the display one or more suggestions for changing a size and/or location of one or more sub-displays and present one or more new sub-display creation suggestions. Users may accept these suggestions by providing an input to do so. The suggestions may be displayed as transparent, ghost, dotted, or as other visually delineated hints that preview a new size, position, shape, or a new sub-display (including suggested content). The user may tap on a button or other input area to accept the change and may have another user interface area for rejecting the suggested change. If the user accepts the change, the display adjusts its data structure of one or more sub-displays to reflect the change.

Input handler component 2525 may handle input directed to, in, within, or on, one or more sub-displays.

Figure 29:
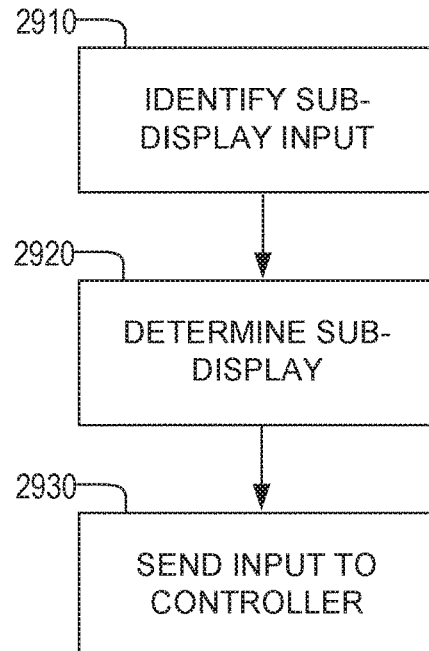
FIG. 29 illustrates a flowchart of a method of handling input directed to a sub-display according to some examples of the present disclosure.

FIG. 29 illustrates a flowchart of a method of handling input directed to a sub-display according to some examples of the present disclosure. At operation 2910, the display may identify an input directed to, in, within, or on, one or more sub-displays. For example, the display may detect one or more gestures of a touchscreen component of the display. In other examples, a camera communicatively coupled to the display may send a notification that a gesture or other input is detected. The type of input (e.g., type of gesture) and the coordinates of the gesture may be determined. At operation 2920, the coordinates may be utilized to determine which sub-display the input pertains to. The display may then translate the coordinates of the gesture with respect to the full display (e.g., a display 120) to relative coordinates within the sub-display. These coordinates, the type of input, the coordinates of the input within the sub-display, and the like may be sent to the controller at operation 2930.

Notification handler component 2540 may handle notifications sent from the content source device and/or the display control system as well as handling inputs directed to the notifications.

Figure 30:
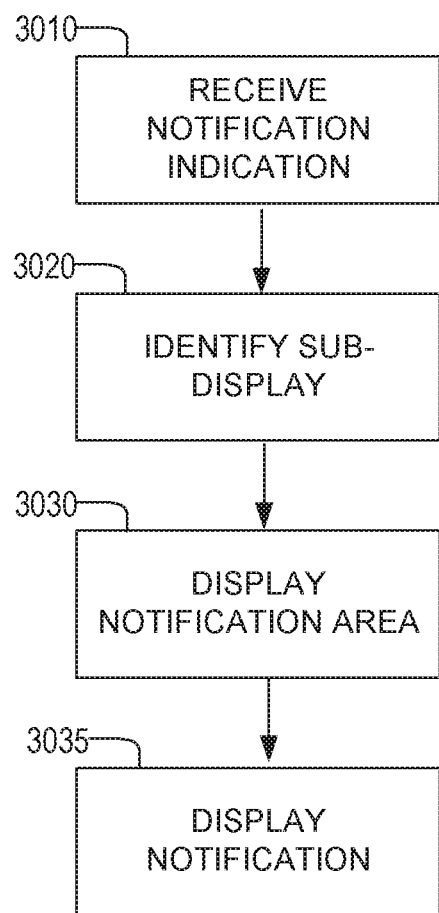
FIG. 30 illustrates a flowchart of a method of a notification handler component handling a notification message from a content source device or a display control system according to some examples of the present disclosure.

FIG. 30 illustrates a flowchart of a method of a notification handler component 2540 handling a notification message from a content source device or a display control system according to some examples of the present disclosure. At operation 3010 the notification handler component 2540 may receive a notification indication from the display control system or a content source device. The notification indication may include content for displaying the notification. The notification indication may include a notification identifier and a sub-display identifier. At operation 3020 the display may identify the sub-display, e.g., from the sub-display identifier. At operation 3030 the display may render the notification area (e.g., the notification tab). At operation 3035 the notification may be displayed in the notification area.

Figure 31:
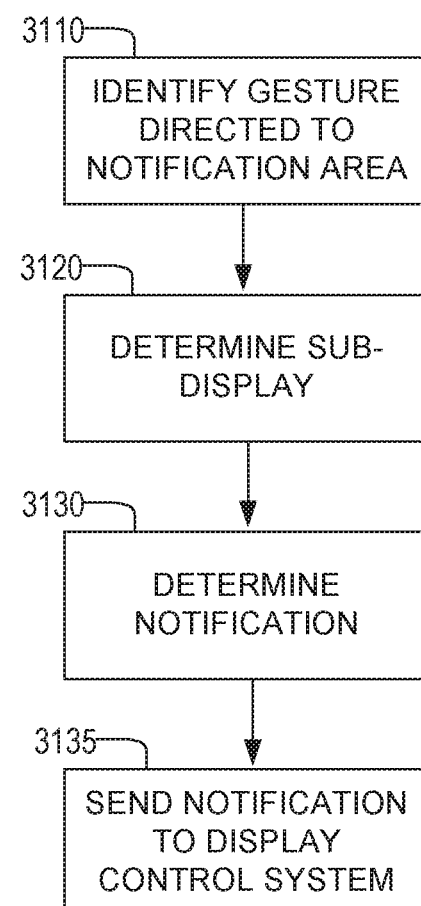
FIG. 31 illustrates a flowchart of a method of a notification handler component handling a gesture directed to the notification area, according to some examples of the present disclosure.

FIG. 31 illustrates a flowchart of a method of a notification handler component 2540 handling a gesture directed to the notification area, according to some examples of the present disclosure. At operation 3110, the display may identify a gesture or other input directed to, on, within, a notification. At operation 3120 the sub-display that the notification corresponds to may be identified. Additionally, at operation 3130, the notification identifier may be determined. These may be determined by matching the coordinates of the gesture with the coordinates of active sub-displays and/or active notification areas of active sub-displays. At operation 3135, the notification may be sent to the display control system and/or the content source device.

Figure 32:
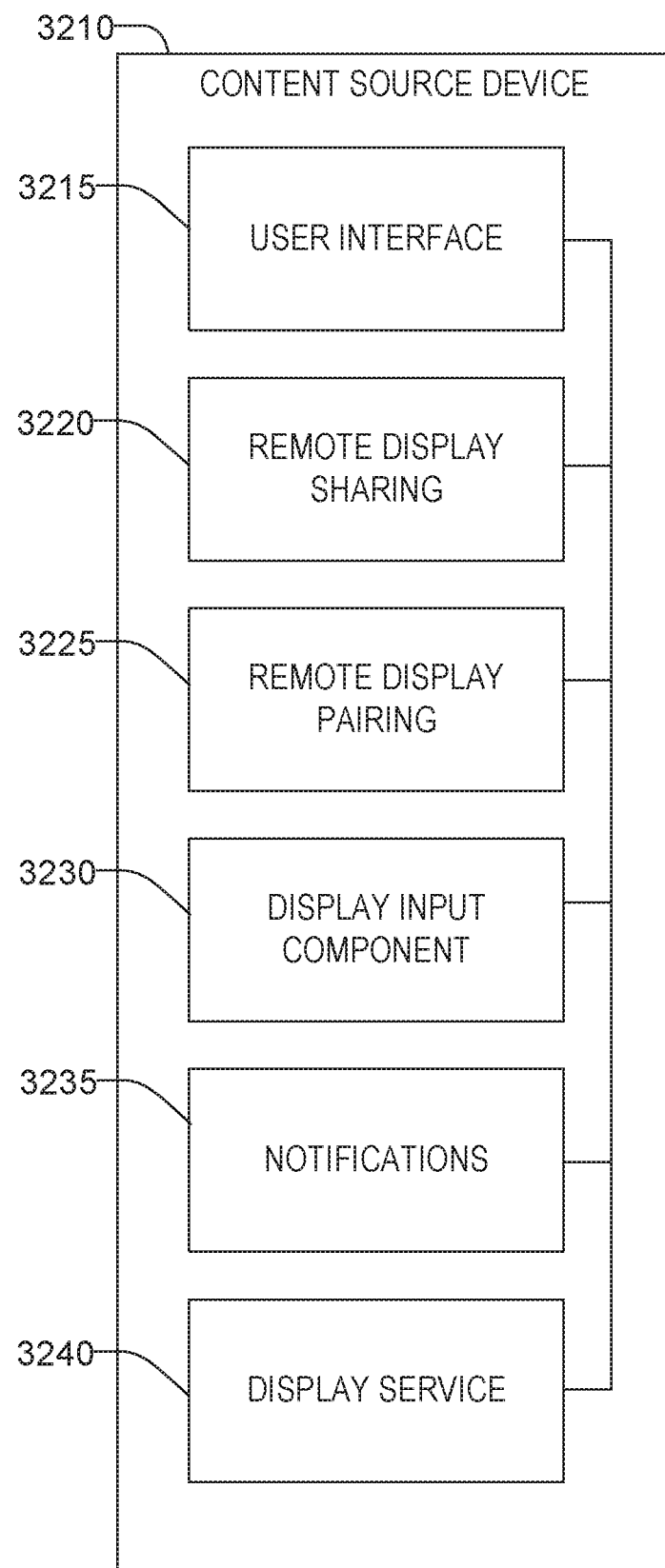
FIG. 32 illustrates a diagram of a content source device 3210 according to some examples of the present disclosure.

FIG. 32 illustrates a diagram of a content source device 3210 according to some examples of the present disclosure. One or more of the components of FIG. 32 may be part of an application, such as a communications application. User interface component 3215 may provide one or more user interfaces, such as graphical user interfaces (GUIs) to allow users to select content for sharing, selecting a remote display, and pairing with the remote display. User interface component 3215 may also provide GUIs for selecting which notifications to display on the remote display.

Remote display sharing component 3220 may identify content e.g., based upon the selections of the user through the user interface component 3215 and send that content to either the display control system or a sub-display of the remote display based upon a pairing operation performed by the remote display pairing component 3225.

Remote display pairing component 3225 may pair with the remote display by sending the pairing information (PIN, biometrics, or the like) collected through the user interface component 3215 to either the display control system or the remote display. In some examples, the remote display pairing component 3225 may send one or more biometric templates (e.g., fingerprint, eye scans, facial recognition scans, etc.) that were taken by the content source device from the user. These templates may be taken during an application setup process, prior to the pairing process, or as part of the pairing process. These templates may be compared by the display control system or the remote display with a template taken at the remote display. If the templates match, the remote display control system and/or remote display may pair the content source device and the sub-display on the remote display.

As previously noted, pairing (i.e., linking) describes a process for associating the content source device with a particular sub-display to allow the routing of content from the content source device to a particular sub-display. The process entails matching one or more pieces of pairing information (e.g., a PIN, a biometric template, and the like) entered or shown on the display and one or more pieces of pairing information entered on the content source device. The pairing, in some examples, is a way to provide a unique identifier to the content source device that can be appended to content to properly route the content to the correct sub-display.

In other examples, the pairing may additionally create a data entry in the display control system or the display that identifies the sub-display (e.g., using a PIN or other unique identifier) and the content source device (e.g., using an IP Address or other unique identifier) and/or application on the content source device such that data from the content source device is displayed in the correct sub-display and so that input from the sub-display can be returned to the proper content source device and/or application on the content source device.

For examples in which a single content source device shares content with multiple sub-displays (e.g., different applications share different content to different sub-displays), the content source device 3210 may keep a record of which applications and which content on the content source device are associated with each sub-display. The remote display sharing component 3220 receives content from an application, consults a data structure to determine the appropriate sub-display and the address of the display or display control system and then sends the content to that address (along with the identifier of the sub-display).

For input coming back to the content source device, the display input component 3230 of the content source device 3210 may query the data structure to determine, based upon the sub-display identifier included in the input, what application to direct the input to. Display input component 3230 may then forward that input to the application. In one example, the input triggers events and/or subroutines of the application the same way that a same input entered using a local input device would do. A local input is any input from an input device connected to the content source device through a local bus, e.g., a mouse, touchscreen of the content source device, or the like.

Notifications component 3235 may detect one or more notifications from one or more applications executing on the content source device 3210. The notifications component 3235 may compare the notification type, source application, and/or notification components to a set of one or more rules that specify notifications that are to be displayed on one or more sub-displays where content is shared. The notifications may be displayed in a notification area of a sub-display. The notifications may not be from the same application that is displaying content in the sub-display. The notifications may be created by the notification component, including a graphical layout of the notification and including a notification identifier.

Input to one or more of the notifications may be sent by the display and/or the display control system to the content source device 3210 and may be handled by the notifications component 3235. The notification input indication may include a notification identifier. Notifications component 3235 may utilize the notification identifier to identify the notification and may process the input. Certain inputs may dismiss the notification. Certain inputs may launch the application that sent the notification either at the content source device 3210, in the sub-display whose notification tab displayed the notification (whether or not the application whose content was displayed in that sub-display generated the notification or not), or launch a new sub-display with the notification. Certain inputs may generate a quick response input area on the notification tab. Notifications component 3235 may send an instruction back to the display and/or display control system to modify or update the notification. For example, in response to an input directed to the notification on the display or on the content source device.

Display service 3240 may listen for broadcast messages from the display control system or display advertising the availability of the display for sharing in one or more sub-displays. The broadcast messages may include an address of one or more display control systems. The service may be local to a particular network. In some examples, multiple services may be discovered. During pairing, the content source device may try pairing with all the discovered display control systems (as the content source device may not know which display control system controls the desired display where the designated sub-display is located). It would be unlikely that the pairing information would match two different unpaired sub-displays. In the alternative, each display may have a globally unique identification that may be displayed along with, or as part of the pairing information that the user may also enter. The display control system may broadcast the display identifiers of the displays managed by the display control system. The remote display pairing component 3225 may then use this broadcast information to select the proper display control system.

Figure 33:
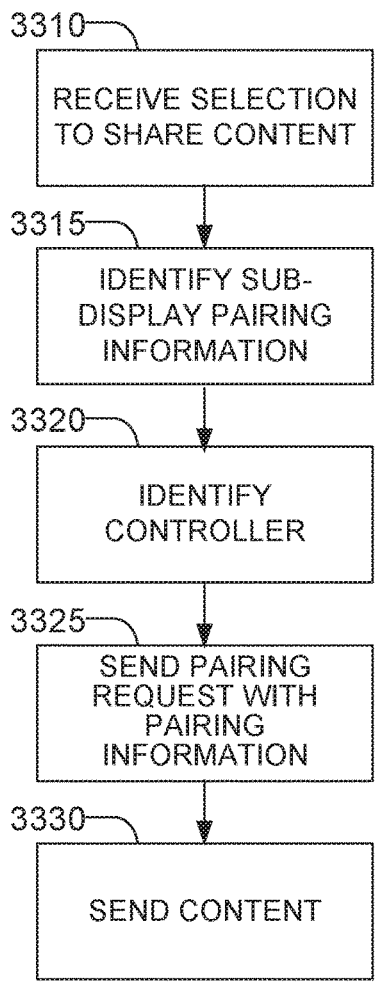
FIG. 33 illustrates a flowchart of a method of sharing content on a sub-display of a remote display according to some examples of the present disclosure.

FIG. 33 illustrates a flowchart of a method of sharing content on a sub-display of a remote display according to some examples of the present disclosure. At operation 3310, the content source device may receive a selection of content to share from a user. For example, through the user interface provided by the user interface component 3215. At operation 3315 the content source device may identify sub-display pairing information. For example, a user may enter a PIN, scan a QR code, enter a password, or provide other information displayed on the display (e.g., in a pairing tab) in a user interface element provided by user interface component 3215. In other examples, the content source device may identify one or more biometric templates of the user—e.g., by retrieving it from a database, taking a new scan of the biometric, or the like.

At operation 3320 the remote display pairing component 3225 of the content source device may identify the display control system, and the address of the display control system. As previously described the display control system information may be obtained by monitoring for broadcast messages. At operation 3325 the remote display pairing component 3225 may send a pairing request message to the address of the display control system with the pairing information. Once pairing is established (e.g., a confirmation message from the display control system) the remote display sharing component 3220 may begin sharing content at operation 3330. As previously noted, if multiple display control systems are discovered, the content source device may send multiple pairing requests to multiple display control systems.

Figure 34:
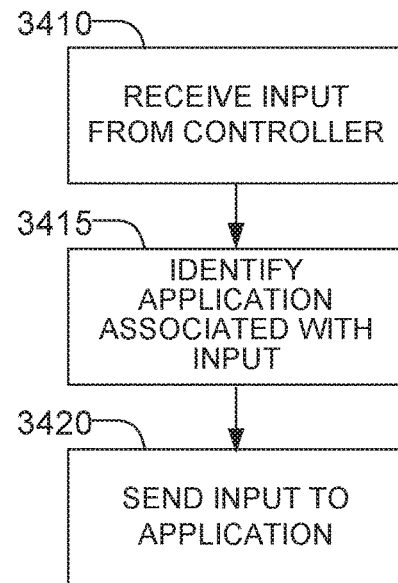
FIG. 34 illustrates a flowchart of a method of processing input from a sub-display according to some examples of the present disclosure.

FIG. 34 illustrates a flowchart of a method of processing input from a sub-display according to some examples of the present disclosure. At operation 3410 display input component 3230 may receive an input notification from a display control system or display. The input notification may include the sub-display identifier of the sub-display the input is associated with, the input type, location, and other information. The display input component 3230 may identify the application associated with the input at operation 3415. For example, by looking up a data structure storing an association between an application and sub-display identifiers. At operation 3420, the input is sent to or otherwise delivered to the application.

Figure 35:
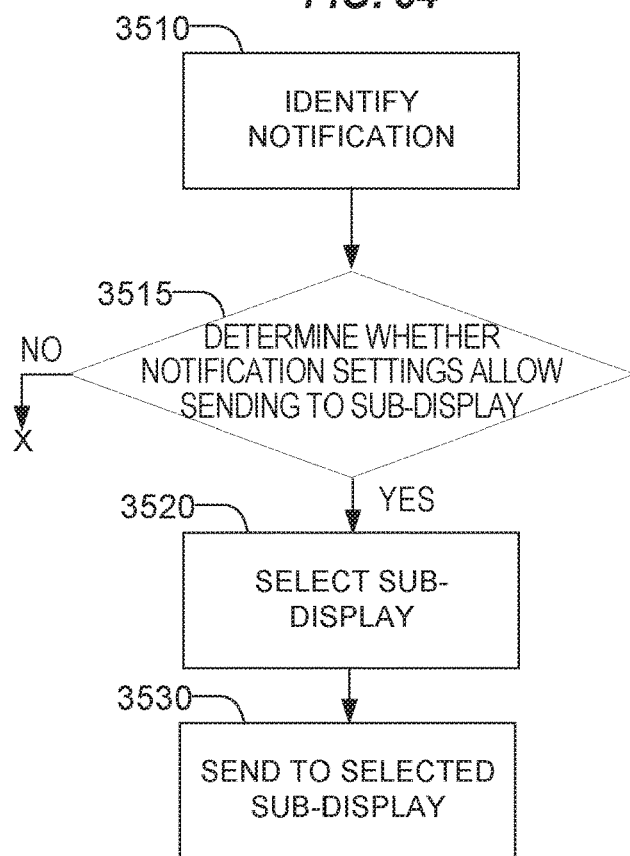
FIG. 35 illustrates a flowchart of a method of presenting a notification to a sub-display according to some examples of the present disclosure.

FIG. 35 illustrates a flowchart of a method of presenting a notification to a sub-display according to some examples of the present disclosure. At operation 3510 the notifications component 3235 may detect a notification. For example, an operating system may have a notification service that applications send notifications to. Notification component 3235 may interface with this component. At operation 3515, the notification component 3235 may determine whether notification settings allow sending the notification to the sub-display. If the notification settings do not allow sending to one or more sub-displays, then processing of this notification for display on a sub-display may terminate.

If the notification settings allow sending to one or more sub-displays, then at operation 3520 the notifications component 3235 may select a sub-display associated with the content source device. If there are no sub-displays associated with the content source device, then processing of this notification for display on a sub-display may terminate. If there is only a single sub-display associated with the content source device, then this sub-display may be selected. If there are multiple sub-displays associated with this content source device, then one or more selection methods may be employed. For example, the content source device may select a sub-display that the content source device most recently received input from. In other examples, a largest sub-display may be chosen. In still other examples, the display control system may decide which sub-display associated with the content source device to display the notification with. In yet other examples, user preferences may be utilized, such as matching certain notification types with sub-displays showing certain shared content. For example, a sub-display showing communication applications may display certain communication-related notifications.

Once the sub-display is selected, at operation 3530, the notification may be sent to the selected sub-display. In some examples, an identifier is associated with the notification and is sent along with the notification.

Figure 36:
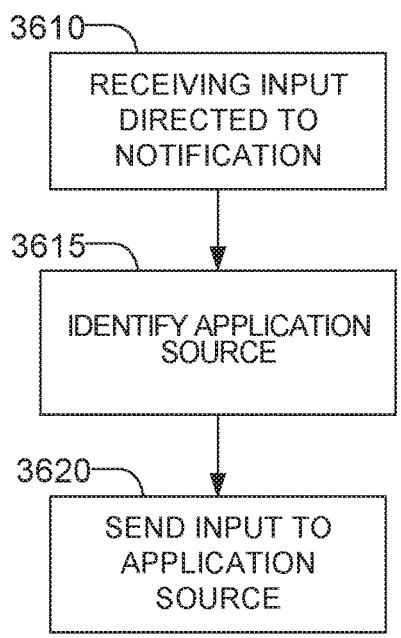
FIG. 36 illustrates a flowchart of a method of handling an input such as a gesture directed to a notification displayed on a sub-display.

FIG. 36 illustrates a flowchart of a method of handling an input such as a gesture directed to a notification displayed on a sub-display. At operation 3610, the notifications component 3235 may receive an indication of an input directed to a notification sent by the content source device. The indication, as previously described may include information regarding the input—such as a type of input, a location of the input, the notification identifier, and other information. At operation 3615 the notification component 3235 may identify the application that generated the notification—e.g., by using the notification identifier. At operation 3620, the input information may be sent to the application identified at operation 3615.

Figure 37:
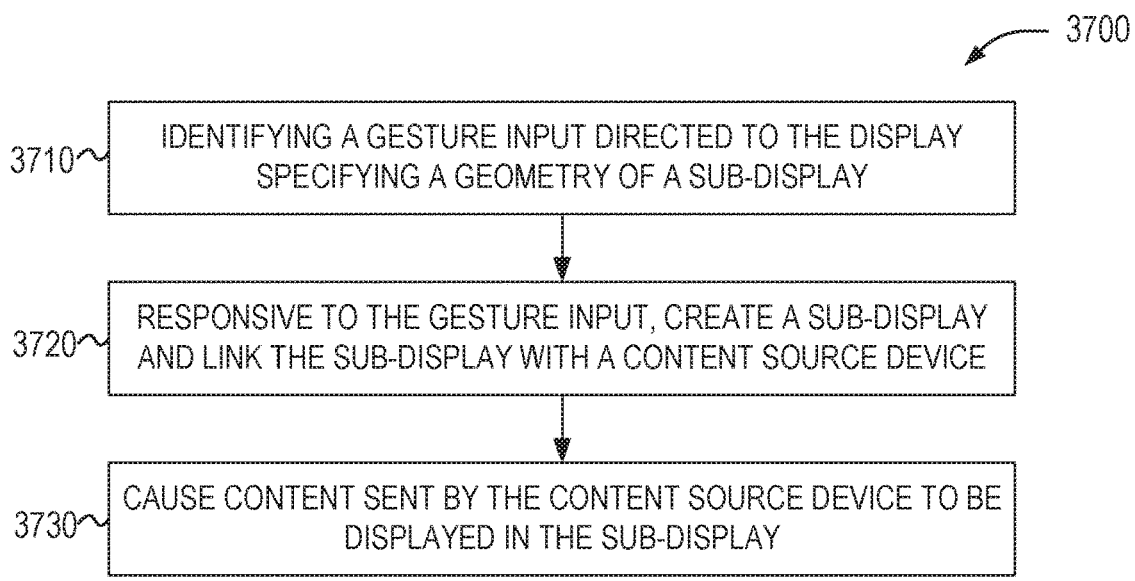
FIG. 37 illustrates a flowchart of a method of designating a sub-display according to some examples of the present disclosure.

FIG. 37 illustrates a flowchart of a method 3700 of designating a sub-display according to some examples of the present disclosure. At operation 3710, the display control system and/or display may identify a gesture input directed to a display surface of a display. The gesture input may define a geometry of a sub-display on the display. The gesture input defining a sub-display encompassing different coordinates than a previously specified sub-display. For example, the display may determine that an input was directed to a location outside of an existing sub-display and send a notification to the display control system in response to detecting a gesture to designate the sub-display. The indication may occur after the gesture is completed (e.g., the sub-display geometry is defined) or as it occurs.

At operation 3720, responsive to the gesture input, the display control system and/or display may create a sub-display and link the sub-display to a content source device utilizing a linking procedure as described herein. For example, one or more components of the system may create a data structure storing information about the sub-display. At operation 3730, responsive to creating the sub-display and linking the sub-display with the content source device, causing content shared by the content source device to be displayed in the sub-display of the display. In some examples, the content may be shared contemporaneously with different content shared in the previously specified sub-display. For example, the display control system may send the content to the display with the sub-display identifier. The display may receive the content, either directly from the content source device or from the content source device via the display control system and may render the content within the geometry established at operation 3710.

Figure 38:
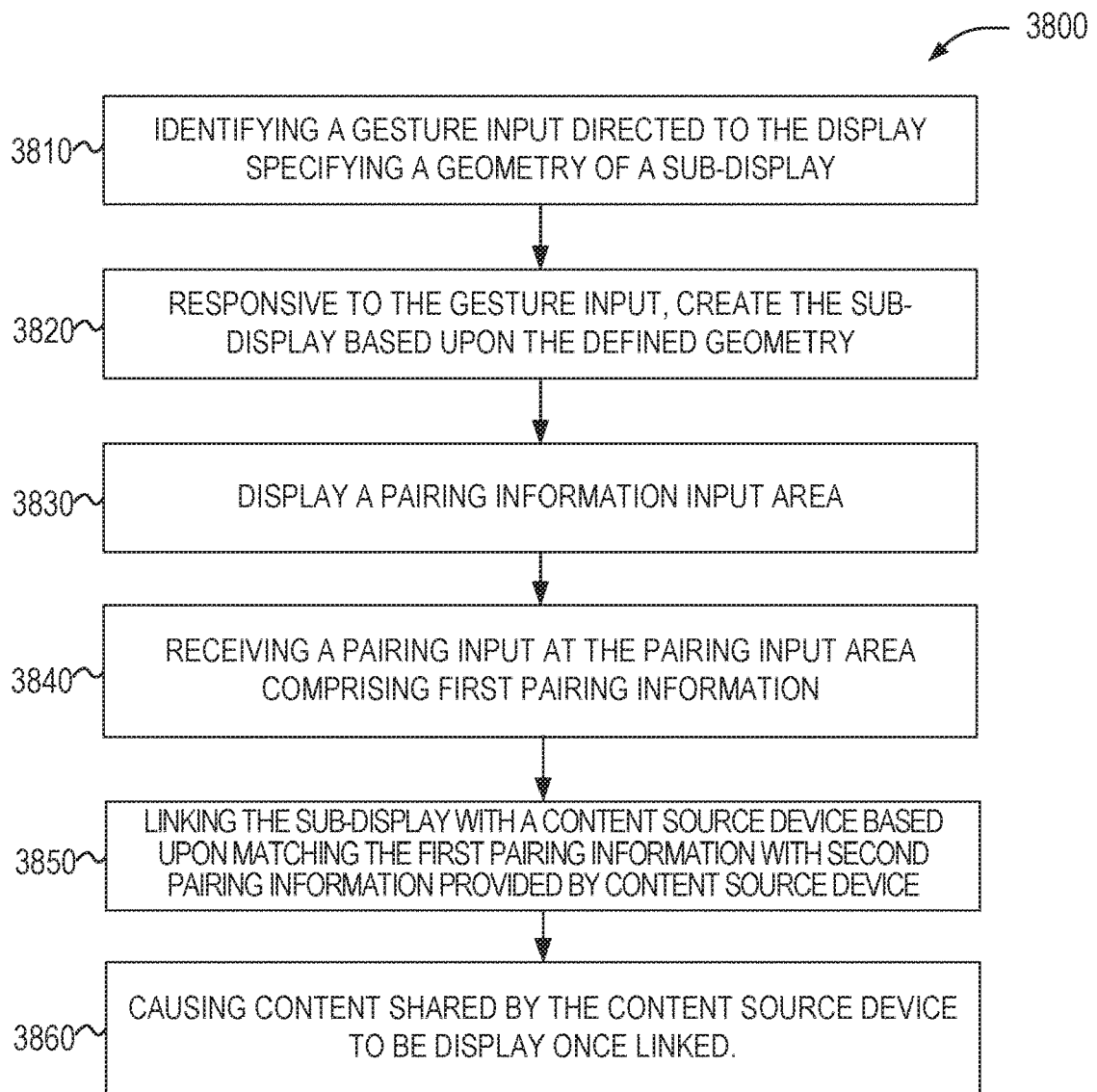
FIG. 38 illustrates a flowchart of a method of pairing according to some examples of the present disclosure.

FIG. 38 illustrates a flowchart of a method 3800 of pairing according to some examples of the present disclosure. At operation 3810, the display control system and/or display may identify a gesture input directed to the display specifying a geometry of a sub-display. For example, the display may send a notification to the display control system in response to detecting a gesture to designate the sub-display.

At operation 3820, responsive to the gesture input, the display system may create a sub-display based upon the defined geometry. As previously noted this may entail creating one or more data structures and in some examples, visually indicating the sub-display on the display. At operation 3830, the display may render and display a pairing information input area. For example, a pairing tab 630, 730, or 830 which allows for the input of pairing information such as biometrics, PIN codes, and the like.

At operation 3840, the display or other input device may detect input of pairing information at the pairing information input area. The pairing information may include a PIN (e.g., via a reverse pairing process previously described wherein the content source device determines a PIN and displays it to the user who enters it into the pairing information input area), a biometric scan of the user, authentication credentials of an account of a user, an alphanumeric value, and the like. This pairing information may be stored in one or more data structures, such as a sub-display information data structure 950 in one or more data storage areas.

At operation 3850, the system may link the sub-display with a content source device based upon matching the first pairing information received at the pairing input area with second pairing information provided by the content source device. For example, the content source device may send a pairing request with the second pairing information. As with the first pairing information, the second pairing information may be a PIN, authentication credentials of an account of a user, an alphanumeric value, biometric scan information from a biometric scan taken by the content source device, or the like. For example, the system may search for a sub-display information data structure with matching pairing information. Once a match is found, the sub-display with the matching information is linked (i.e., paired), with the content source device.

At operation 3860, the display and/or display control system may cause content sent by the content source device to be displayed in the sub-display. For example, the display control system may send the content to the display with the sub-display identifier. The display may receive the content, either directly from the content source device or from the content source device via the display control system and may render the content within the geometry established at operation 3810.

Figure 39:
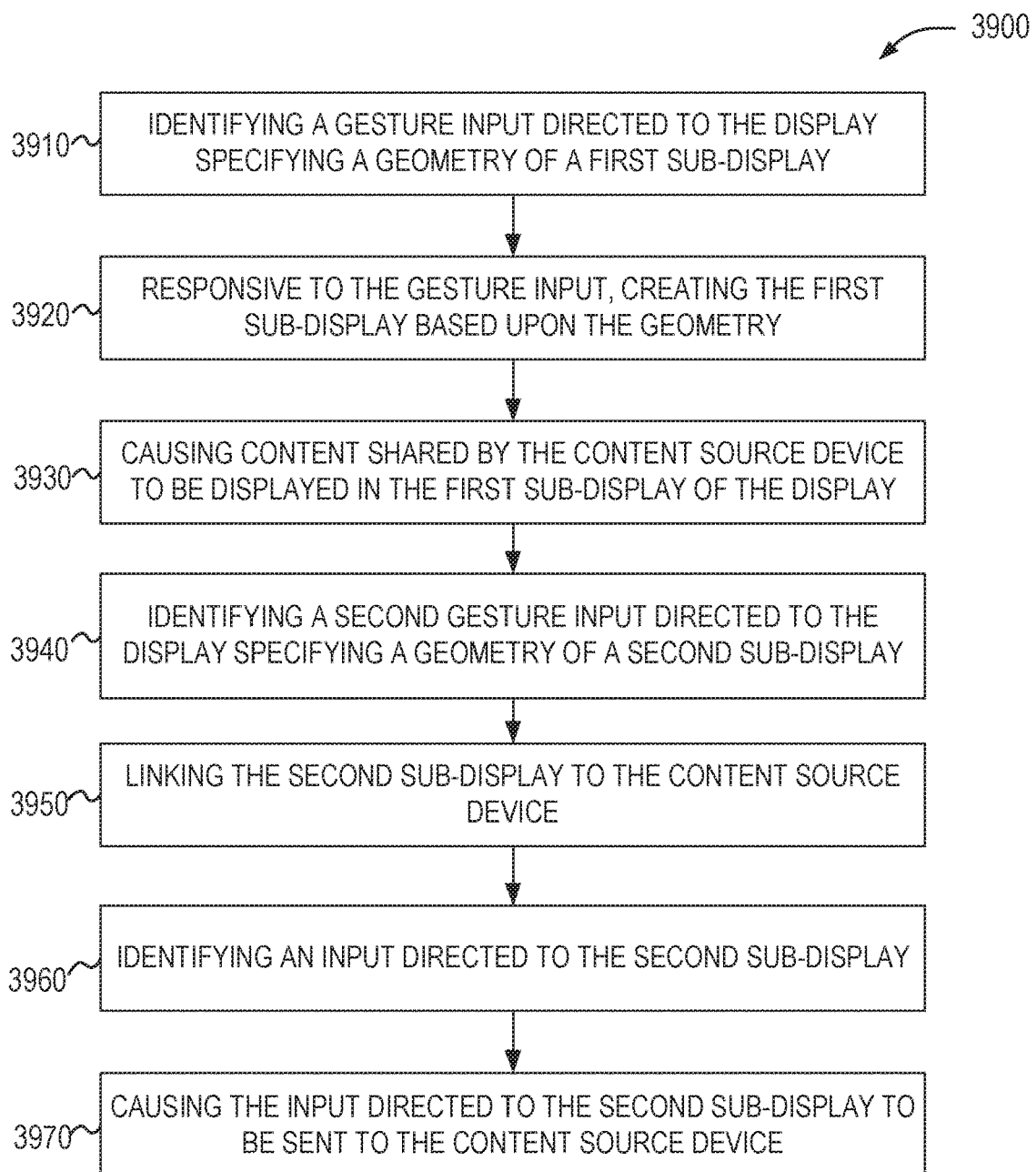
FIG. 39 illustrates a flowchart of a method of an input sub-display according to some examples of the present disclosure.

FIG. 39 illustrates a flowchart of a method 3900 of an input sub-display according to some examples of the present disclosure. At operation 3910, the display control system and/or display may identify a gesture input directed to the display specifying a geometry of a first sub-display. For example, the display may send a notification to the display control system in response to detecting a gesture to designate the sub-display. At operation 3920, responsive to the gesture input, the display control system and/or display may create the first sub-display. At operation 3930, the display and/or display control system may cause content sent by the content source device to be displayed in the first sub-display. For example, the display control system may send the content to the display with the sub-display identifier. The display may receive the content, either directly from the content source device or from the content source device via the display control system and may render the content within the geometry established at operation 3910.

At operation 3940 a second gesture input directed to the display specifying a geometry of a second sub-display may be identified as previously described for operation 3910. At operation 3950, the second sub-display may be linked to the content source device. At operation 3960, an input may be identified that is directed to the second sub-display. For example, by comparing coordinates of an input to coordinates of the sub-displays on the display. At operation 3970, the input directed to the second sub-display are sent to the content source device. In some examples, the input may be hidden—that is, it is not displayed on the first and/or second sub-display. As previously noted, the input may be to content displayed on the first sub-display or may be directed to content linked to the content displayed on the first sub-display. While FIG. 39 showed an example where the creation and pairing of a sub-display that displays content with the remote content source device prior to designating and pairing an input sub-display, in some examples, an input-only sub-display may be defined first. In still other examples, only an input-only sub-display may be defined. That is, the methods disclosed do not require the creation and pairing of a sub-display showing content with the remote content source device.

Figure 40:
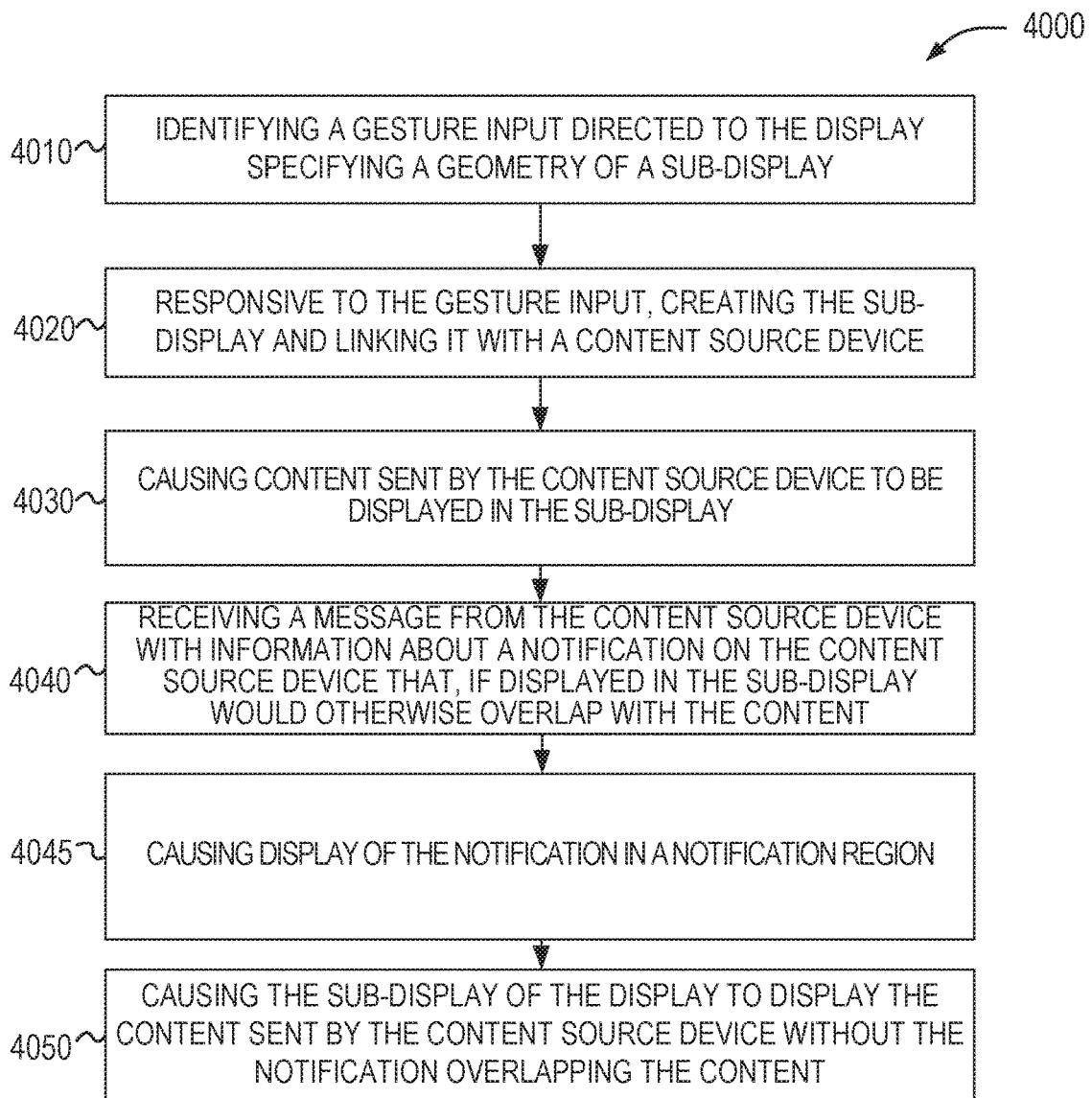
FIG. 40 illustrates a flowchart of a method of providing notifications according to some examples of the present disclosure.

FIG. 40 illustrates a flowchart 4000 of a method of providing notifications according to some examples of the present disclosure. At operation 4010, the display control system and/or display may identify a gesture input directed to the display specifying a geometry of a first sub-display as previously described. At operation 4020, responsive to the gesture input, the display control system and/or display may create a sub-display and link the sub-display to a content source device utilizing a linking (i.e., pairing) procedure as described herein. At operation 4030, content sent by the content source device is caused to be displayed in the sub-display as described elsewhere herein.

At operation 4040, the content source device may send, and the display control system may receive information about a notification on the content source device that, if displayed in the sub-display, would otherwise overlap with the content. For example, the content sent by the content source device for display in the sub-display maybe a stream of content (e.g., a screenshare) and a notification may pop-up on the screen. The content source device may detect this (e.g., through an API of an operating system) and may send a notification to the display control system. The notification may include content beneath the notification location (e.g., content obscured by the displayed notification). The content source device may obtain the content beneath the notification location by accessing the rendering pipeline for the content and copying the area beneath where the notification is to be displayed—e.g., through an operating system. In some examples, content sent by the content source device for display in the sub-display may have one or more layers, the layers may include a notification layer that is to be rendered on the content. The notification at operation 4040 may indicate to the display control system that there is a notification layer in the content. In still other examples, the content received from the content source device may not be a notification and operation 4040 is not a message from the content source device, but rather detecting a notification using machine-vision techniques as described herein.

At operation 4045, the display control system may cause display of the notification received at operation 4040 or within the content in a notification region. The notification region may be another sub-display (which may be automatically created), a notification area, such as notification area 1130, or the like.

At operation 4050, the sub-display is caused to display the content sent by the content source device without the notification overlapping the content. That is, the notification layer may not be shown, the notification in the content may be replaced by the received content that is under the notification (e.g., from the computing device), or the like. In some examples, the display control system or the content source device may determine the content below a notification based upon content that was in that location prior to the notification. In other examples, the notification is not included by the content source device in the content sent for display in the sub-display and the notification is not displayed therein, but in the notification area (region).

Figure 41:
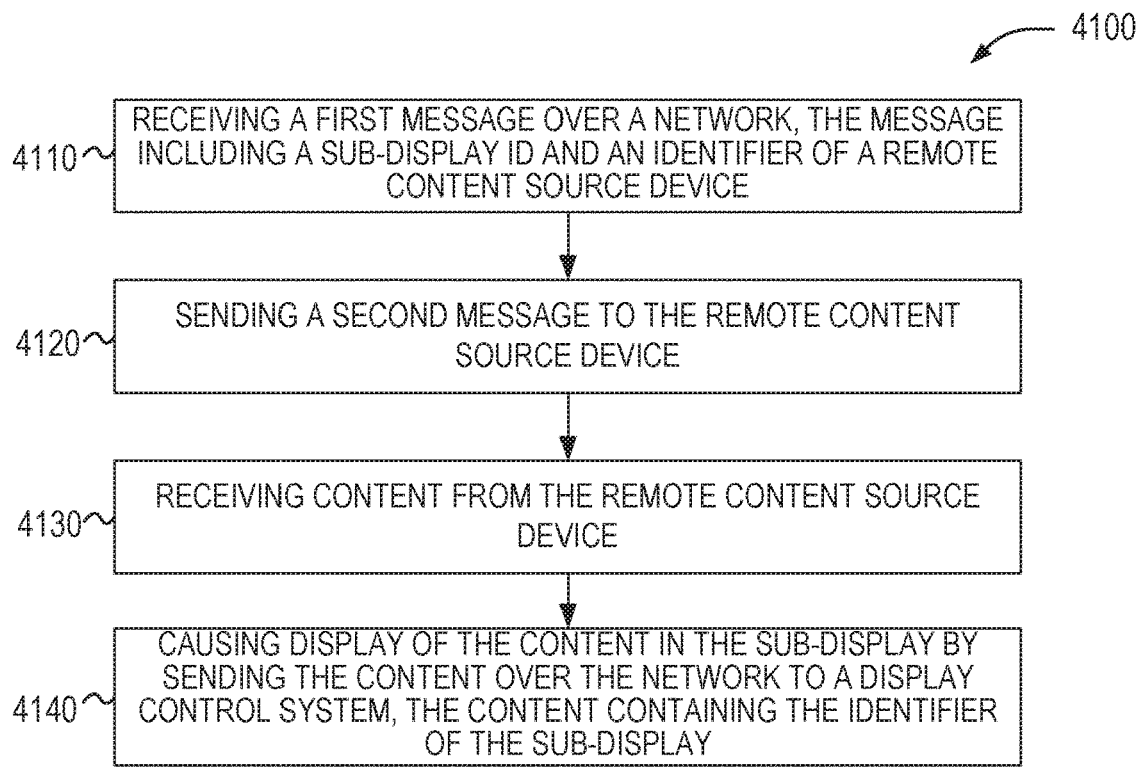
FIG. 41 illustrates a flowchart of a method of designating a sub-display area for a remote content source device that is not in physical proximity to the display according to some examples of the present disclosure.

FIG. 41 illustrates a flowchart of a method 4100 of designating a sub-display area for a remote content source device that is not in physical proximity to the display according to some examples of the present disclosure. The method of FIG. 41 may be performed by a communication server providing a communications service (e.g., a server providing a MICROSOFT TEAMS® service) (e.g., communication service 960).

At operation 4110, the communication server may receive a first message over a network. The first message may be received from a computing device (e.g., a computing device local to the display) or the display control system. In some examples, the first message may include a sub-display identifier and an identifier of a remote content source device. In some examples where the first message is not received from the display control system and/or where the display control system may not be already known to the communication server, the first message may include an address of a display control system that may be used by the communication server to reach the display control system. In some examples, the first message links the sub-display with the remote content source device. That is, the message may be an indication that the display control system has linked the sub-display with the remote content source device. In other examples, the message may indirectly cause the linking (through later messaging) of the sub-display with the remote content source device.

As noted, the first message may be received from a computing device (e.g., the computing device of the user that designates the display) that is not the display control system or may be received directly from the display control system (e.g., the user that designates the sub-display may also input—through a U/I of the display—the remote content source device). In some examples, the identifier of the remote content source device may be a user identifier—that is, the remote content source device is identified by the user that is authenticated to that device. This authentication may be determined by the communication server that provides the communication service.

At operation 4120, the communication server may send a second message to the remote content source device. This message may indicate that the sub-display is linked to the remote content source device. The remote content source device may receive this message and prompt the user to select content to share (or decline to share).

At operation 4130, the content is received by the server from the remote content source device. At operation 4140, the communication server may cause display of the content in the sub-display by sending the content over the network to the display control system. The communication server may include the identifier of the sub-display along with the content. By including the sub-display identifier within the content, the communication server is specifying which sub-display to display this content in. Including the sub-display identifier within the content may include placing the sub-display identifier within the content, as metadata to the content, in a header of the packets sent with the content, or the like.

FIG. 41 covers both a scenario such as shown in FIG. 9, as well as a scenario such as where the local computing device 920 is not participating in the flow described therein, and instead the message (e.g., message 912) is sent by the display control system 940. The display control system 940 may be known to the communication service 960 as a result of the participation of the display control system 940 in one or more network-based communication sessions.

Content sharing, as used herein refers to the process by which a piece of content on a first device is shared with another device. This sharing may be contemporaneous with the presentation of content on the content source device such that the presentation of the content on other devices may happen within a determined time period after the content is displayed on or sent from the content source device. In some examples, content sharing may be content streaming or content casting.

Communication modalities, as used herein, denotes different communication methods. For example, email, text messaging, chat messaging, video calls, phone calls are all different communication modalities. A communication application may offer multiple communication modalities, and even may offer multiple communication modalities during a same communication session.

As used herein, pairing information may be a PIN that is used to refer to a sequence of numbers and/or letters that is used to match a particular sub-display to a particular content source device. In some examples, the PIN may then be provided with the content sent by the remote content source device to uniquely identify a destination sub-display. In other examples, once pairing is complete, some other identifier may be utilized. For example, the display control system may have a mapping between Internet Protocol (IP) addresses of the content source devices and sub-displays that was determined through the pairing process (e.g., by a request to share content sent by the remote content sharing device that includes the PIN). In other examples, PINs may or may not be unique and after pairing a new unique identifier is created and communicated to content source devices and stored with the sub-display information. The content source devices may attach this unique identifier to the content.

For example, when utilizing biometric pairing, the display control system, display, and/or content source device may create a unique identifier for the sub-display during pairing that is then used to reference that sub-display when sending content or performing other display operations. In other examples, as mentioned above, the IP address of the content source device is used to link the content source device with the sub-display and no identifier of the sub-display is needed.

In examples in which the content source devices send content without a sub-display identifier, the display control system may still use a unique sub-display identifier when sending the content to the display to enable the display to display the content in the proper sub-display. In yet other examples, the display control system may simply specify coordinates where to display the content on the display.

The present disclosure may also allow for sub-displays for showing content and collaborating. For example, a virtual whiteboard where users may draw input on the display wall and the input is sent to a content source device. Other users of the content source device may draw on the whiteboard on the content source device and those updates may be reflected on the display. This virtual shared whiteboard may also be utilized when the source device is remote (e.g., FIG. 9).

It will be appreciated by one of ordinary skill in the art with the benefit of the present disclosure that while various functionalities are ascribed to particular devices and to particular components or modules within those devices that such descriptions are exemplary. Other configurations are possible and contemplated such that the functionality ascribed to a particular device and/or component may be performed by a different device and/or component.

Figure 42:
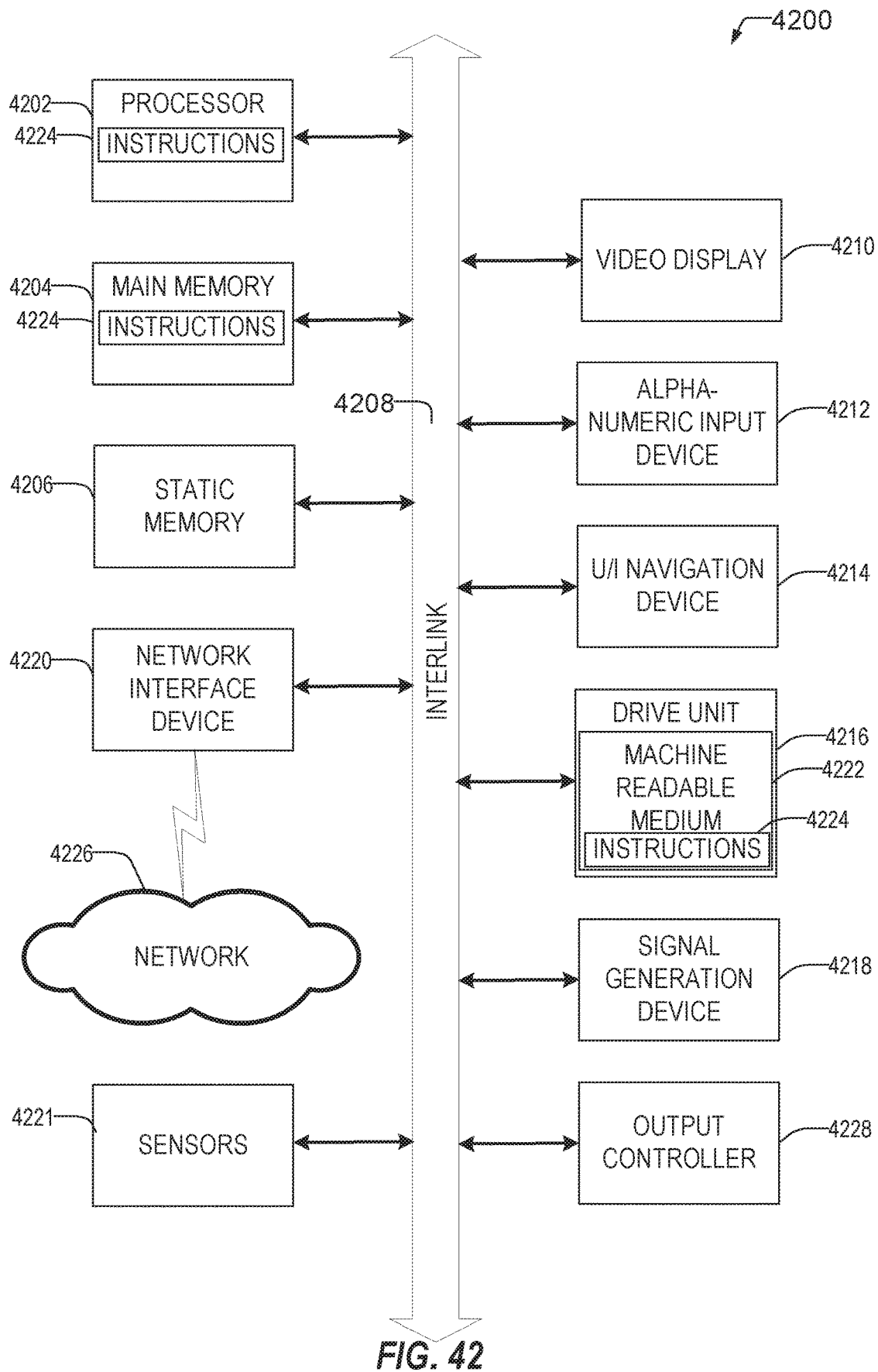
FIG. 42 is a block diagram illustrating an example of a machine upon which one or more embodiments may be implemented.

FIG. 42 illustrates a block diagram of an example machine 4200 upon which any one or more of the techniques (e.g., methodologies) discussed herein may be implemented. In alternative embodiments, the machine 4200 may operate as a standalone device or may be connected (e.g., networked) to other machines. In a networked deployment, the machine 4200 may operate in the capacity of a server machine, a client machine, or both in server-client network environments. In an example, the machine 4200 may act as a peer machine in peer-to-peer (P2P) (or other distributed) network environment. The machine 4200 may be a display, display control system, content source device, remote content source device, computing device, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 4200 may be configured to implement the processes, create the GUIs, and be configured with the components of FIGS. 1-41 and 43. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 4200 may include a hardware processor 4202 (e.g., a central processing unit (CPU), a graphics processing unit (GPU), a hardware processor core, or any combination thereof), a main memory 4204 and a static memory 4206, some or all of which may communicate with each other via an interlink (e.g., bus) 4208. The machine 4200 may further include a display unit 4210, an alphanumeric input device 4212 (e.g., a keyboard), and a user interface (UI) navigation device 4214 (e.g., a mouse). In an example, the display unit 4210, input device 4212 and UI navigation device 4214 may be a touch screen display. The machine 4200 may additionally include a storage device (e.g., drive unit) 4216, a signal generation device 4218 (e.g., a speaker), a network interface device 4220, and one or more sensors 4221, such as a global positioning system (GPS) sensor, compass, accelerometer, or other sensor. The machine 4200 may include an output controller 4228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4216 may include a machine readable medium 4222 on which is stored one or more sets of data structures or instructions 4224 (e.g., software) embodying or utilized by any one or more of the techniques or functions described herein. The instructions 4224 may also reside, completely or at least partially, within the main memory 4204, within static memory 4206, or within the hardware processor 4202 during execution thereof by the machine 4200. In an example, one or any combination of the hardware processor 4202, the main memory 4204, the static memory 4206, or the storage device 4216 may constitute machine readable media.

While the machine readable medium 4222 is illustrated as a single medium, the term "machine readable medium" may include a single medium or multiple media (e.g., a centralized or distributed database, and/or associated caches and servers) configured to store the one or more instructions 4224.

The term "machine readable medium" may include any medium that is capable of storing, encoding, or carrying instructions for execution by the machine 4200 and that cause the machine 4200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 4224 may further be transmitted or received over a communications network 4226 using a transmission medium via the network interface device 4220. The Machine 4200 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4220 may include one or more physical jacks (e.g., Ethernet, coaxial, or phone jacks) or one or more antennas to connect to the communications network 4226. In an example, the network interface device 4220 may include a plurality of antennas to wirelessly communicate using at least one of single-input multiple-output (SIMO), multiple-input multiple-output (MIMO), or multiple-input single-output (MISO) techniques. In some examples, the network interface device 4220 may wirelessly communicate using Multiple User MIMO techniques.

OTHER NOTES AND EXAMPLES

Example 1 is a method of designating a sub-display area, the method comprising: using one or more hardware processors: identifying a gesture input directed to a display surface of a display, the gesture input defining a geometry of a sub-display on the display, the sub-display encompassing different coordinates than a previously specified sub-display; responsive to identifying the gesture input, creating the sub-display based upon the geometry and linking the sub-display with a content source device; and responsive to creating the sub-display and linking the sub-display with the content source device, causing content shared by the content source device to be displayed in the sub-display of the display contemporaneously with different content shared in the previously specified sub-display.

In Example 2, the subject matter of Example 1 includes, wherein the content shared in the previously specified sub-display is shared by a second content source device.

In Example 3, the subject matter of Examples 1-2 includes, wherein the method further comprises: identifying a corrected geometric shape based upon a first shape produced by the geometry of the sub-display, the corrected geometric shape most similar of a plurality of corrected geometric shapes to the first shape; and wherein creating the sub-display based upon the geometry comprises creating the sub-display using the corrected geometric shape.

In Example 4, the subject matter of Example 3 includes, wherein the corrected geometric shape is a polygon with more than four sides.

In Example 5, the subject matter of Examples 3-4 includes, wherein the corrected geometric shape is a circle.

In Example 6, the subject matter of Examples 3-5 includes, wherein identifying the corrected geometric shape occurs as the gesture input is in progress, and wherein the method comprises updating an outline of the gesture input to match the corrected geometric shape.

In Example 7, the subject matter of Examples 1-6 includes, wherein the different content shared in the previously specified sub-display is shared by the content source device.

In Example 8, the subject matter of Examples 1-7 includes, identifying an input directed to the display surface of the display in a location corresponding to the sub-display; and responsive to determining that the input is directed to the sub-display, sending the input to the content source device based upon the linking of the sub-display and the content source device.

In Example 9, the subject matter of Example 8 includes, wherein sending the input to the content source device comprises sending an identifier of the sub-display to the content source device, the content source device routing the input to an application based upon the sub-display identifier.

In Example 10, the subject matter of Examples 1-9 includes, identifying a first and second simultaneous input, both directed to the display surface; determining that the first simultaneous input is directed to the sub-display; responsive to determining that the first simultaneous input is directed to the sub-display, sending the first simultaneous input to the content source device; determining that the second simultaneous input is directed to the previously specified sub-display; and responsive to determining that the second simultaneous input is directed to the previously specified sub-display, sending the second simultaneous input to a second content source device linked to the previously specified sub-display.

In Example 11, the subject matter of Example 10 includes, wherein determining that the first simultaneous input is directed to the sub-display comprises determining that a coordinate of the first simultaneous input on the display corresponds to a coordinate belonging to the sub-display.

In Example 12, the subject matter of Examples 1-11 includes, causing display of a geometric shape that defines boundaries of the sub-display.

In Example 13, the subject matter of Examples 1-12 includes, wherein responsive to creating the sub-display and linking the sub-display with the content source device, causing content shared by the content source device to be displayed in the sub-display of the display comprises: providing an address of the display to the content source device, and wherein the content source device sends the content to the address.

In Example 14, the subject matter of Examples 1-13 includes, wherein responsive to creating the sub-display and linking the sub-display with the content source device, causing content shared by the content source device to be displayed in the sub-display of the display comprises: receiving the content from the content source device; and sending the content to the display.

In Example 15, the subject matter of Examples 1-14 includes, wherein responsive to creating the sub-display and linking the sub-display with the content source device, causing content shared by the content source device to be displayed in the sub-display of the display comprises: receiving the content from the content source device; and rendering the content on the display in the sub-display.

In Example 16, the subject matter of Examples 1-15 includes, wherein the one or more hardware processors are communicatively coupled through a local bus with the display.

In Example 17, the subject matter of Examples 1-16 includes, wherein the one or more hardware processors are communicatively coupled to the display through a packet-based Internet Protocol network.

In Example 18, the subject matter of Examples 1-17 includes, wherein the display is a touchscreen display and wherein the gesture input is a touch input on the display surface.

In Example 19, the subject matter of Examples 1-18 includes, wherein the display surface is a projection screen and the display is provided by a projector.

In Example 20, the subject matter of Examples 1-19 includes, displaying a prompt on the display, the prompt indicating that the display has additional free space not occupied by sub-displays, the prompt offering a user a selection to automatically increase a size of the sub-display to fill the additional free space; and responsive to receiving an indication to increase the size of the sub-display, increasing the size of the sub-display.

In Example 21, the subject matter of Example 20 includes, wherein the prompt is displayed based upon a determination that the content is being scaled to fit in the sub-display.

In Example 22, the subject matter of Examples 1-21 includes, wherein the content is content of a first source and the different content from a second source, and wherein the method further comprises: displaying a prompt on the display, the prompt suggesting automatically creating a new sub-display with content from a third source, the first and third sources both from the content source device; and responsive to receiving an indication to create the new sub-display, creating the new sub-display and displaying the content from the third source.

In Example 23, the subject matter of Example 22 includes, wherein the first and third sources are different communication types provided by a communication application executing on the content source device.

In Example 24, the subject matter of Examples 22-23 includes, wherein displaying the prompt is responsive to determining that the display has additional free space not occupied by sub-displays and that the content source device includes the third content source not displayed in a sub-display.

In Example 25, the subject matter of Examples 1-24 includes, wherein identifying the gesture input comprises receiving an indication of the gesture input from the display.

In Example 26, the subject matter of Examples 1-25 includes, wherein identifying the gesture input comprises detecting the gesture input at a touchscreen of the display.

Example 27 is a computing device for designating a sub-display area, the device comprising: one or more hardware processors; a memory, comprising instructions, which when executed by the one or more hardware processors, cause the one or more hardware processors to perform operations comprising: identifying a gesture input directed to a display surface of a display, the gesture input defining a geometry of a sub-display on the display, the sub-display encompassing different coordinates than a previously specified sub-display; responsive to identifying the gesture input, creating the sub-display based upon the geometry and linking the sub-display with a content source device; and responsive to creating the sub-display and linking the sub-display with the content source device, causing content shared by the content source device to be displayed in the sub-display of the display contemporaneously with different content shared in the previously specified sub-display.

In Example 28, the subject matter of Example 27 includes, wherein the content shared in the previously specified sub-display is shared by a second content source device.

In Example 29, the subject matter of Examples 27-28 includes, wherein the operations further comprise: identifying a corrected geometric shape based upon a first shape produced by the geometry of the sub-display, the corrected geometric shape most similar of a plurality of corrected geometric shapes to the first shape; and wherein creating the sub-display based upon the geometry comprises creating the sub-display using the corrected geometric shape.

In Example 30, the subject matter of Example 29 includes, wherein the corrected geometric shape is a polygon with more than four sides.

In Example 31, the subject matter of Examples 29-30 includes, wherein the corrected geometric shape is a circle.

In Example 32, the subject matter of Examples 29-31 includes, wherein the operations of identifying the corrected geometric shape occurs as the gesture input is in progress, and wherein the operations further comprise updating an outline of the gesture input to match the corrected geometric shape.

In Example 33, the subject matter of Examples 27-32 includes, wherein the different content shared in the previously specified sub-display is shared by the content source device.

In Example 34, the subject matter of Examples 27-33 includes, wherein the operations further comprise: identifying an input directed to the display surface of the display in a location corresponding to the sub-display; and responsive to determining that the input is directed to the sub-display, sending the input to the content source device based upon the linking of the sub-display and the content source device.

In Example 35, the subject matter of Example 34 includes, wherein the operations of sending the input to the content source device comprises sending an identifier of the sub-display to the content source device, the content source device routing the input to an application based upon the sub-display identifier.

In Example 36, the subject matter of Examples 27-35 includes, wherein the operations further comprise: identifying a first and second simultaneous input, both directed to the display surface; determining that the first simultaneous input is directed to the sub-display; responsive to determining that the first simultaneous input is directed to the sub-display, sending the first simultaneous input to the content source device; determining that the second simultaneous input is directed to the previously specified sub-display; and responsive to determining that the second simultaneous input is directed to the previously specified sub-display, sending the second simultaneous input to a second content source device linked to the previously specified sub-display.

In Example 37, the subject matter of Example 36 includes, wherein the operations of determining that the first simultaneous input is directed to the sub-display comprises determining that a coordinate of the first simultaneous input on the display corresponds to a coordinate belonging to the sub-display.

In Example 38, the subject matter of Examples 27-37 includes, wherein the operations further comprise: causing display of a geometric shape that defines boundaries of the sub-display.

In Example 39, the subject matter of Examples 27-38 includes, wherein the operations of responsive to creating the sub-display and linking the sub-display with the content source device, causing content shared by the content source device to be displayed in the sub-display of the display comprises: providing an address of the display to the content source device, and wherein the content source device sends the content to the address.

In Example 40, the subject matter of Examples 27-39 includes, wherein the operations of responsive to creating the sub-display and linking the sub-display with the content source device, causing content shared by the content source device to be displayed in the sub-display of the display comprises: receiving the content from the content source device; and sending the content to the display.

In Example 41, the subject matter of Examples 27-40 includes, wherein the operations of responsive to creating the sub-display and linking the sub-display with the content source device, causing content shared by the content source device to be displayed in the sub-display of the display comprises: receiving the content from the content source device; and rendering the content on the display in the sub-display.

In Example 42, the subject matter of Examples 27-41 includes, wherein the one or more hardware processors are communicatively coupled through a local bus with the display.

In Example 43, the subject matter of Examples 27-42 includes, wherein the one or more hardware processors are communicatively coupled to the display through a packet-based Internet Protocol network.

In Example 44, the subject matter of Examples 27-43 includes, wherein the display is a touchscreen display and wherein the gesture input is a touch input on the display surface.

In Example 45, the subject matter of Examples 27-44 includes, wherein the display surface is a projection screen and the display is provided by a projector.

In Example 46, the subject matter of Examples 27-45 includes, wherein the operations further comprise: displaying a prompt on the display, the prompt indicating that the display has additional free space not occupied by sub-displays, the prompt offering a user a selection to automatically increase a size of the sub-display to fill the additional free space; and responsive to receiving an indication to increase the size of the sub-display, increasing the size of the sub-display.

In Example 47, the subject matter of Example 46 includes, wherein the prompt is displayed based upon a determination that the content is being scaled to fit in the sub-display.

In Example 48, the subject matter of Examples 27-47 includes, wherein the content is content of a first source and the different content from a second source, and wherein the operations further comprise: displaying a prompt on the display, the prompt suggesting automatically creating a new sub-display with content from a third source, the first and third sources both from the content source device; and responsive to receiving an indication to create the new sub-display, creating the new sub-display and displaying the content from the third source.

In Example 49, the subject matter of Example 48 includes, wherein the first and third sources are different communication types provided by a communication application executing on the content source device.

In Example 50, the subject matter of Examples 48-49 includes, wherein the operations of displaying the prompt is responsive to determining that the display has additional free space not occupied by sub-displays and that the content source device includes the third content source not displayed in a sub-display.

In Example 51, the subject matter of Examples 27-50 includes, wherein the operations of identifying the gesture input comprises receiving an indication of the gesture input from the display.

In Example 52, the subject matter of Examples 27-51 includes, wherein the operations of identifying the gesture input comprises detecting the gesture input at a touchscreen of the display.

Example 53 is a machine-readable medium, storing instructions for designating a sub-display area, the instructions, when executed by a machine, cause the machine to perform operations comprising: identifying a gesture input directed to a display surface of a display, the gesture input defining a geometry of a sub-display on the display, the sub-display encompassing different coordinates than a previously specified sub-display; responsive to identifying the gesture input, creating the sub-display based upon the geometry and linking the sub-display with a content source device; and responsive to creating the sub-display and linking the sub-display with the content source device, causing content shared by the content source device to be displayed in the sub-display of the display contemporaneously with different content shared in the previously specified sub-display.

In Example 54, the subject matter of Example 53 includes, wherein the content shared in the previously specified sub-display is shared by a second content source device.

In Example 55, the subject matter of Examples 53-54 includes, wherein the operations further comprise: identifying a corrected geometric shape based upon a first shape produced by the geometry of the sub-display, the corrected geometric shape most similar of a plurality of corrected geometric shapes to the first shape; and wherein creating the sub-display based upon the geometry comprises creating the sub-display using the corrected geometric shape.

In Example 56, the subject matter of Example 55 includes, wherein the corrected geometric shape is a polygon with more than four sides.

In Example 57, the subject matter of Examples 55-56 includes, wherein the corrected geometric shape is a circle.

In Example 58, the subject matter of Examples 55-57 includes, wherein the operations of identifying the corrected geometric shape occurs as the gesture input is in progress, and wherein the operations further comprise updating an outline of the gesture input to match the corrected geometric shape.

In Example 59, the subject matter of Examples 53-58 includes, wherein the different content shared in the previously specified sub-display is shared by the content source device.

In Example 60, the subject matter of Examples 53-59 includes, wherein the operations further comprise: identifying an input directed to the display surface of the display in a location corresponding to the sub-display; and responsive to determining that the input is directed to the sub-display, sending the input to the content source device based upon the linking of the sub-display and the content source device.

In Example 61, the subject matter of Example 60 includes, wherein the operations of sending the input to the content source device comprises sending an identifier of the sub-display to the content source device, the content source device routing the input to an application based upon the sub-display identifier.

In Example 62, the subject matter of Examples 53-61 includes, wherein the operations further comprise: identifying a first and second simultaneous input, both directed to the display surface; determining that the first simultaneous input is directed to the sub-display; responsive to determining that the first simultaneous input is directed to the sub-display, sending the first simultaneous input to the content source device; determining that the second simultaneous input is directed to the previously specified sub-display; and responsive to determining that the second simultaneous input is directed to the previously specified sub-display, sending the second simultaneous input to a second content source device linked to the previously specified sub-display.

In Example 63, the subject matter of Example 62 includes, wherein the operations of determining that the first simultaneous input is directed to the sub-display comprises determining that a coordinate of the first simultaneous input on the display corresponds to a coordinate belonging to the sub-display.

In Example 64, the subject matter of Examples 53-63 includes, wherein the operations further comprise: causing display of a geometric shape that defines boundaries of the sub-display.

In Example 65, the subject matter of Examples 53-64 includes, wherein the operations of responsive to creating the sub-display and linking the sub-display with the content source device, causing content shared by the content source device to be displayed in the sub-display of the display comprises: providing an address of the display to the content source device, and wherein the content source device sends the content to the address.

In Example 66, the subject matter of Examples 53-65 includes, wherein the operations of responsive to creating the sub-display and linking the sub-display with the content source device, causing content shared by the content source device to be displayed in the sub-display of the display comprises: receiving the content from the content source device; and sending the content to the display.

In Example 67, the subject matter of Examples 53-66 includes, wherein the operations of responsive to creating the sub-display and linking the sub-display with the content source device, causing content shared by the content source device to be displayed in the sub-display of the display comprises: receiving the content from the content source device; and rendering the content on the display in the sub-display.

In Example 68, the subject matter of Examples 53-67 includes, wherein the machine is communicatively coupled through a local bus with the display.

In Example 69, the subject matter of Examples 53-68 includes, wherein the machine is communicatively coupled to the display through a packet-based Internet Protocol network.

In Example 70, the subject matter of Examples 53-69 includes, wherein the display is a touchscreen display and wherein the gesture input is a touch input on the display surface.

In Example 71, the subject matter of Examples 53-70 includes, wherein the display surface is a projection screen and the display is provided by a projector.

In Example 72, the subject matter of Examples 53-71 includes, wherein the operations further comprise: displaying a prompt on the display, the prompt indicating that the display has additional free space not occupied by sub-displays, the prompt offering a user a selection to automatically increase a size of the sub-display to fill the additional free space; and responsive to receiving an indication to increase the size of the sub-display, increasing the size of the sub-display.

In Example 73, the subject matter of Example 72 includes, wherein the prompt is displayed based upon a determination that the content is being scaled to fit in the sub-display.

In Example 74, the subject matter of Examples 53-73 includes, wherein the content is content of a first source and the different content from a second source, and wherein the operations further comprise: displaying a prompt on the display, the prompt suggesting automatically creating a new sub-display with content from a third source, the first and third sources both from the content source device; and responsive to receiving an indication to create the new sub-display, creating the new sub-display and displaying the content from the third source.

In Example 75, the subject matter of Example 74 includes, wherein the first and third sources are different communication types provided by a communication application executing on the content source device.

In Example 76, the subject matter of Examples 74-75 includes, wherein the operations of displaying the prompt is responsive to determining that the display has additional free space not occupied by sub-displays and that the content source device includes the third content source not displayed in a sub-display.

In Example 77, the subject matter of Examples 53-76 includes, wherein the operations of identifying the gesture input comprises receiving an indication of the gesture input from the display.

In Example 78, the subject matter of Examples 53-77 includes, wherein the operations of identifying the gesture input comprises detecting the gesture input at a touchscreen of the display.

Example 79 is a device for designating a sub-display area, the device comprising: means for identifying a gesture input directed to a display surface of a display, the gesture input defining a geometry of a sub-display on the display, the sub-display encompassing different coordinates than a previously specified sub-display; means for creating, responsive to identifying the gesture input, the sub-display based upon the geometry and linking the sub-display with a content source device; and means for causing content shared by the content source device to be displayed in the sub-display of the display contemporaneously with different content shared in the previously specified sub-display responsive to creating the sub-display and linking the sub-display with the content source device.

In Example 80, the subject matter of Example 79 includes, wherein the content shared in the previously specified sub-display is shared by a second content source device.

In Example 81, the subject matter of Examples 79-80 includes, wherein the device further comprises: means for identifying a corrected geometric shape based upon a first shape produced by the geometry of the sub-display, the corrected geometric shape most similar of a plurality of corrected geometric shapes to the first shape; and wherein creating the sub-display based upon the geometry comprises creating the sub-display using the corrected geometric shape.

In Example 82, the subject matter of Example 81 includes, wherein the corrected geometric shape is a polygon with more than four sides.

In Example 83, the subject matter of Examples 81-82 includes, wherein the corrected geometric shape is a circle.

In Example 84, the subject matter of Examples 81-83 includes, wherein the means for identifying the corrected geometric shape occurs as the gesture input is in progress, and wherein the device further comprises means for updating an outline of the gesture input to match the corrected geometric shape.

In Example 85, the subject matter of Examples 79-84 includes, wherein the different content shared in the previously specified sub-display is shared by the content source device.

In Example 86, the subject matter of Examples 79-85 includes, means for identifying an input directed to the display surface of the display in a location corresponding to the sub-display; and means for sending the input to the content source device based upon the linking of the sub-display and the content source device responsive to determining that the input is directed to the sub-display.

In Example 87, the subject matter of Example 86 includes, wherein the means for sending the input to the content source device comprises means for sending an identifier of the sub-display to the content source device, the content source device routing the input to an application based upon the sub-display identifier.

In Example 88, the subject matter of Examples 79-87 includes, means for identifying a first and second simultaneous input, both directed to the display surface; means for determining that the first simultaneous input is directed to the sub-display; means for sending the first simultaneous input to the content source device responsive to determining that the first simultaneous input is directed to the sub-display; means for determining that the second simultaneous input is directed to the previously specified sub-display; and means for sending the second simultaneous input to a second content source device linked to the previously specified sub-display responsive to determining that the second simultaneous input is directed to the previously specified sub-display.

In Example 89, the subject matter of Example 88 includes, wherein the means for determining that the first simultaneous input is directed to the sub-display comprises means for determining that a coordinate of the first simultaneous input on the display corresponds to a coordinate belonging to the sub-display.

In Example 90, the subject matter of Examples 79-89 includes, means for causing display of a geometric shape that defines boundaries of the sub-display.

In Example 91, the subject matter of Examples 79-90 includes, wherein the means for causing content shared by the content source device to be displayed in the sub-display of the display comprises: means for providing an address of the display to the content source device, and wherein the content source device sends the content to the address.

In Example 92, the subject matter of Examples 79-91 includes, wherein the means for causing content shared by the content source device to be displayed in the sub-display of the display comprises: means for receiving the content from the content source device; and means for sending the content to the display.

In Example 93, the subject matter of Examples 79-92 includes, wherein the means for causing content shared by the content source device to be displayed in the sub-display of the display comprises: means for receiving the content from the content source device; and means for rendering the content on the display in the sub-display.

In Example 94, the subject matter of Examples 79-93 includes, wherein the device is communicatively coupled through a local bus with the display.

In Example 95, the subject matter of Examples 79-94 includes, wherein the device is communicatively coupled to the display through a packet-based Internet Protocol network.

In Example 96, the subject matter of Examples 79-95 includes, wherein the display is a touchscreen display and wherein the gesture input is a touch input on the display surface.

In Example 97, the subject matter of Examples 79-96 includes, wherein the display surface is a projection screen and the display is provided by a projector.

In Example 98, the subject matter of Examples 79-97 includes, means for displaying a prompt on the display, the prompt indicating that the display has additional free space not occupied by sub-displays, the prompt offering a user a selection to automatically increase a size of the sub-display to fill the additional free space; and means for increasing the size of the sub-display responsive to receiving an indication to increase the size of the sub-display.

In Example 99, the subject matter of Example 98 includes, wherein the prompt is displayed based upon a determination that the content is being scaled to fit in the sub-display.

In Example 100, the subject matter of Examples 79-99 includes, wherein the content is content of a first source and the different content from a second source, and wherein the device further comprises: means for displaying a prompt on the display, the prompt suggesting automatically creating a new sub-display with content from a third source, the first and third sources both from the content source device; and means for creating the new sub-display and displaying the content from the third source responsive to receiving an indication to create the new sub-display.

In Example 101, the subject matter of Example 100 includes, wherein the first and third sources are different communication types provided by a communication application executing on the content source device.

In Example 102, the subject matter of Examples 100-101 includes, wherein displaying the prompt is responsive to determining that the display has additional free space not occupied by sub-displays and that the content source device includes the third content source not displayed in a sub-display.

In Example 103, the subject matter of Examples 79-102 includes, wherein the means for identifying the gesture input comprises means for receiving an indication of the gesture input from the display.

In Example 104, the subject matter of Examples 79-103 includes, wherein the means for identifying the gesture input comprises means for detecting the gesture input at a touchscreen of the display.

Example 105 is a computing device for pairing a designated sub-display, the computing device comprising: one or more hardware processors; a memory, storing instructions, which when executed by the one or more hardware processors, causes the one or more hardware processors to perform operations comprising: identifying a gesture input directed to a display surface of a display, the gesture input defining a geometry of a sub-display on the display, the sub-display encompassing different coordinates than a previously specified sub-display; responsive to identifying the gesture input, creating the sub-display based upon the defined geometry; displaying a pairing information input area on the display that corresponds to the sub-display; receiving a pairing input comprising first pairing information at the pairing information input area; linking the sub-display with a content source device based upon matching the first pairing information from the pairing input with second pairing information that is provided by the content source device; and responsive to linking the sub-display with the content source device, causing content shared by the content source device to be displayed in the sub-display of the display.

In Example 106, the subject matter of Example 105 includes, wherein the first pairing information is first biometric scan data and wherein the operations of receiving the pairing input comprises causing a biometric scanner to scan a portion of the display corresponding to the pairing information input area using an in-display biometric scanner to produce the first biometric scan data.

In Example 107, the subject matter of Example 106 includes, wherein the second pairing information is second biometric scan data received with a pairing request sent by the content source device, and wherein the operations of linking the sub-display with the content source device based upon matching the first pairing information with the second pairing information comprises: storing the first biometric scan data in a record of the sub-display; identifying the record of the sub-display from a plurality of other records of other sub-displays based upon matching the first biometric scan data with the second biometric scan data; updating the record of the sub-display with an address of the content source device from the pairing request; and wherein causing content shared by the content source device to be displayed in the sub-display of the display comprises: identifying a plurality of packets with content from the content source device; identifying the sub-display by matching the address in a header of at least one of the plurality of packets with the address of the content source device stored in the record of the sub-display; and causing the content to be rendered in the sub-display of the display.

In Example 108, the subject matter of Examples 106-107 includes, wherein the first biometric scan data is one of: fingerprint scan data, human eye scan data, or facial recognition data.

In Example 109, the subject matter of Examples 105-108 includes, wherein the pairing information input area comprises a tab visually attached to a border of the sub-display.

In Example 110, the subject matter of Examples 105-109 includes, wherein the first pairing information is a numeric, alphabetic, or alphanumeric code.

In Example 111, the subject matter of Examples 105-110 includes, wherein the first pairing information is login credentials of a user account.

In Example 112, the subject matter of Examples 105-111 includes, wherein the pairing information input area corresponds to the sub-display by linking the sub-display with the pairing input.

In Example 113, the subject matter of Example 112 includes, wherein the pairing information input area corresponds to the sub-display by visually linking the pairing information input area with the sub-display.

Example 114 is a method of pairing a designated sub-display, the method comprising: using one or more hardware processors: identifying a gesture input directed to a display surface of a display, the gesture input defining a geometry of a sub-display on the display, the sub-display encompassing different coordinates than a previously specified sub-display; responsive to identifying the gesture input, creating the sub-display based upon the defined geometry; displaying a pairing information input area on the display that corresponds to the sub-display; receiving a pairing input comprising first pairing information at the pairing information input area; linking the sub-display with a content source device based upon matching the first pairing information from the pairing input with second pairing information that is provided by the content source device; and responsive to linking the sub-display with the content source device, causing content shared by the content source device to be displayed in the sub-display of the display.

In Example 115, the subject matter of Example 114 includes, wherein the first pairing information is first biometric scan data and wherein receiving the pairing input comprises causing a biometric scanner to scan a portion of the display corresponding to the pairing information input area using an in-display biometric scanner to produce the first biometric scan data.

In Example 116, the subject matter of Example 115 includes, wherein the second pairing information is second biometric scan data received with a pairing request sent by the content source device, and wherein linking the sub-display with the content source device based upon matching the first pairing information with the second pairing information comprises: storing the first biometric scan data in a record of the sub-display; identifying the record of the sub-display from a plurality of other records of other sub-displays based upon matching the first biometric scan data with the second biometric scan data; updating the record of the sub-display with an address of the content source device from the pairing request; and wherein causing content shared by the content source device to be displayed in the sub-display of the display comprises: identifying a plurality of packets with content from the content source device; identifying the sub-display by matching the address in a header of at least one of the plurality of packets with the address of the content source device stored in the record of the sub-display; and causing the content to be rendered in the sub-display of the display.

In Example 117, the subject matter of Examples 115-116 includes, wherein the first biometric scan data is one of: fingerprint scan data, human eye scan data, or facial recognition data.

In Example 118, the subject matter of Examples 114-117 includes, wherein the pairing information input area comprises a tab visually attached to a border of the sub-display.

In Example 119, the subject matter of Examples 114-118 includes, wherein the first pairing information is a numeric, alphabetic, or alphanumeric code.

In Example 120, the subject matter of Examples 114-119 includes, wherein the first pairing information is login credentials of a user account.

In Example 121, the subject matter of Examples 114-120 includes, wherein the pairing information input area corresponds to the sub-display by linking the sub-display with the pairing input.

In Example 122, the subject matter of Example 121 includes, wherein the pairing information input area corresponds to the sub-display by visually linking the pairing information input area with the sub-display.

Example 123 is a machine-readable medium, storing instructions for pairing a designated sub-display, the instructions, when executed by a machine, causes the machine to perform operations comprising: identifying a gesture input directed to a display surface of a display, the gesture input defining a geometry of a sub-display on the display, the sub-display encompassing different coordinates than a previously specified sub-display; responsive to identifying the gesture input, creating the sub-display based upon the defined geometry; displaying a pairing information input area on the display that corresponds to the sub-display; receiving a pairing input comprising first pairing information at the pairing information input area; linking the sub-display with a content source device based upon matching the first pairing information from the pairing input with second pairing information that is provided by the content source device; and responsive to linking the sub-display with the content source device, causing content shared by the content source device to be displayed in the sub-display of the display.

In Example 124, the subject matter of Example 123 includes, wherein the first pairing information is first biometric scan data and wherein the operations of receiving the pairing input comprises causing a biometric scanner to scan a portion of the display corresponding to the pairing information input area using an in-display biometric scanner to produce the first biometric scan data.

In Example 125, the subject matter of Example 124 includes, wherein the second pairing information is second biometric scan data received with a pairing request sent by the content source device, and wherein the operations of linking the sub-display with the content source device based upon matching the first pairing information with the second pairing information comprises: storing the first biometric scan data in a record of the sub-display; identifying the record of the sub-display from a plurality of other records of other sub-displays based upon matching the first biometric scan data with the second biometric scan data; updating the record of the sub-display with an address of the content source device from the pairing request; and wherein causing content shared by the content source device to be displayed in the sub-display of the display comprises: identifying a plurality of packets with content from the content source device; identifying the sub-display by matching the address in a header of at least one of the plurality of packets with the address of the content source device stored in the record of the sub-display; and causing the content to be rendered in the sub-display of the display.

In Example 126, the subject matter of Examples 124-125 includes, wherein the first biometric scan data is one of: fingerprint scan data, human eye scan data, or facial recognition data.

In Example 127, the subject matter of Examples 123-126 includes, wherein the pairing information input area comprises a tab visually attached to a border of the sub-display.

In Example 128, the subject matter of Examples 123-127 includes, wherein the first pairing information is a numeric, alphabetic, or alphanumeric code.

In Example 129, the subject matter of Examples 123-128 includes, wherein the first pairing information is login credentials of a user account.

In Example 130, the subject matter of Examples 123-129 includes, wherein the pairing information input area corresponds to the sub-display by linking the sub-display with the pairing input.

In Example 131, the subject matter of Example 130 includes, wherein the pairing information input area corresponds to the sub-display by visually linking the pairing information input area with the sub-display.

Example 132 is a device for pairing a designated sub-display, the device comprising: means for identifying a gesture input directed to a display surface of a display, the gesture input defining a geometry of a sub-display on the display, the sub-display encompassing different coordinates than a previously specified sub-display; means for, responsive to identifying the gesture input, creating the sub-display based upon the defined geometry; means for displaying a pairing information input area on the display that corresponds to the sub-display; means for receiving a pairing input comprising first pairing information at the pairing information input area; means for linking the sub-display with a content source device based upon matching the first pairing information from the pairing input with second pairing information that is provided by the content source device; and means for, responsive to linking the sub-display with the content source device, causing content shared by the content source device to be displayed in the sub-display of the display.

In Example 133, the subject matter of Example 132 includes, wherein the first pairing information is first biometric scan data and wherein the means for receiving the pairing input comprises causing a biometric scanner to scan a portion of the display corresponding to the pairing information input area using an in-display biometric scanner to produce the first biometric scan data.

In Example 134, the subject matter of Example 133 includes, wherein the second pairing information is second biometric scan data received with a pairing request sent by the content source device, and wherein the means for linking the sub-display with the content source device based upon matching the first pairing information with the second pairing information comprises: means for storing the first biometric scan data in a record of the sub-display; means for identifying the record of the sub-display from a plurality of other records of other sub-displays based upon matching the first biometric scan data with the second biometric scan data; means for updating the record of the sub-display with an address of the content source device from the pairing request; and wherein causing content shared by the content source device to be displayed in the sub-display of the display comprises: means for identifying a plurality of packets with content from the content source device; means for identifying the sub-display by matching the address in a header of at least one of the plurality of packets with the address of the content source device stored in the record of the sub-display; and means for causing the content to be rendered in the sub-display of the display.

In Example 135, the subject matter of Examples 133-134 includes, wherein the first biometric scan data is one of: fingerprint scan data, human eye scan data, or facial recognition data.

In Example 136, the subject matter of Examples 132-135 includes, wherein the pairing information input area comprises a tab visually attached to a border of the sub-display.

In Example 137, the subject matter of Examples 132-136 includes, wherein the first pairing information is a numeric, alphabetic, or alphanumeric code.

In Example 138, the subject matter of Examples 132-137 includes, wherein the first pairing information is login credentials of a user account.

In Example 139, the subject matter of Examples 132-138 includes, wherein the pairing information input area corresponds to the sub-display by linking the sub-display with the pairing input.

In Example 140, the subject matter of Example 139 includes, wherein the pairing information input area corresponds to the sub-display by visually linking the pairing information input area with the sub-display.

Example 141 is a device for designating an input sub-display area, the device comprising: one or more hardware processors; a memory, storing instructions, which when executed by the one or more hardware processors, causes the one or more hardware processors to perform operations comprising: identifying a gesture input directed to a display surface of a display, the gesture input defining a geometry of a first sub-display on the display; responsive to the identifying the gesture input, creating the first sub-display based upon the geometry; causing content from a content source device to be displayed in the first sub-display of the display; identifying a second gesture input directed to the display surface of the display, the second gesture input defining a geometry of a second sub-display on the display, the second sub-display having a different location from the first sub-display on the display; responsive to the second gesture input, linking the second sub-display to the content source device; identifying an input directed to the second sub-display; and causing the input directed to the second sub-display to be sent to the content source device.

In Example 142, the subject matter of Example 141 includes, wherein no content is displayed on the second sub-display and wherein the input entered on the second sub-display is not displayed on the second sub-display.

In Example 143, the subject matter of Examples 141-142 includes, wherein the input entered on the second sub-display is not displayed on the first sub-display.

In Example 144, the subject matter of Examples 141-143 includes, wherein the operations further comprise: sending the identified input directed to the second sub-display directed to the second sub-display to the content source device; and saving the input, by the content source device, separately from the content from the content source device.

In Example 145, the subject matter of Examples 141-144 includes, wherein the operations further comprise: sending the identified input directed to the second sub-display to the content source device; and saving the input, by the content source device, as supplemental data of the content from the content source device correlated to a particular portion of the content from the content source device.

In Example 146, the subject matter of Example 145 includes, wherein the content from the content source device is a presentation and secondary data are a plurality of notes, each note of the plurality of notes correlated to a particular slide of the presentation.

In Example 147, the subject matter of Examples 141-146 includes, wherein the operations further comprise: identifying a second input directed to the first sub-display; sending the second input to the content source device; and causing display of the second input on the first sub-display.

In Example 148, the subject matter of Examples 141-147 includes, wherein the operations of linking the second sub-display to the content source device comprises linking an application executing on the content source device to the second sub-display, and wherein the operations of causing the input directed to the second sub-display to be sent to the content source device comprises causing the input entered on the second sub-display to be sent to the application on the content source device.

In Example 149, the subject matter of Example 148 includes, wherein a second application generates the content displayed on the first sub-display.

In Example 150, the subject matter of Examples 141-149 includes, wherein the input is not displayed on the display.

In Example 151, the subject matter of Examples 141-150 includes, wherein the operations of identifying the input directed to the second sub-display comprises: receiving an input of a touchscreen of the display at coordinates of the display that are within the second sub-display, wherein the input is an input in front of the display, a gesture touching the display, or an input to an onscreen keyboard on the display.

In Example 152, the subject matter of Examples 141-151 includes, wherein the operations of linking the second sub-display to the content source device comprises matching a first sub-display identifier from the display with a second sub-display identifier from the content source device.

In Example 153, the subject matter of Example 152 includes, wherein the operations of causing the input directed to the second sub-display to be sent to the content source device comprises: determining that the input corresponds to the second sub-display; determining that the content source device is linked to the second sub-display based upon a sub-display information data structure; determining an address of the content source device from the sub-display information data structure; and transmitting the input, over a network, to the content source device at the address.

In Example 154, the subject matter of Examples 141-153 includes, wherein the operations further comprise linking the first sub-display to the content source device by matching a first sub-display identifier from the display with a second sub-display identifier from the content source device.

Example 155 is a method of designating an input sub-display area, the method comprising: using one or more hardware processors: identifying a gesture input directed to a display surface of a display, the gesture input defining a geometry of a first sub-display on the display; responsive to the identifying the gesture input, creating the first sub-display based upon the geometry; causing content from a content source device to be displayed in the first sub-display of the display; identifying a second gesture input directed to the display surface of the display, the second gesture input defining a geometry of a second sub-display on the display, the second sub-display having a different location from the first sub-display on the display; responsive to the second gesture input, linking the second sub-display to the content source device; identifying an input directed to the second sub-display; and causing the input directed to the second sub-display to be sent to the content source device.

In Example 156, the subject matter of Example 155 includes, wherein no content is displayed on the second sub-display and wherein the input entered on the second sub-display is not displayed on the second sub-display.

In Example 157, the subject matter of Examples 155-156 includes, wherein the input entered on the second sub-display is not displayed on the first sub-display.

In Example 158, the subject matter of Examples 155-157 includes, sending the identified input directed to the second sub-display to the content source device; and saving the input, by the content source device, separately from the content from the content source device.

In Example 159, the subject matter of Examples 155-158 includes, sending the identified input directed to the second sub-display to the content source device; and saving the input, by the content source device, as supplemental data of the content from the content source device correlated to a particular portion of the content from the content source device.

In Example 160, the subject matter of Example 159 includes, wherein the content from the content source device is a presentation and secondary data are a plurality of notes, each note of the plurality of notes correlated to a particular slide of the presentation.

In Example 161, the subject matter of Examples 155-160 includes, identifying a second input directed to the first sub-display; sending the second input to the content source device; and causing display of the second input on the first sub-display.

In Example 162, the subject matter of Examples 155-161 includes, wherein linking the second sub-display to the content source device comprises linking an application executing on the content source device to the second sub-display, and wherein causing the input directed to the second sub-display to be sent to the content source device comprises causing the input entered on the second sub-display to be sent to the application on the content source device.

In Example 163, the subject matter of Example 162 includes, wherein a second application generates the content displayed on the first sub-display.

In Example 164, the subject matter of Examples 155-163 includes, wherein the input is not displayed on the display.

In Example 165, the subject matter of Examples 155-164 includes, wherein identifying the input directed to the second sub-display comprises: receiving an input of a touchscreen of the display at coordinates of the display that are within the second sub-display, wherein the input is an input in front of the display, a gesture touching the display, or an input to an onscreen keyboard on the display.

In Example 166, the subject matter of Examples 155-165 includes, wherein linking the second sub-display to the content source device comprises matching a first sub-display identifier from the display with a second sub-display identifier from the content source device.

In Example 167, the subject matter of Example 166 includes, wherein causing the input directed to the second sub-display to be sent to the content source device comprises: determining that the input corresponds to the second sub-display; determining that the content source device is linked to the second sub-display based upon a sub-display information data structure; determining an address of the content source device from the sub-display information data structure; and transmitting the input, over a network, to the content source device at the address.

In Example 168, the subject matter of Examples 155-167 includes, wherein the method further comprises linking the first sub-display to the content source device by matching a first sub-display identifier from the display with a second sub-display identifier from the content source device.

Example 169 is a machine-readable medium, storing instructions for designating an input sub-display area, the instructions, when executed by a machine, cause the machine to perform operations comprising: identifying a gesture input directed to a display surface of a display, the gesture input defining a geometry of a first sub-display on the display; responsive to the identifying the gesture input, creating the first sub-display based upon the geometry; causing content from a content source device to be displayed in the first sub-display of the display; identifying a second gesture input directed to the display surface of the display, the second gesture input defining a geometry of a second sub-display on the display, the second sub-display having a different location from the first sub-display on the display; responsive to the second gesture input, linking the second sub-display to the content source device; identifying an input directed to the second sub-display; and causing the input directed to the second sub-display to be sent to the content source device.

In Example 170, the subject matter of Example 169 includes, wherein no content is displayed on the second sub-display and wherein the input entered on the second sub-display is not displayed on the second sub-display.

In Example 171, the subject matter of Examples 169-170 includes, wherein the input entered on the second sub-display is not displayed on the first sub-display.

In Example 172, the subject matter of Examples 169-171 includes, wherein the operations further comprise: sending the identified input directed to the second sub-display to the content source device; and saving the input, by the content source device, separately from the content from the content source device.

In Example 173, the subject matter of Examples 169-172 includes, wherein the operations further comprise: sending the identified input directed to the second sub-display to the content source device; and saving the input, by the content source device, as supplemental data of the content from the content source device correlated to a particular portion of the content from the content source device.

In Example 174, the subject matter of Example 173 includes, wherein the content from the content source device is a presentation and secondary data are a plurality of notes, each note of the plurality of notes correlated to a particular slide of the presentation.

In Example 175, the subject matter of Examples 169-174 includes, wherein the operations further comprise: identifying a second input directed to the first sub-display; sending the second input to the content source device; and causing display of the second input on the first sub-display.

In Example 176, the subject matter of Examples 169-175 includes, wherein the operations of linking the second sub-display to the content source device comprises linking an application executing on the content source device to the second sub-display, and wherein the operations of causing the input directed to the second sub-display to be sent to the content source device comprises causing the input entered on the second sub-display to be sent to the application on the content source device.

In Example 177, the subject matter of Example 176 includes, wherein a second application generates the content displayed on the first sub-display.

In Example 178, the subject matter of Examples 169-177 includes, wherein the input is not displayed on the display.

In Example 179, the subject matter of Examples 169-178 includes, wherein the operations of identifying the input directed to the second sub-display comprises: receiving an input of a touchscreen of the display at coordinates of the display that are within the second sub-display, wherein the input is an input in front of the display, a gesture touching the display, or an input to an onscreen keyboard on the display.

In Example 180, the subject matter of Examples 169-179 includes, wherein the operations of linking the second sub-display to the content source device comprises matching a first sub-display identifier from the display with a second sub-display identifier from the content source device.

In Example 181, the subject matter of Example 180 includes, wherein the operations of causing the input directed to the second sub-display to be sent to the content source device comprises: determining that the input corresponds to the second sub-display; determining that the content source device is linked to the second sub-display based upon a sub-display information data structure; determining an address of the content source device from the sub-display information data structure; and transmitting the input, over a network, to the content source device at the address.

In Example 182, the subject matter of Examples 169-181 includes, wherein the operations further comprise linking the first sub-display to the content source device by matching a first sub-display identifier from the display with a second sub-display identifier from the content source device.

Example 183 is a device for designating an input sub-display area, the device comprising: means for identifying a gesture input directed to a display surface of a display, the gesture input defining a geometry of a first sub-display on the display; means for creating the first sub-display based upon the geometry responsive to the identifying the gesture input; means for causing content from a content source device to be displayed in the first sub-display of the display; means for identifying a second gesture input directed to the display surface of the display, the second gesture input defining a geometry of a second sub-display on the display, the second sub-display having a different location from the first sub-display on the display; means for linking the second sub-display to the content source device responsive to the second gesture input; means for identifying an input directed to the second sub-display; and means for causing the input directed to the second sub-display to be sent to the content source device.

In Example 184, the subject matter of Example 183 includes, wherein no content is displayed on the second sub-display and wherein the input entered on the second sub-display is not displayed on the second sub-display.

In Example 185, the subject matter of Examples 183-184 includes, wherein the input entered on the second sub-display is not displayed on the first sub-display.

In Example 186, the subject matter of Examples 183-185 includes, means for sending the identified input directed to the second sub-display to the content source device; and means for saving the input, by the content source device, separately from the content from the content source device.

In Example 187, the subject matter of Examples 183-186 includes, means for sending the identified input directed to the second sub-display to the content source device; and means for saving the input, by the content source device, as supplemental data of the content from the content source device correlated to a particular portion of the content from the content source device.

In Example 188, the subject matter of Example 187 includes, wherein the content from the content source device is a presentation and secondary data are a plurality of notes, each note of the plurality of notes correlated to a particular slide of the presentation.

In Example 189, the subject matter of Examples 183-188 includes, means for identifying a second input directed to the first sub-display; means for sending the second input to the content source device; and means for causing display of the second input on the first sub-display.

In Example 190, the subject matter of Examples 183-189 includes, wherein the means for linking the second sub-display to the content source device comprises linking an application executing on the content source device to the second sub-display, and wherein the means for causing the input directed to the second sub-display to be sent to the content source device comprises causing the input entered on the second sub-display to be sent to the application on the content source device.

In Example 191, the subject matter of Example 190 includes, wherein a second application generates the content displayed on the first sub-display.

In Example 192, the subject matter of Examples 183-191 includes, wherein the input is not displayed on the display.

In Example 193, the subject matter of Examples 183-192 includes, wherein the means for identifying the input directed to the second sub-display comprises: means for receiving an input of a touchscreen of the display at coordinates of the display that are within the second sub-display, wherein the input is an input in front of the display, a gesture touching the display, or an input to an onscreen keyboard on the display.

In Example 194, the subject matter of Examples 183-193 includes, wherein the means for linking the second sub-display to the content source device comprises means for matching a first sub-display identifier from the display with a second sub-display identifier from the content source device.

In Example 195, the subject matter of Example 194 includes, wherein the means for causing the input directed to the second sub-display to be sent to the content source device comprises: means for determining that the input corresponds to the second sub-display; means for determining that the content source device is linked to the second sub-display based upon a sub-display information data structure; means for determining an address of the content source device from the sub-display information data structure; and means for transmitting the input, over a network, to the content source device at the address.

In Example 196, the subject matter of Examples 183-195 includes, wherein the device further comprises means for linking the first sub-display to the content source device by matching a first sub-display identifier from the display with a second sub-display identifier from the content source device.

Example 197 is a computing device for designating a sub-display area for a remote content source device, the computing device comprising: one or more hardware processors; a memory, storing instructions, which when executed by the one or more hardware processors, causes the one or more hardware processors to perform operations comprising: receiving a first message over a network, the first message comprising an identifier of a sub-display of a display and an identifier of the remote content source device, the first message linking the sub-display with the remote content source device, the sub-display designated by a gesture input directed to a display surface of the display; responsive to receiving the first message, sending a second message to the remote content source device over the network, the second message indicating that the sub-display is linked to the remote content source device; receiving, over the network, content from the remote content source device; and causing display of the content in the sub-display by sending the content over the network to a display control system, the content containing the identifier of the sub-display.

In Example 198, the subject matter of Example 197 includes, wherein the first message is received over the network from a second computing device.

In Example 199, the subject matter of Example 198 includes, wherein the identifier is entered by a user of the second computing device into an application executing on the second computing device and wherein the first message is sent by the application.

In Example 200, the subject matter of Examples 198-199 includes, wherein the first message comprises an address of the display control system discovered by the second computing device based upon receiving a broadcast message from the display control system.

In Example 201, the subject matter of Examples 198-200 includes, wherein the first message is received as part of a network-based communication session with the remote content source device.

In Example 202, the subject matter of Examples 197-201 includes, wherein the operations further comprise: authenticating the display control system to a network-based communication session; and determining an address of the display control system based upon the authenticating.

In Example 203, the subject matter of Examples 197-202 includes, wherein operations further comprise providing a network-based communication session by routing one or more communications between a second computing device and the remote content source device to facilitate the network-based communication session.

In Example 204, the subject matter of Examples 197-203 includes, wherein the first message is received from the display control system.

In Example 205, the subject matter of Examples 197-204 includes, wherein the operations of causing display of the content comprises sending the content to the display control system and wherein the operations further comprise: sending the content to a third computing device, the third computing device a participant of a network-based communication session.

In Example 206, the subject matter of Examples 197-205 includes, wherein the display control system is a same device as the display.

In Example 207, the subject matter of Examples 197-206 includes, wherein the identifier of the remote content source device comprises a user identifier, and wherein the operations further comprise mapping the user identifier to the remote content source device based upon a user being authenticated on the remote content source device.

In Example 208, the subject matter of Examples 197-207 includes, wherein the operations further comprise: receiving an indication of the gesture input; and responsive to the indication of the gesture input, creating the sub-display by initializing a data structure storing the display.

Example 209 is a method of designating a sub-display area for a remote content source device, the method comprising: using one or more hardware processors of a computing device: receiving a first message over a network, the first message comprising an identifier of a sub-display of a display and an identifier of the remote content source device, the first message linking the sub-display with the remote content source device, the sub-display designated by a gesture input directed to a display surface of the display; responsive to receiving the first message, sending a second message to the remote content source device over the network, the second message indicating that the sub-display is linked to the remote content source device; receiving, over the network, content from the remote content source device; and causing display of the content in the sub-display by sending the content over the network to a display control system, the content containing the identifier of the sub-display.

In Example 210, the subject matter of Example 209 includes, wherein the first message is received over the network from a second computing device.

In Example 211, the subject matter of Example 210 includes, wherein the identifier is entered by a user of the second computing device into an application executing on the second computing device and wherein the first message is sent by the application.

In Example 212, the subject matter of Examples 210-211 includes, wherein the first message comprises an address of the display control system discovered by the second computing device based upon receiving a broadcast message from the display control system.

In Example 213, the subject matter of Examples 210-212 includes, wherein the first message is received as part of a network-based communication session with the remote content source device.

In Example 214, the subject matter of Examples 209-213 includes, authenticating the display control system to a network-based communication session; and determining an address of the display control system based upon the authenticating.

In Example 215, the subject matter of Examples 209-214 includes, wherein the computing device provides a network-based communication session by routing one or more communications between a second computing device and the remote content source device to facilitate the network-based communication session.

In Example 216, the subject matter of Examples 209-215 includes, wherein the first message is received from the display control system.

In Example 217, the subject matter of Examples 209-216 includes, wherein causing display of the content comprises sending the content to the display control system and wherein the method further comprises: sending the content to a third computing device, the third computing device a participant of a network-based communication session.

In Example 218, the subject matter of Examples 209-217 includes, wherein the display control system is a same device as the display.

In Example 219, the subject matter of Examples 209-218 includes, wherein the identifier of the remote content source device comprises a user identifier, and wherein the method further comprises mapping the user identifier to the remote content source device based upon a user being authenticated on the remote content source device.

In Example 220, the subject matter of Examples 209-219 includes, receiving an indication of the gesture input; and responsive to the indication of the gesture input, creating the sub-display by initializing a data structure storing the display.

Example 221 is a machine-readable medium, storing instructions, which when executed by a computing device, causes the computing device to perform operations comprising: receiving a first message over a network, the first message comprising an identifier of a sub-display of a display and an identifier of a remote content source device, the first message linking the sub-display with the remote content source device, the sub-display designated by a gesture input directed to a display surface of the display; responsive to receiving the first message, sending a second message to the remote content source device over the network, the second message indicating that the sub-display is linked to the remote content source device; receiving, over the network, content from the remote content source device; and causing display of the content in the sub-display by sending the content over the network to a display control system, the content containing the identifier of the sub-display.

In Example 222, the subject matter of Example 221 includes, wherein the first message is received over the network from a second computing device.

In Example 223, the subject matter of Example 222 includes, wherein the identifier is entered by a user of the second computing device into an application executing on the second computing device and wherein the first message is sent by the application.

In Example 224, the subject matter of Examples 222-223 includes, wherein the first message comprises an address of the display control system discovered by the second computing device based upon receiving a broadcast message from the display control system.

In Example 225, the subject matter of Examples 222-224 includes, wherein the first message is received as part of a network-based communication session with the remote content source device.

In Example 226, the subject matter of Examples 221-225 includes, wherein the operations further comprise: authenticating the display control system to a network-based communication session; and determining an address of the display control system based upon the authenticating.

In Example 227, the subject matter of Examples 221-226 includes, wherein operations further comprise providing a network-based communication session by routing one or more communications between a second computing device and the remote content source device to facilitate the network-based communication session.

In Example 228, the subject matter of Examples 221-227 includes, wherein the first message is received from the display control system.

In Example 229, the subject matter of Examples 221-228 includes, wherein the operations of causing display of the content comprises sending the content to the display control system and wherein the operations further comprise: sending the content to a third computing device, the third computing device a participant of a network-based communication session.

In Example 230, the subject matter of Examples 221-229 includes, wherein the display control system is a same device as the display.

In Example 231, the subject matter of Examples 221-230 includes, wherein the identifier of the remote content source device comprises a user identifier, and wherein the operations further comprise mapping the user identifier to the remote content source device based upon a user being authenticated on the remote content source device.

In Example 232, the subject matter of Examples 221-231 includes, wherein the operations further comprise: receiving an indication of the gesture input; and responsive to the indication of the gesture input, creating the sub-display by initializing a data structure storing the display.

Example 233 is a computing device for designating a sub-display area for a remote content source device, the computing device comprising: means for receiving a first message over a network, the first message comprising an identifier of a sub-display of a display and an identifier of the remote content source device, the first message linking the sub-display with the remote content source device, the sub-display designated by a gesture input directed to a display surface of the display; means for, responsive to receiving the first message, sending a second message to the remote content source device over the network, the second message indicating that the sub-display is linked to the remote content source device; means for receiving, over the network, content from the remote content source device; and means for causing display of the content in the sub-display by sending the content over the network to a display control system, the content containing the identifier of the sub-display.

In Example 234, the subject matter of Example 233 includes, wherein the first message is received over the network from a second computing device.

In Example 235, the subject matter of Example 234 includes, wherein the identifier is entered by a user of the second computing device into an application executing on the second computing device and wherein the first message is sent by the application.

In Example 236, the subject matter of Examples 234-235 includes, wherein the first message comprises an address of the display control system discovered by the second computing device based upon receiving a broadcast message from the display control system.

In Example 237, the subject matter of Examples 234-236 includes, wherein the first message is received as part of a network-based communication session with the remote content source device.

In Example 238, the subject matter of Examples 233-237 includes, means for authenticating the display control system to a network-based communication session; and means for determining an address of the display control system based upon the authenticating.

In Example 239, the subject matter of Examples 233-238 includes, wherein the computing device provides a network-based communication session by routing one or more communications between a second computing device and the remote content source device to facilitate the network-based communication session.

In Example 240, the subject matter of Examples 233-239 includes, wherein the first message is received from the display control system.

In Example 241, the subject matter of Examples 233-240 includes, wherein the means for causing display of the content comprises sending the content to the display control system and wherein the computing device further comprises: means for sending the content to a third computing device, the third computing device a participant of a network-based communication session.

In Example 242, the subject matter of Examples 233-241 includes, wherein the display control system is a same device as the display.

In Example 243, the subject matter of Examples 233-242 includes, wherein the identifier of the remote content source device comprises a user identifier, and wherein the computing device further comprises means for mapping the user identifier to the remote content source device based upon a user being authenticated on the remote content source device.

In Example 244, the subject matter of Examples 233-243 includes, means for receiving an indication of the gesture input; and means for, responsive to the indication of the gesture input, creating the sub-display by initializing a data structure storing the display.

Example 245 is a computing device for causing display of notifications with sub-displays, the computing device comprising: one or more hardware processors; a memory, storing instructions, which when executed, causes the one or more hardware processors to perform operations comprising: identifying a gesture input directed to a display surface of a display, the gesture input defining a geometry of a sub-display on the display; responsive to the gesture input, creating the sub-display based upon the geometry and linking the sub-display with a content source device; causing content sent by the content source device to be displayed in the sub-display of the display; receiving a message from the content source device with information about a notification on the content source device that, if displayed in the sub-display would otherwise overlap with the content; causing the display of the notification in a notification region of the display; and causing the sub-display of the display to display the content sent by the content source device without the notification overlapping the content.

In Example 246, the subject matter of Example 245 includes, wherein the notification region is adjacent to a border of the sub-display.

In Example 247, the subject matter of Examples 245-246 includes, wherein the notification region is not rendered prior to receipt of the message.

In Example 248, the subject matter of Examples 245-247 includes, wherein the notification region is a separate sub-display.

In Example 249, the subject matter of Examples 245-248 includes, wherein the operations further comprise: providing a user interface with selectable options for showing different notification types on the sub-display; receiving a selection of a first notification type to display on the sub-display; and wherein causing the display of the notification comprises determining that the notification is of the first notification type.

In Example 250, the subject matter of Example 249 includes, wherein the user interface is displayed on the content source device.

In Example 251, the subject matter of Examples 249-250 includes, wherein the user interface is displayed on the display.

In Example 252, the subject matter of Examples 245-251 includes, wherein the operations further comprise: identifying an input on the notification region of the display surface, the input matching a predefined gesture to dismiss the notification; and responsive to identifying the input on the notification region of the display matching the predefined gesture to dismiss the notification, causing the notification to be dismissed by removing the notification information from the display.

In Example 253, the subject matter of Example 252 includes, wherein the operations of causing the notification to be dismissed comprises sending a message to the content source device to dismiss the notification.

In Example 254, the subject matter of Examples 245-253 includes, wherein the operations further comprise: identifying an input on the notification region of the display surface, the input matching a predefined gesture to expand the notification; and responsive to identifying the input on the notification region of the display matching the predefined gesture to expand the notification, displaying content corresponding to the notification over the content shared by the content source device in the sub-display.

In Example 255, the subject matter of Example 254 includes, wherein the operations of displaying content corresponding to the notification over the content shared by the content source device in the sub-display of the display comprises completely replacing the content shared by the content source device in the sub-display with the content corresponding to the notification.

In Example 256, the subject matter of Examples 245-255 includes, wherein the operations further comprise: identifying an input on the notification region of the display surface, the input matching a predefined gesture to expand the notification; and responsive to identifying the input on the notification region of the display matching the predefined gesture to expand the notification, displaying content corresponding to the notification in an automatically created second sub-display that is in a different location than the sub-display.

In Example 257, the subject matter of Examples 245-256 includes, wherein the notification was not generated from an application generating the content shared by the content source device.

Example 258 is a method of displaying notifications with sub-displays, the method comprising: using one or more hardware processors: identifying a gesture input directed to a display surface of a display, the gesture input defining a geometry of a sub-display on the display; responsive to the gesture input, creating the sub-display based upon the geometry and linking the sub-display with a content source device; causing content sent by the content source device to be displayed in the sub-display of the display; receiving a message from the content source device with information about a notification on the content source device that, if displayed in the sub-display would otherwise overlap with the content; causing the display of the notification in a notification region of the display; and causing the sub-display of the display to display the content sent by the content source device without the notification overlapping the content.

In Example 259, the subject matter of Example 258 includes, wherein the notification region is adjacent to a border of the sub-display.

In Example 260, the subject matter of Examples 258-259 includes, wherein the notification region is not rendered prior to receipt of the message.

In Example 261, the subject matter of Examples 258-260 includes, wherein the notification region is a separate sub-display.

In Example 262, the subject matter of Examples 258-261 includes, providing a user interface with selectable options for showing different notification types on the sub-display; receiving a selection of a first notification type to display on the sub-display; and wherein causing the display of the notification comprises determining that the notification is of the first notification type.

In Example 263, the subject matter of Example 262 includes, wherein the user interface is displayed on the content source device.

In Example 264, the subject matter of Examples 262-263 includes, wherein the user interface is displayed on the display.

In Example 265, the subject matter of Examples 258-264 includes, identifying an input on the notification region of the display surface, the input matching a predefined gesture to dismiss the notification; and responsive to identifying the input on the notification region of the display matching the predefined gesture to dismiss the notification, causing the notification to be dismissed by removing the notification information from the display.

In Example 266, the subject matter of Example 265 includes, wherein causing the notification to be dismissed comprises sending a message to the content source device to dismiss the notification.

In Example 267, the subject matter of Examples 258-266 includes, identifying an input on the notification region of the display surface, the input matching a predefined gesture to expand the notification; and responsive to identifying the input on the notification region of the display matching the predefined gesture to expand the notification, displaying content corresponding to the notification over the content shared by the content source device in the sub-display.

In Example 268, the subject matter of Example 267 includes, wherein displaying content corresponding to the notification over the content shared by the content source device in the sub-display of the display comprises completely replacing the content shared by the content source device in the sub-display with the content corresponding to the notification.

In Example 269, the subject matter of Examples 258-268 includes, identifying an input on the notification region of the display surface, the input matching a predefined gesture to expand the notification; and responsive to identifying the input on the notification region of the display matching the predefined gesture to expand the notification, displaying content corresponding to the notification in an automatically created second sub-display that is in a different location than the sub-display.

In Example 270, the subject matter of Examples 258-269 includes, wherein the notification was not generated from an application generating the content shared by the content source device.

Example 271 is a machine-readable medium, storing instructions, which when executed by a machine, causes the machine to perform operations comprising: identifying a gesture input directed to a display surface of a display, the gesture input defining a geometry of a sub-display on the display; responsive to the gesture input, creating the sub-display based upon the geometry and linking the sub-display with a content source device; causing content sent by the content source device to be displayed in the sub-display of the display; receiving a message from the content source device with information about a notification on the content source device that, if displayed in the sub-display would otherwise overlap with the content; causing the display of the notification in a notification region of the display; and causing the sub-display of the display to display the content sent by the content source device without the notification overlapping the content.

In Example 272, the subject matter of Example 271 includes, wherein the notification region is adjacent to a border of the sub-display.

In Example 273, the subject matter of Examples 271-272 includes, wherein the notification region is not rendered prior to receipt of the message.

In Example 274, the subject matter of Examples 271-273 includes, wherein the notification region is a separate sub-display.

In Example 275, the subject matter of Examples 271-274 includes, wherein the operations further comprise: providing a user interface with selectable options for showing different notification types on the sub-display; receiving a selection of a first notification type to display on the sub-display; and wherein causing the display of the notification comprises determining that the notification is of the first notification type.

In Example 276, the subject matter of Example 275 includes, wherein the user interface is displayed on the content source device.

In Example 277, the subject matter of Examples 275-276 includes, wherein the user interface is displayed on the display.

In Example 278, the subject matter of Examples 271-277 includes, wherein the operations further comprise: identifying an input on the notification region of the display surface, the input matching a predefined gesture to dismiss the notification; and responsive to identifying the input on the notification region of the display matching the predefined gesture to dismiss the notification, causing the notification to be dismissed by removing the notification information from the display.

In Example 279, the subject matter of Example 278 includes, wherein the operations of causing the notification to be dismissed comprises sending a message to the content source device to dismiss the notification.

In Example 280, the subject matter of Examples 271-279 includes, wherein the operations further comprise: identifying an input on the notification region of the display surface, the input matching a predefined gesture to expand the notification; and responsive to identifying the input on the notification region of the display matching the predefined gesture to expand the notification, displaying content corresponding to the notification over the content shared by the content source device in the sub-display.

In Example 281, the subject matter of Example 280 includes, wherein the operations of displaying content corresponding to the notification over the content shared by the content source device in the sub-display of the display comprises completely replacing the content shared by the content source device in the sub-display with the content corresponding to the notification.

In Example 282, the subject matter of Examples 271-281 includes, wherein the operations further comprise: identifying an input on the notification region of the display surface, the input matching a predefined gesture to expand the notification; and responsive to identifying the input on the notification region of the display matching the predefined gesture to expand the notification, displaying content corresponding to the notification in an automatically created second sub-display that is in a different location than the sub-display.

In Example 283, the subject matter of Examples 271-282 includes, wherein the notification was not generated from an application generating the content shared by the content source device.

Example 284 is a device for displaying notifications with sub-displays, the device comprising: means for identifying a gesture input directed to a display surface of a display, the gesture input defining a geometry of a sub-display on the display; means for creating the sub-display based upon the geometry and linking the sub-display with a content source device responsive to the gesture input; means for causing content sent by the content source device to be displayed in the sub-display of the display; means for receiving a message from the content source device with information about a notification on the content source device that, if displayed in the sub-display would otherwise overlap with the content; means for causing the display of the notification in a notification region of the display; and means for causing the sub-display of the display to display the content sent by the content source device without the notification overlapping the content.

In Example 285, the subject matter of Example 284 includes, wherein the notification region is adjacent to a border of the sub-display.

In Example 286, the subject matter of Examples 284-285 includes, wherein the notification region is not rendered prior to receipt of the message.

In Example 287, the subject matter of Examples 284-286 includes, wherein the notification region is a separate sub-display.

In Example 288, the subject matter of Examples 284-287 includes, means for providing a user interface with selectable options for showing different notification types on the sub-display; means for receiving a selection of a first notification type to display on the sub-display; and wherein causing the display of the notification comprises determining that the notification is of the first notification type.

In Example 289, the subject matter of Example 288 includes, wherein the user interface is displayed on the content source device.

In Example 290, the subject matter of Examples 288-289 includes, wherein the user interface is displayed on the display.

In Example 291, the subject matter of Examples 284-290 includes, means for identifying an input on the notification region of the display surface, the input matching a predefined gesture to dismiss the notification; and means for responsive to identifying the input on the notification region of the display matching the predefined gesture to dismiss the notification, causing the notification to be dismissed by removing the notification information from the display.

In Example 292, the subject matter of Example 291 includes, wherein causing the notification to be dismissed comprises sending a message to the content source device to dismiss the notification.

In Example 293, the subject matter of Examples 284-292 includes, means for identifying an input on the notification region of the display surface, the input matching a predefined gesture to expand the notification; and means for, responsive to identifying the input on the notification region of the display matching the predefined gesture to expand the notification, displaying content corresponding to the notification over the content shared by the content source device in the sub-display.

In Example 294, the subject matter of Example 293 includes, wherein the means for displaying content corresponding to the notification over the content shared by the content source device in the sub-display of the display comprises means for completely replacing the content shared by the content source device in the sub-display with the content corresponding to the notification.

In Example 295, the subject matter of Examples 284-294 includes, means for identifying an input on the notification region of the display surface, the input matching a predefined gesture to expand the notification; and means for, responsive to identifying the input on the notification region of the display matching the predefined gesture to expand the notification, displaying content corresponding to the notification in an automatically created second sub-display that is in a different location than the sub-display.

In Example 296, the subject matter of Examples 284-295 includes, wherein the notification was not generated from an application generating the content shared by the content source device.

Example 297 is at least one machine-readable medium including instructions that, when executed by processing circuitry, cause the processing circuitry to perform operations to implement of any of Examples 1-296.

Example 298 is an apparatus comprising means to implement of any of Examples 1-296.

Example 299 is a system to implement of any of Examples 1-296.

Example 300 is a method to implement of any of Examples 1-296.

What is claimed is:

1. A device for designating an input sub-display area, the device comprising:
   one or more hardware processors;
   a memory, storing instructions, which when executed by the one or more hardware processors, causes the one or more hardware processors to perform operations comprising:
      identifying a gesture input directed to a display surface of a display, the gesture input defining a geometry of a first sub-display on the display;
      responsive to the identifying the gesture input, creating the first sub-display based upon the geometry;
      displaying the first sub-display by displaying a border of the first sub-display;
      causing content selected by a user of a content source device to be displayed in the first sub-display of the display;
      identifying a second gesture input directed to the display surface of the display, the second gesture input defining a geometry of a second sub-display on the display, the second sub-display having a different location from the first sub-display on the display;
      responsive to the identifying the second gesture input, linking the second sub-display to the content source device and displaying the second sub-display by displaying a border of the second sub-display, the second sub-display displayed on the display at least partially simultaneous to the display of the first sub-display;
      identifying an input directed to the second sub-display; and
      causing the input directed to the second sub-display to be sent to the content source device.

2. The device of claim 1, wherein no content is displayed on the second sub-display and wherein the input entered on the second sub-display is not displayed on the second sub-display.

3. The device of claim 1, wherein the input entered on the second sub-display is not displayed on the first sub-display.

4. The device of claim 1, wherein the operations further comprise:
   sending the identified input directed to the second sub-display directed to the second sub-display to the content source device; and
   saving the input, by the content source device, separately from the content from the content source device.

5. The device of claim 1, wherein the operations further comprise:
   sending the identified input directed to the second sub-display to the content source device; and
   saving the input, by the content source device, as supplemental data of the content from the content source device correlated to a particular portion of the content from the content source device.

6. The device of claim 5, wherein the content from the content source device is a presentation and secondary data are a plurality of notes, each note of the plurality of notes correlated to a particular slide of the presentation.

7. The device of claim 1, wherein the operations further comprise:
   identifying a second input directed to the first sub-display;
   sending the second input to the content source device; and
   causing display of the second input on the first sub-display.

8. The device of claim 1, wherein the operations of linking the second sub-display to the content source device comprises linking an application executing on the content source device to the second sub-display, and wherein the operations of causing the input directed to the second sub-display to be sent to the content source device comprises causing the input entered on the second sub-display to be sent to the application on the content source device.

9. The device of claim 8, wherein a second application generates the content displayed on the first sub-display.

10. The device of claim 1, wherein the input is not displayed on the display.

11. The device of claim 1, wherein the operations of identifying the input directed to the second sub-display comprises:
   receiving an input of a touchscreen of the display at coordinates of the display that are within the second sub-display, wherein the input is an input in front of the display, a gesture touching the display, or an input to an onscreen keyboard on the display.

12. The device of claim 1, wherein the operations of linking the second sub-display to the content source device comprises matching a first sub-display identifier from the display with a second sub-display identifier from the content source device.

13. The device of claim 12, wherein the operations of causing the input directed to the second sub-display to be sent to the content source device comprises:
   determining that the input corresponds to the second sub-display;
   determining that the content source device is linked to the second sub-display based upon a sub-display information data structure;
   determining an address of the content source device from the sub-display information data structure; and
   transmitting the input, over a network, to the content source device at the address.

14. The device of claim 1, wherein the operations further comprise linking the first sub-display to the content source device by matching a first sub-display identifier from the display with a second sub-display identifier from the content source device.

15. A method of designating an input sub-display area, the method comprising:
   using one or more hardware processors:
   identifying a gesture input directed to a display surface of a display, the gesture input defining a geometry of a first sub-display on the display;
   responsive to the identifying the gesture input, creating the first sub-display based upon the geometry;
   displaying the first sub-display by displaying a border of the first sub-display;
   causing content selected by a user of a content source device to be displayed in the first sub-display of the display;
   identifying a second gesture input directed to the display surface of the display, the second gesture input defining a geometry of a second sub-display on the display, the second sub-display having a different location from the first sub-display on the display;
   responsive to the identifying the second gesture input, linking the second sub-display to the content source device and displaying the second sub-display by displaying a border of the second sub-display, the second sub-display displayed on the display at least partially simultaneous to the display of the first sub-display;
   identifying an input directed to the second sub-display; and
   causing the input directed to the second sub-display to be sent to the content source device.

16. The method of claim 15, wherein no content is displayed on the second sub-display and wherein the input entered on the second sub-display is not displayed on the second sub-display.

17. The method of claim 15, wherein the input entered on the second sub-display is not displayed on the first sub-display.

18. The method of claim 15, further comprising:
   sending the identified input directed to the second sub-display to the content source device; and
   saving the input, by the content source device, separately from the content from the content source device.

19. A device for designating an input sub-display area, the device comprising:
   means for identifying a gesture input directed to a display surface of a display, the gesture input defining a geometry of a first sub-display on the display;
   means for creating the first sub-display based upon the geometry responsive to the identifying the gesture input;
   means for displaying the first sub-display by displaying a border of the first sub-display;
   means for causing content selected by a user of a content source device to be displayed in the first sub-display of the display;
   means for identifying a second gesture input directed to the display surface of the display, the second gesture input defining a geometry of a second sub-display on the display, the second sub-display having a different location from the first sub-display on the display;
   means for linking the second sub-display to the content source device and displaying the second sub-display by displaying a border of the second sub-display, the second sub-display displayed on the display at least partially simultaneous to the display of the first sub-display responsive to identifying the second gesture input;
   means for identifying an input directed to the second sub-display; and
   means for causing the input directed to the second sub-display to be sent to the content source device.

20. The device of claim 19, wherein no content is displayed on the second sub-display and wherein the input entered on the second sub-display is not displayed on the second sub-display.

* * * * *